(12) United States Patent
Roh et al.

(10) Patent No.: US 11,991,431 B2
(45) Date of Patent: May 21, 2024

(54) CAMERA MODULE AND CAMERA APPARATUS INCLUDING SAME

(71) Applicant: LG INNOTEK CO., LTD., Seoul (KR)

(72) Inventors: Hyun Gyu Roh, Seoul (KR); Kyung Won Kim, Seoul (KR); Chang Yeon Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 267 days.

(21) Appl. No.: 17/610,087

(22) PCT Filed: May 8, 2020

(86) PCT No.: PCT/KR2020/006119
§ 371 (c)(1),
(2) Date: Nov. 9, 2021

(87) PCT Pub. No.: WO2020/231110
PCT Pub. Date: Nov. 19, 2020

(65) Prior Publication Data
US 2022/0201166 A1 Jun. 23, 2022

(30) Foreign Application Priority Data
May 10, 2019 (KR) ........................ 10-2019-0054805

(51) Int. Cl.
*H04N 23/54* (2023.01)
*G02B 7/10* (2021.01)
(Continued)

(52) U.S. Cl.
CPC ............. *H04N 23/54* (2023.01); *G02B 7/102* (2013.01); *G02B 27/646* (2013.01); *G03B 3/10* (2013.01); *H04N 23/55* (2023.01)

(58) Field of Classification Search
CPC ........ H04N 23/54; H04N 23/55; H04N 23/57; H04N 23/60; H04N 23/671; H04N 23/50;
(Continued)

(56) References Cited

U.S. PATENT DOCUMENTS 9,151,965 B2 10/2015 Lim et al.
2010/0214681 A1 8/2010 Hagiwara
(Continued)

FOREIGN PATENT DOCUMENTS

JP 2018-173581 A 11/2018
KR 10-1068473 B1 9/2011
(Continued)

*Primary Examiner* — Twyler L Haskins
*Assistant Examiner* — Angel L Garces-Rivera
(74) *Attorney, Agent, or Firm* — Birch, Stewart, Kolasch & Birch, LLP

(57) ABSTRACT

A camera module or camera device according to an embodiment includes a base, a first lens assembly disposed in the base, a first coil part disposed on the base, a first spacer disposed on the base, a first spacer disposed on the first spacer, and a first position detection sensor disposed on the first spacer. The first spacer includes a first support portion and a first protrusion protruding from the first support (Continued)

portion, and the first position detection sensor may be disposed on the first protrusion, and the first protrusion may be disposed in the hollow of the first coil part.

18 Claims, 38 Drawing Sheets

(51) Int. Cl.
*G02B 27/64* (2006.01)
*G03B 3/10* (2021.01)
*H04N 23/55* (2023.01)

(58) Field of Classification Search
CPC ...... H04N 23/69; G02B 7/102; G02B 27/646; G02B 7/021; G02B 7/023; G02B 7/08; G02B 7/09; G02B 13/009; G03B 3/10; G03B 30/00; G03B 5/00; G03B 13/36; G03B 3/00; G03B 2205/0046; G03B 2205/0069

See application file for complete search history.

(56) References Cited

U.S. PATENT DOCUMENTS

| | | |
|---|---|---|
| 2015/0212293 A1 | 7/2015 | Bang et al. |
| 2016/0209672 A1 | 7/2016 | Park et al. |
| 2016/0373000 A1 | 12/2016 | Park |
| 2017/0038600 A1 | 2/2017 | Hee et al. |
| 2017/0212409 A1 | 7/2017 | Kim |
| 2017/0235094 A1 | 8/2017 | Osaka et al. |
| 2017/0280036 A1* | 9/2017 | Morinaga ............ H04N 23/54 |
| 2018/0203328 A1 | 7/2018 | Kang et al. |
| 2020/0241238 A1 | 7/2020 | Park |

FOREIGN PATENT DOCUMENTS

| | | |
|---|---|---|
| KR | 10-1337975 B1 | 12/2013 |
| KR | 10-2017-0016639 A | 2/2017 |
| KR | 10-1717206 B1 | 3/2017 |
| KR | 10-1952858 B1 | 2/2019 |
| KR | 10-2019-0037863 A | 4/2019 |
| KR | 10-2019-0041270 A | 4/2019 |

* cited by examiner

[FIG. 1]
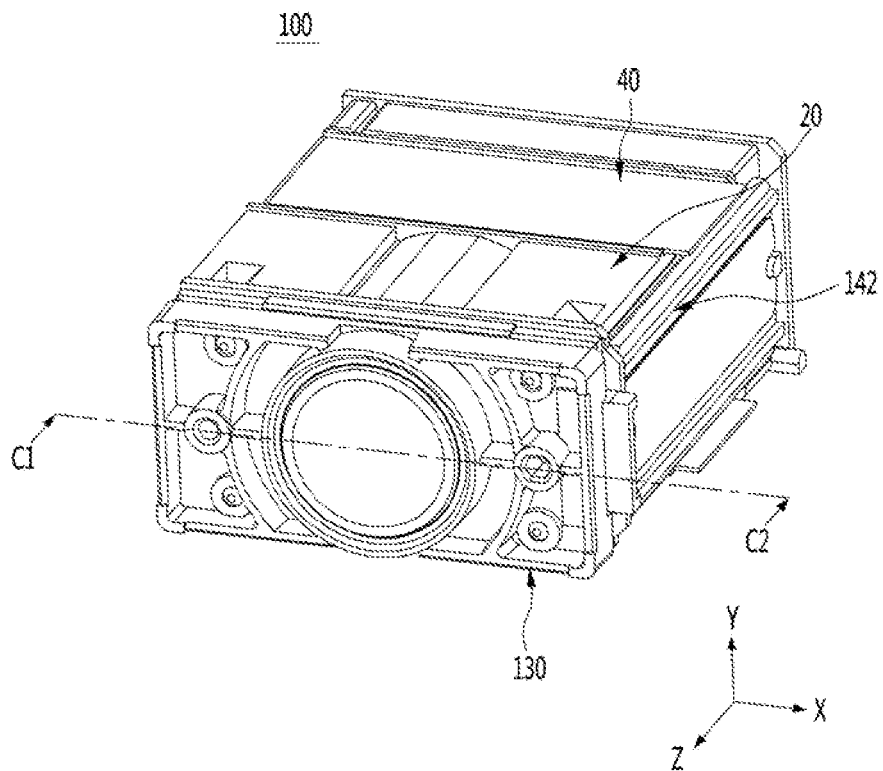
[FIG. 2]
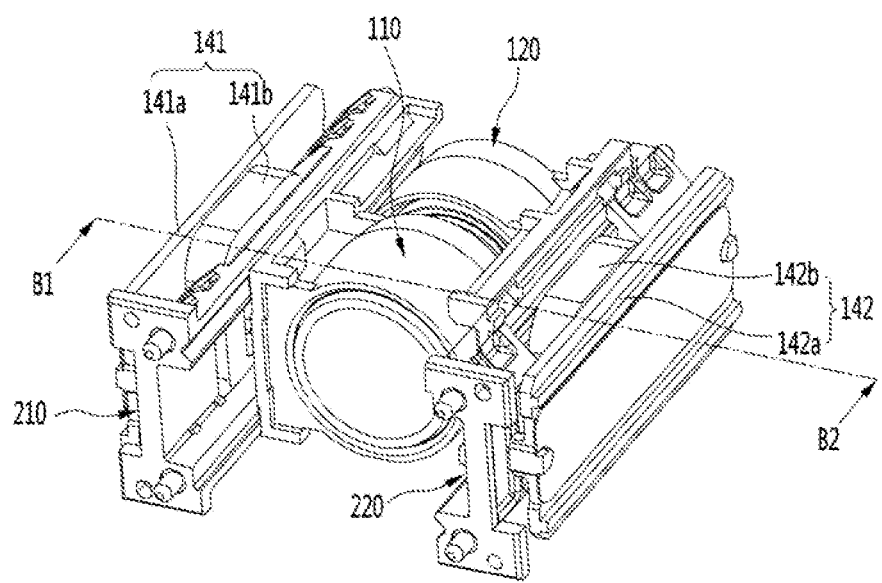

[FIG. 3]
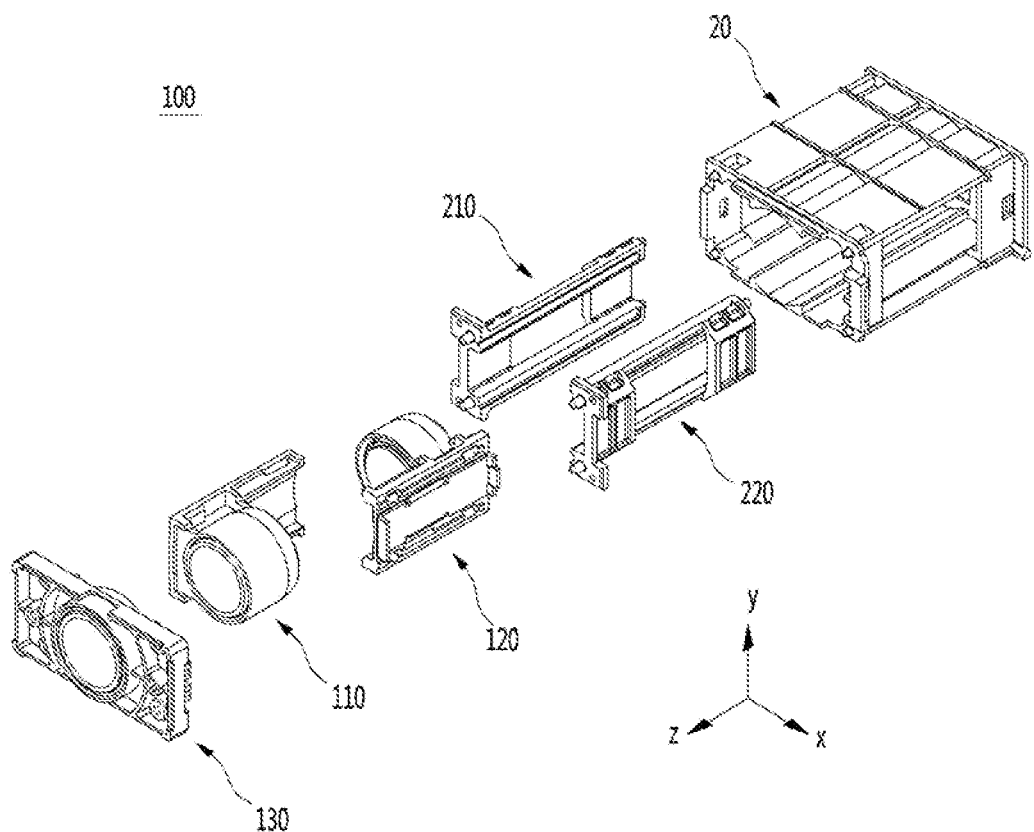

[FIG. 4]
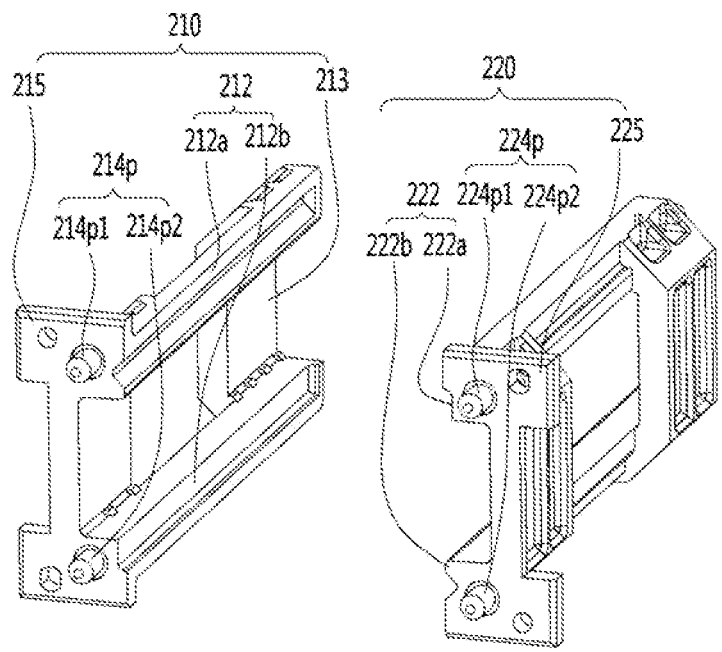
[FIG. 5]
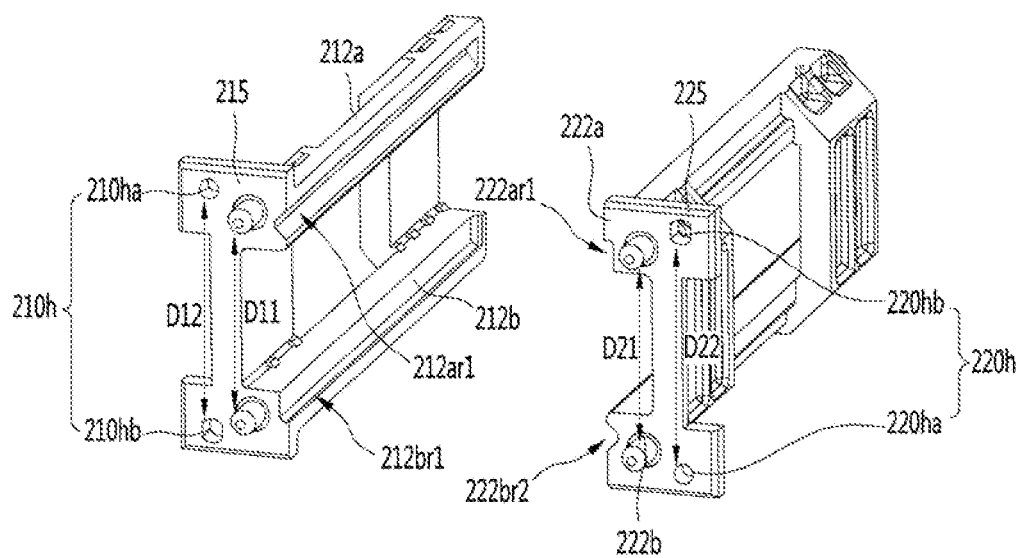

[FIG. 6a]
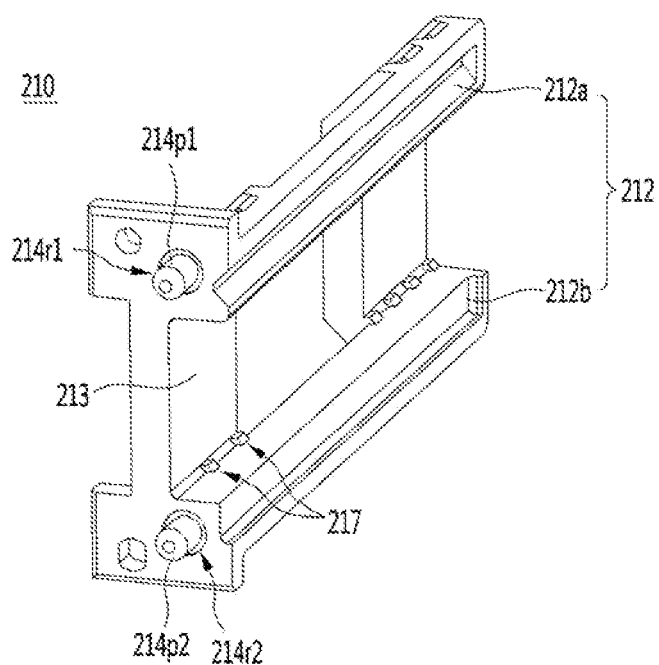

[FIG. 6b]
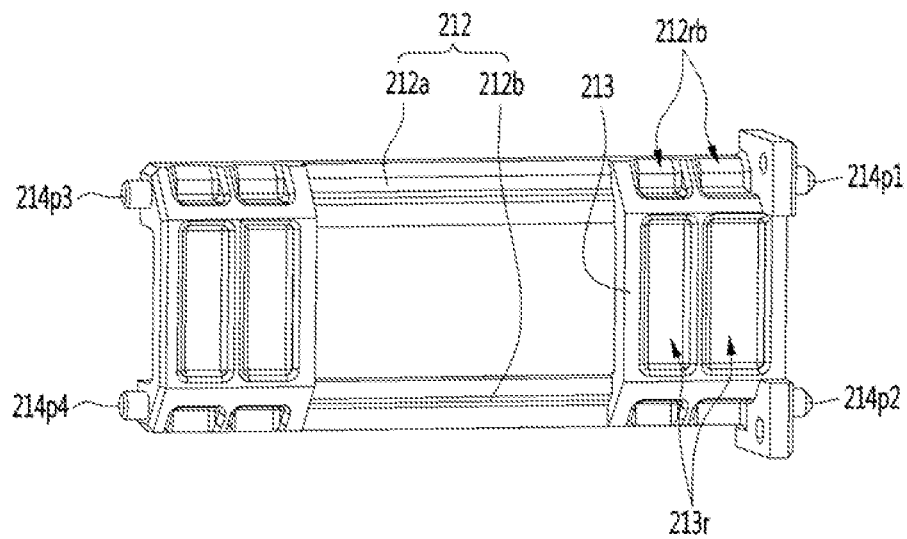
[FIG. 7a]
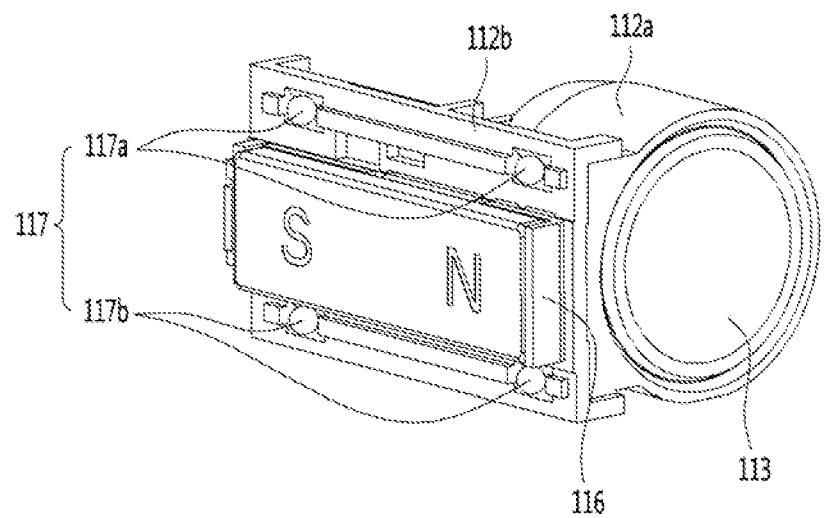

【FIG. 7b】
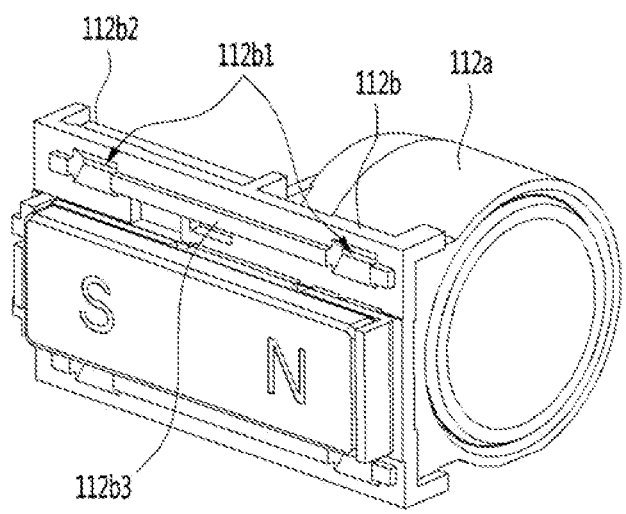
【FIG. 8a】
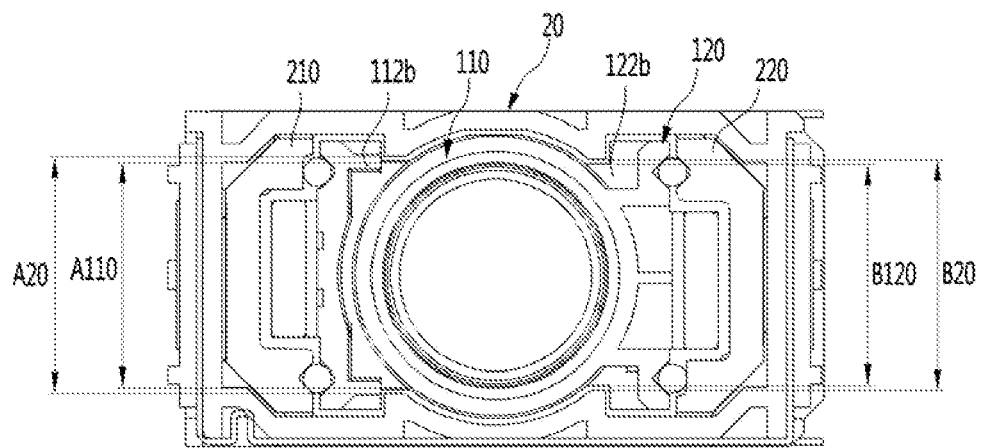

[FIG. 8b]
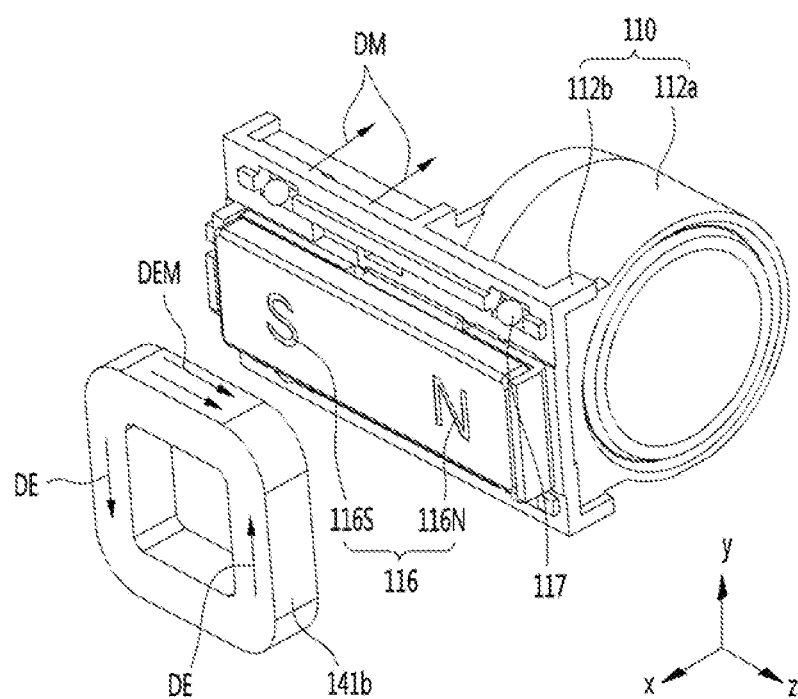

【FIG. 9】
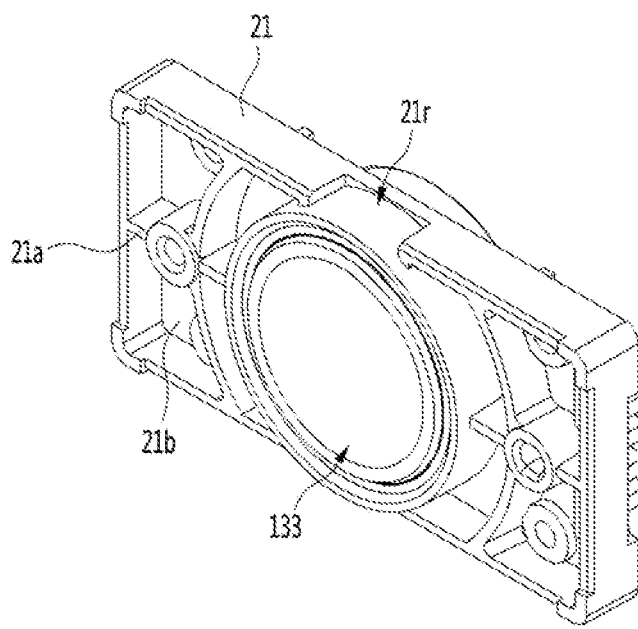
【FIG. 10】
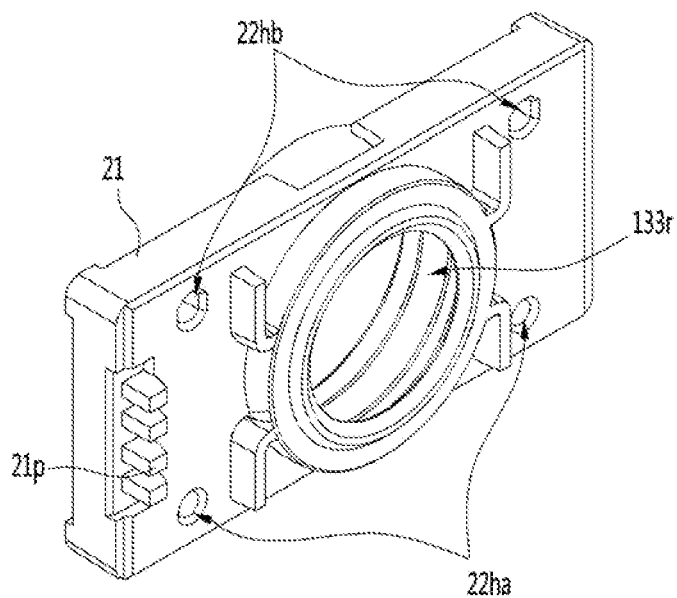

[FIG. 11a]
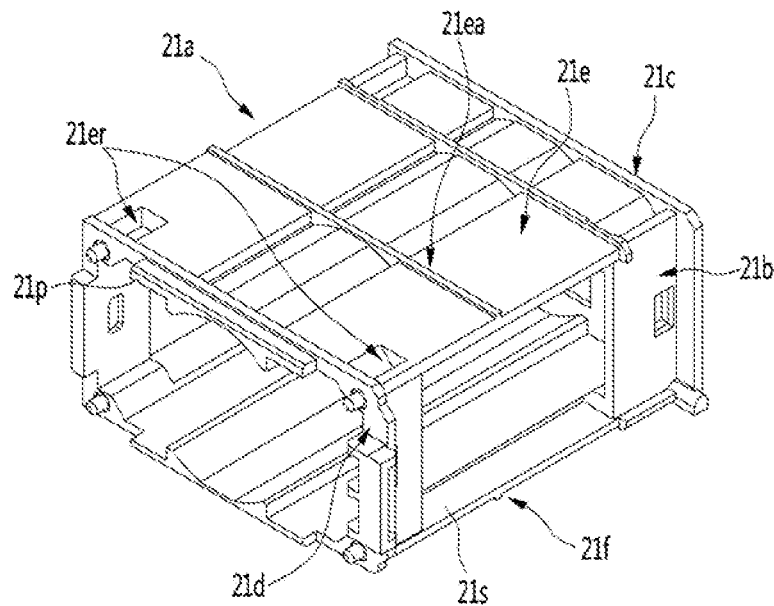
[FIG. 11b]
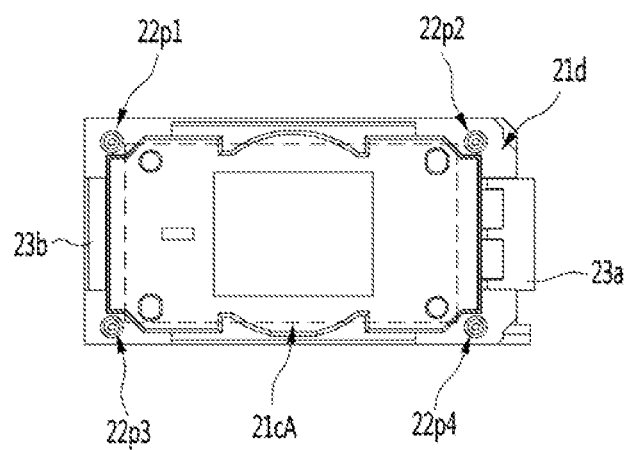

[FIG. 12]
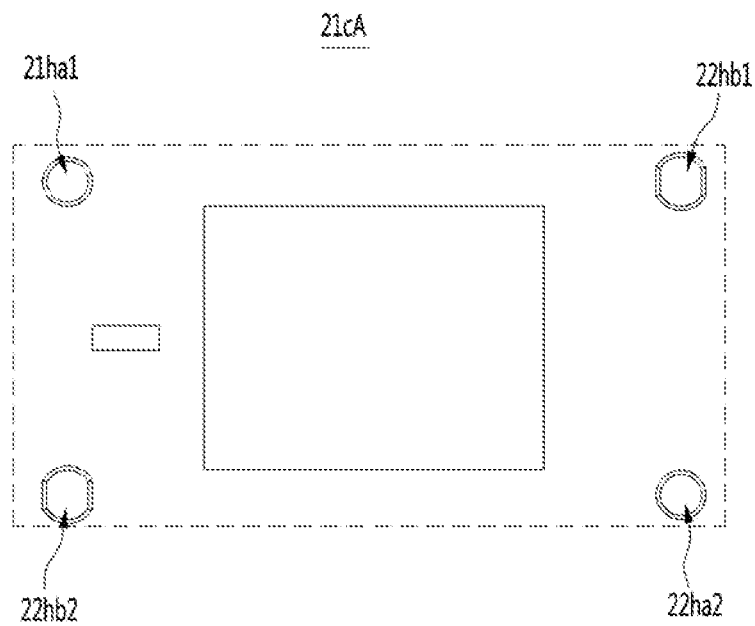
[FIG. 13a]
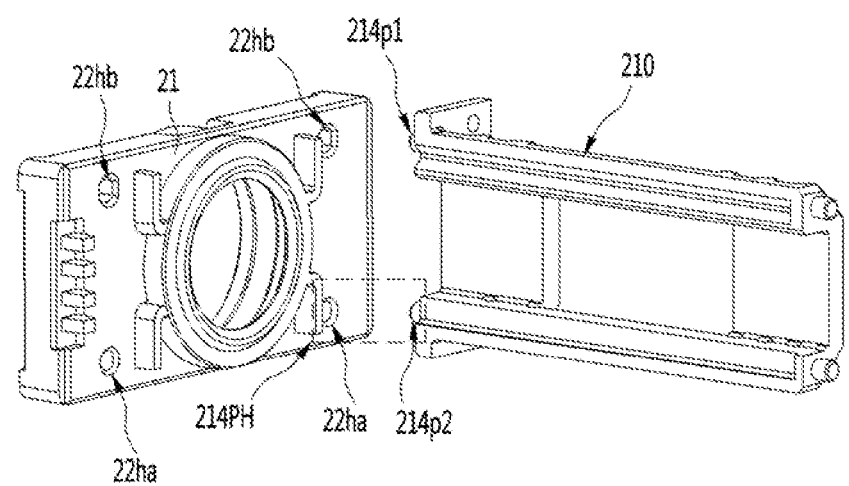

[FIG. 13b]
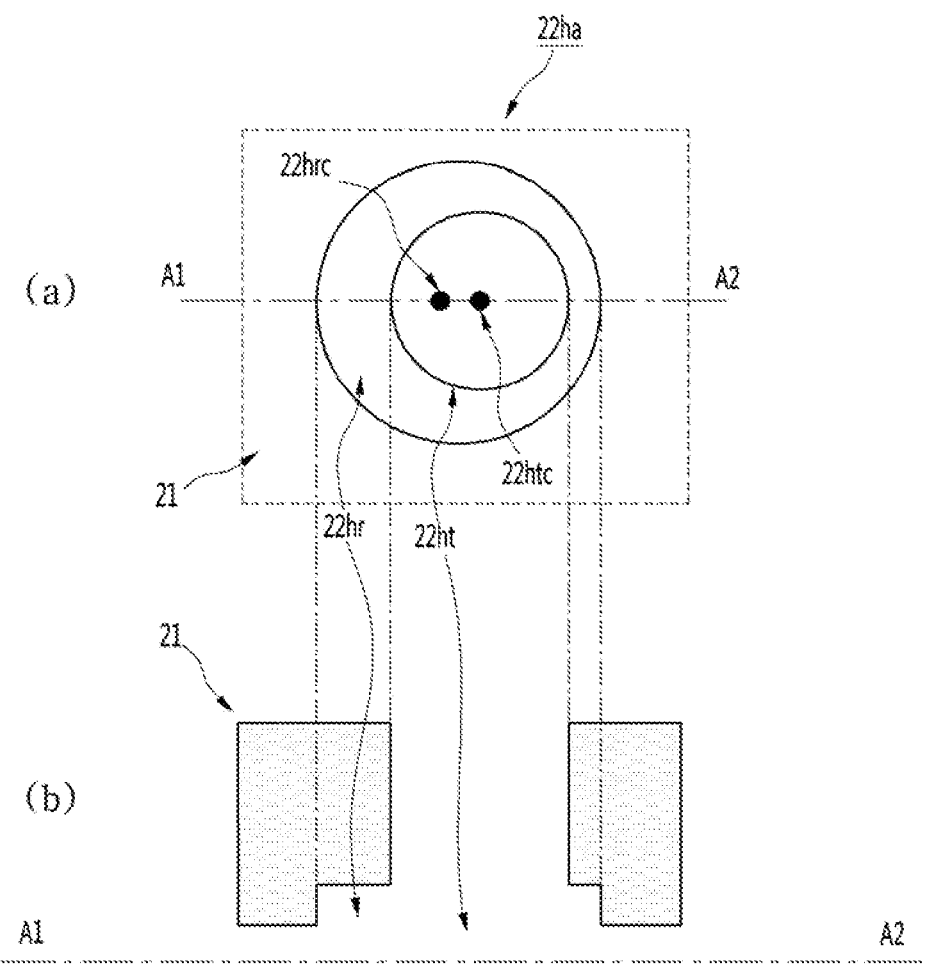

[FIG. 13c]
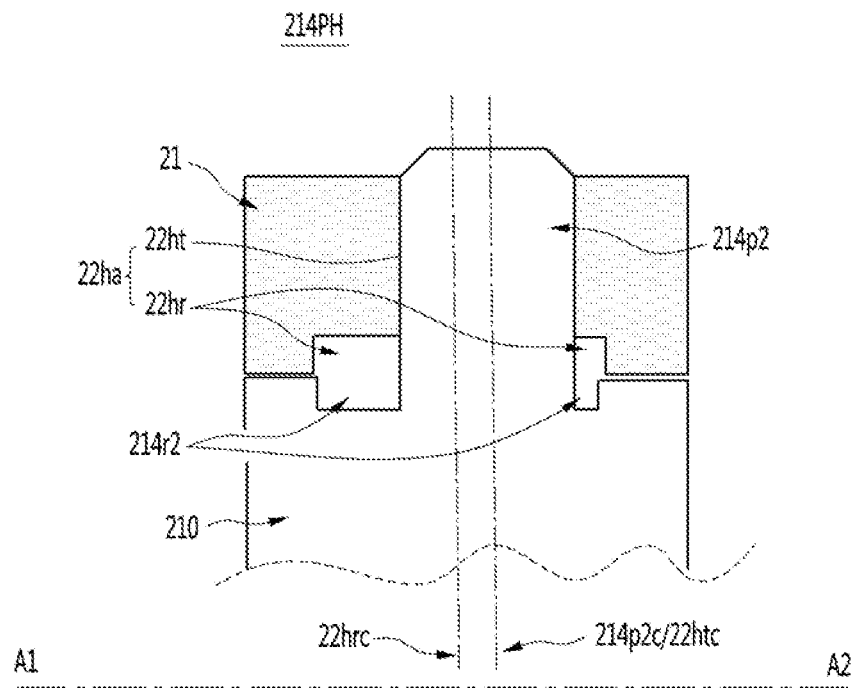
[FIG. 14a]
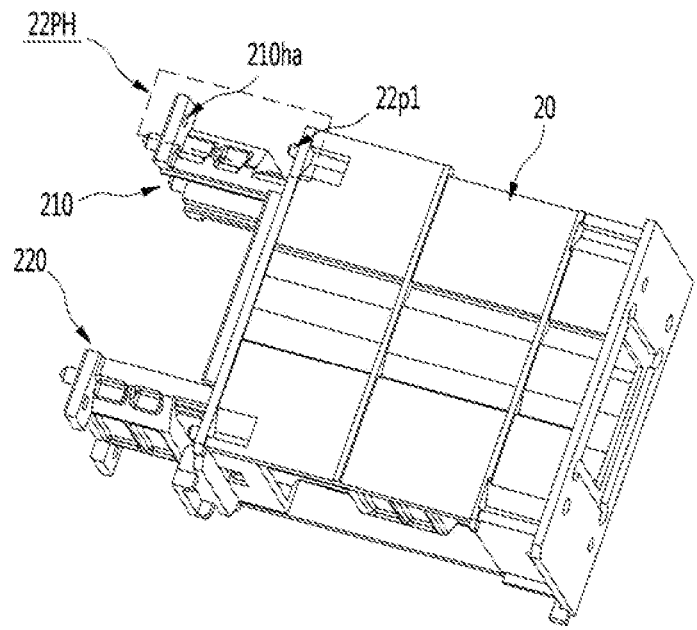

[FIG. 14b]
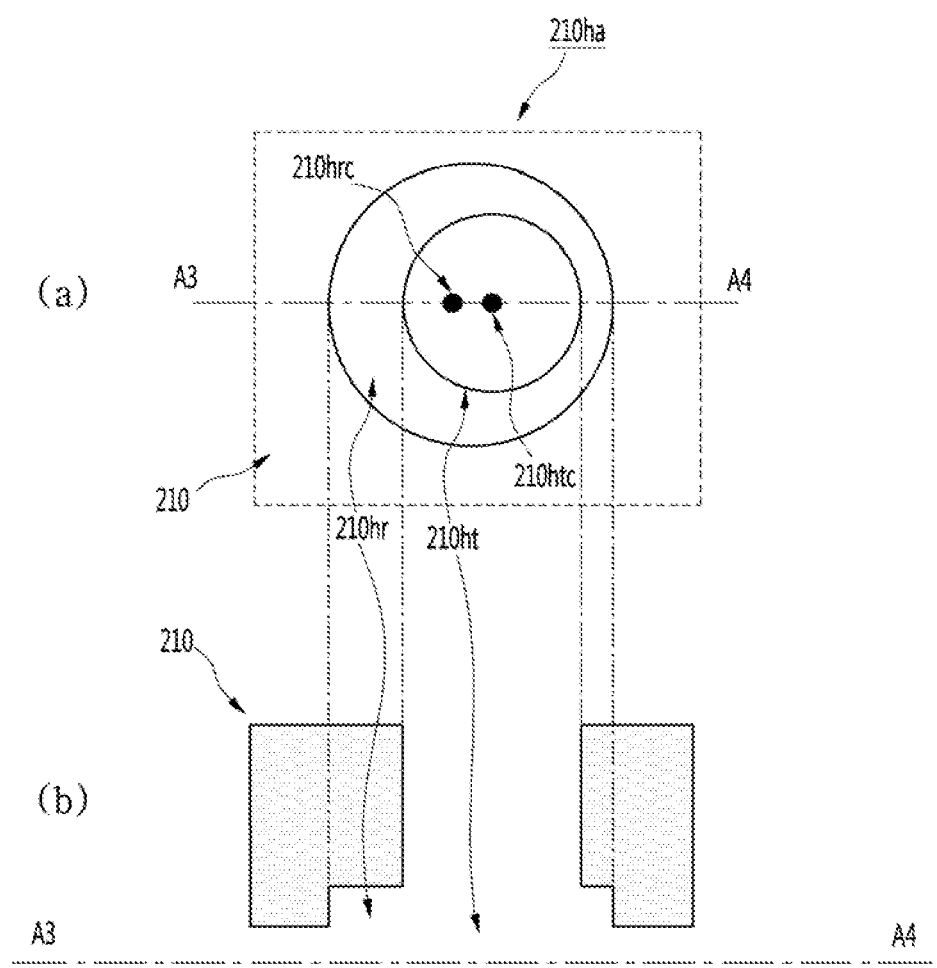

[FIG. 14c]
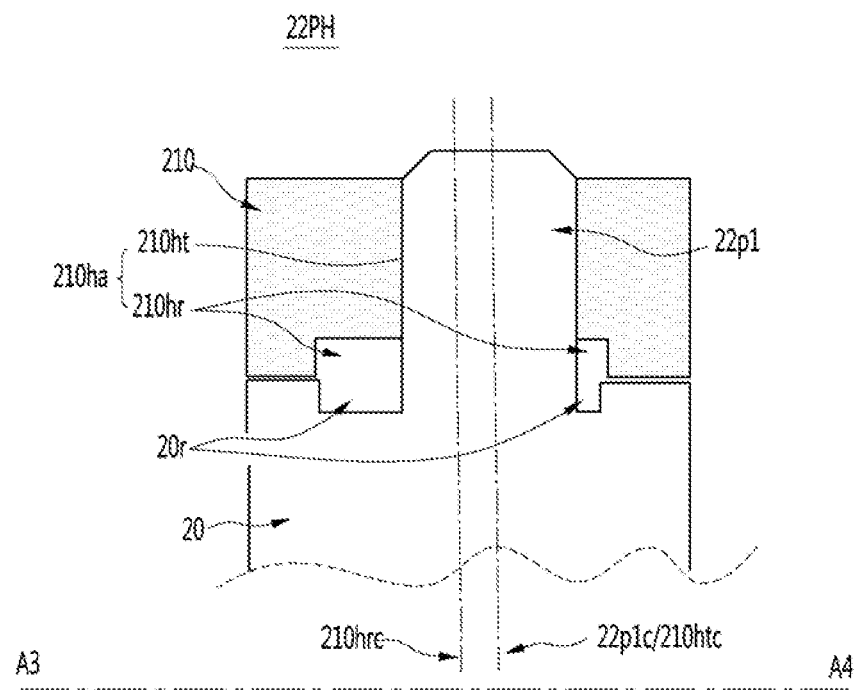

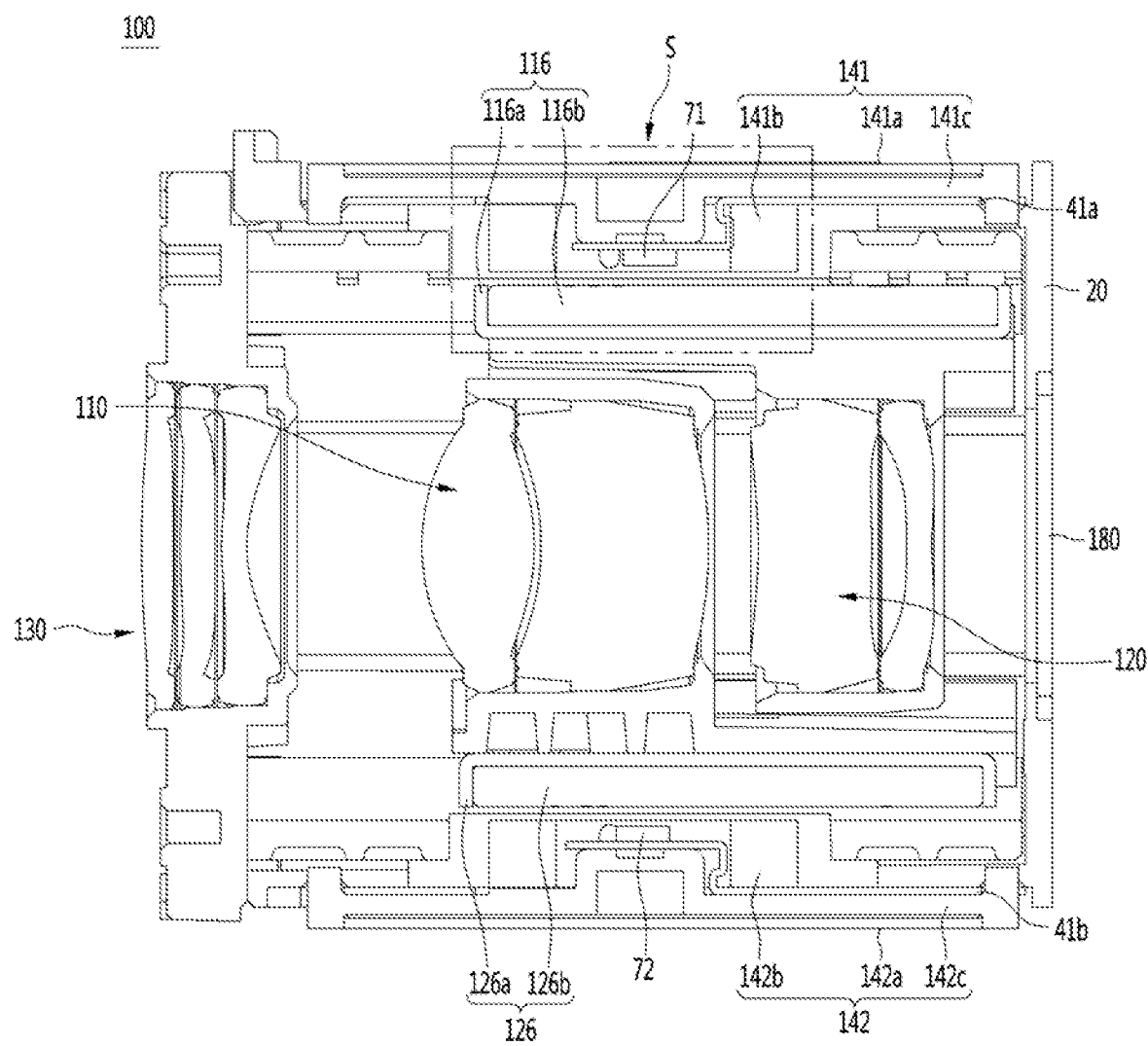
[FIG. 15a]

[FIG. 15b]
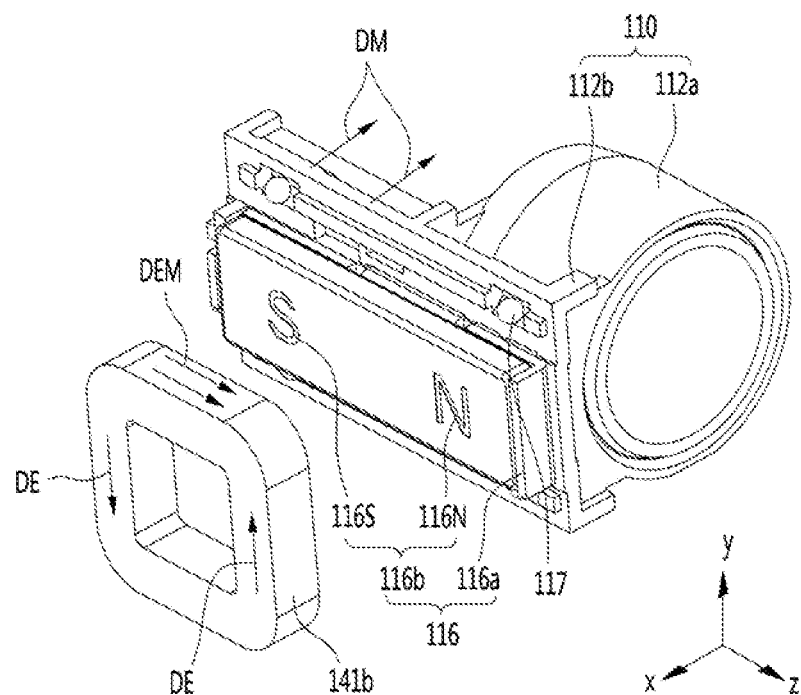
[FIG. 16a]
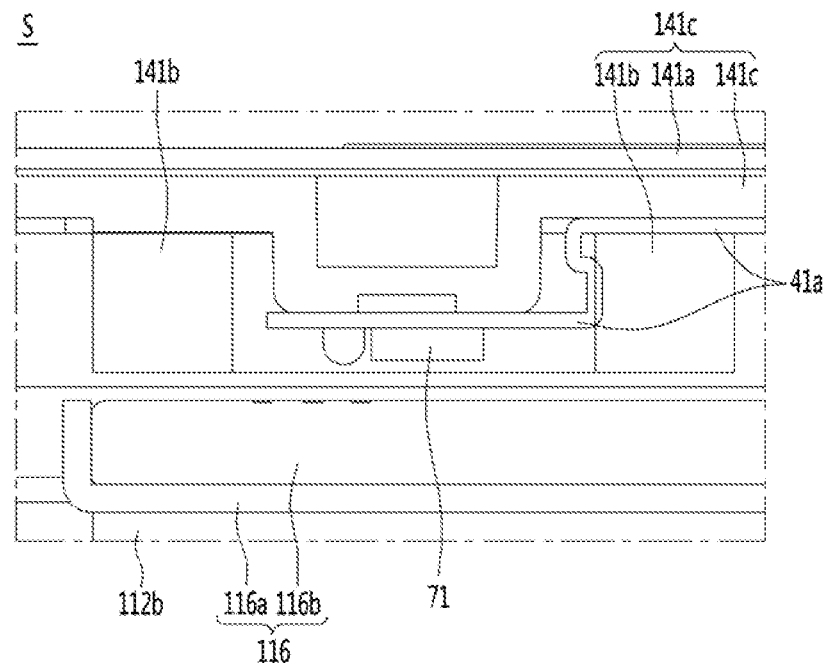

[FIG. 16b]
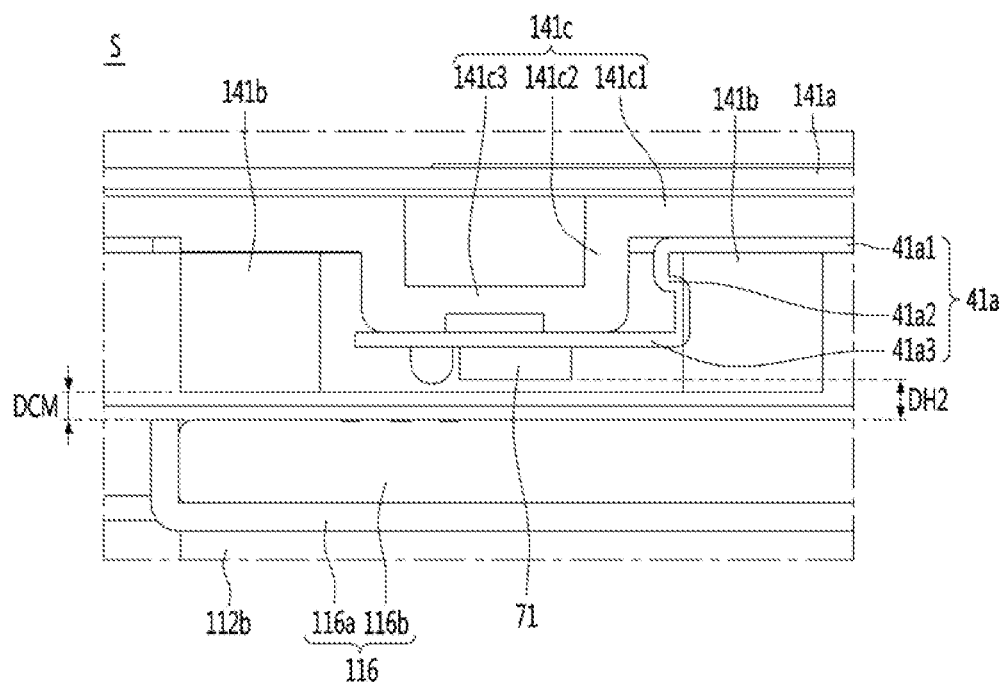
[FIG. 16c]
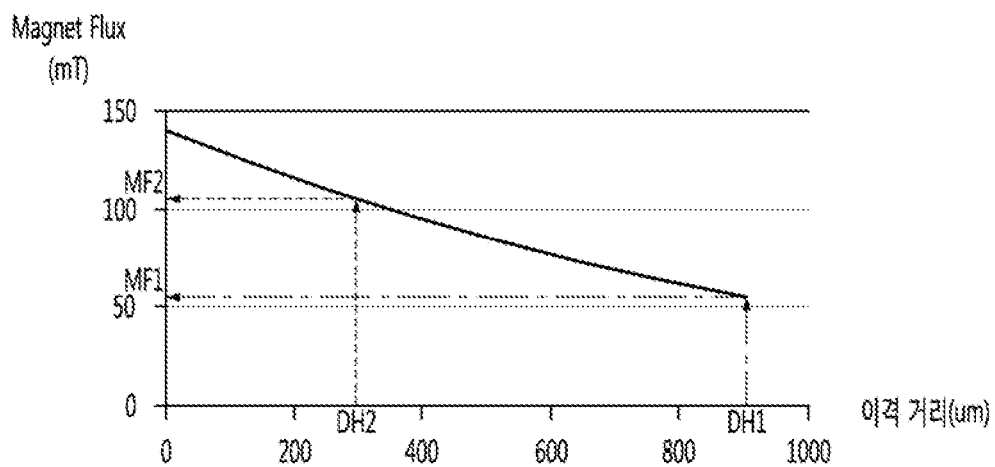

[FIG. 17a]
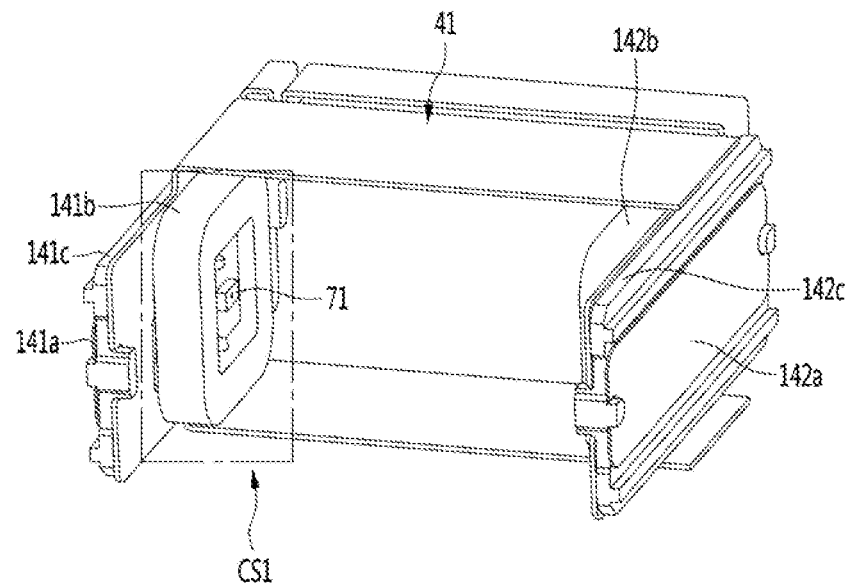
[FIG. 17b]
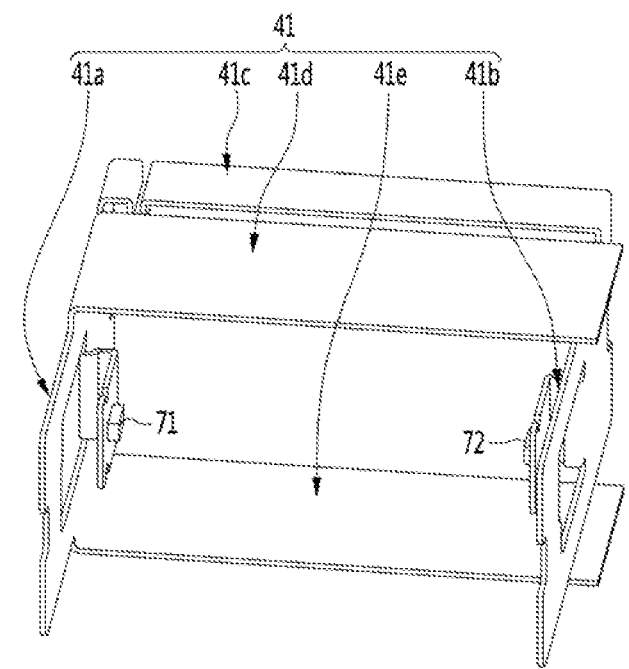

【FIG. 17c】
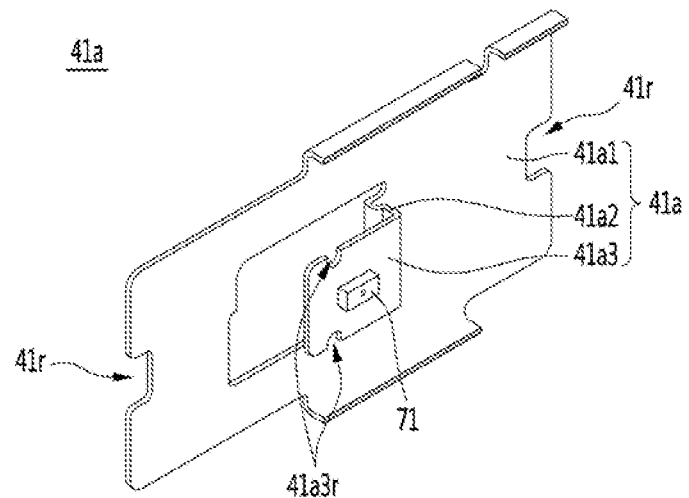
【FIG. 17d】
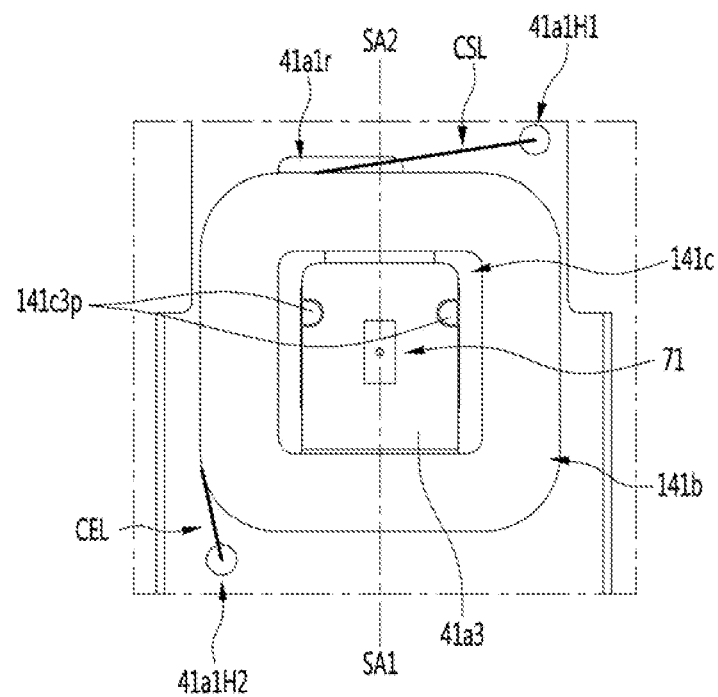

【FIG. 17e】
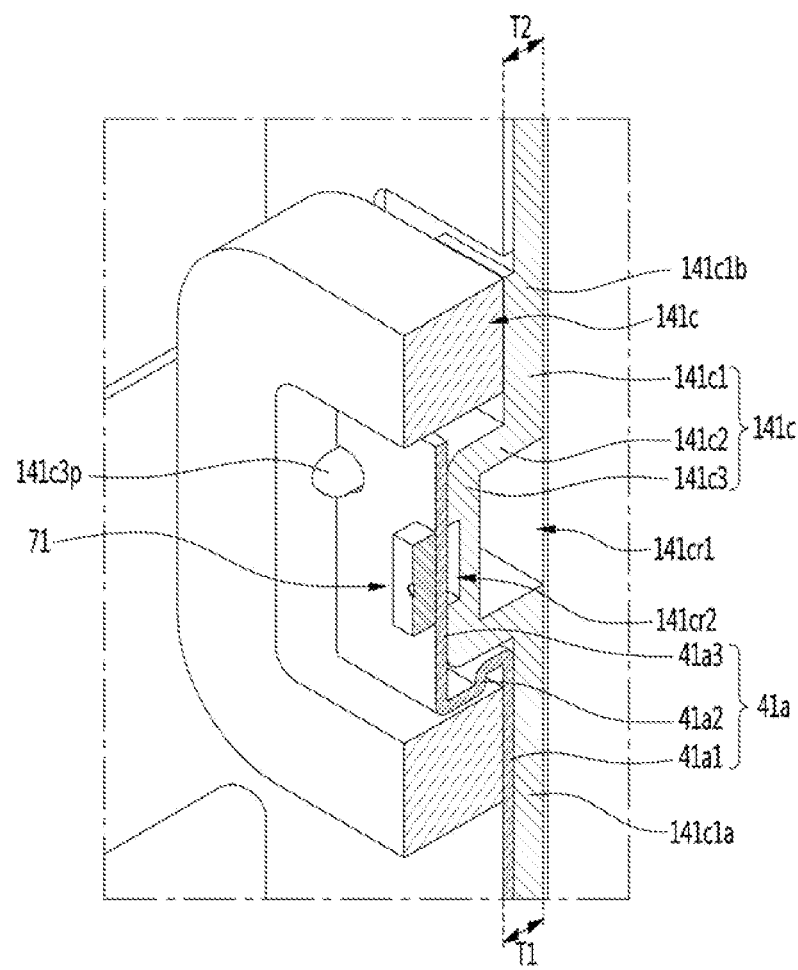

[FIG. 17f]
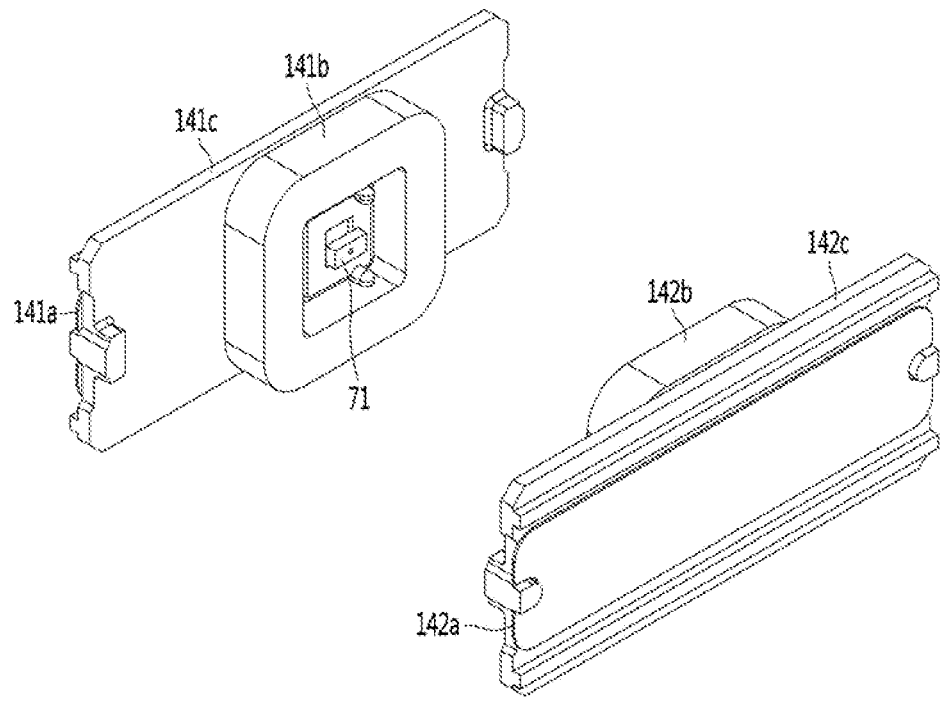
[FIG. 17g]
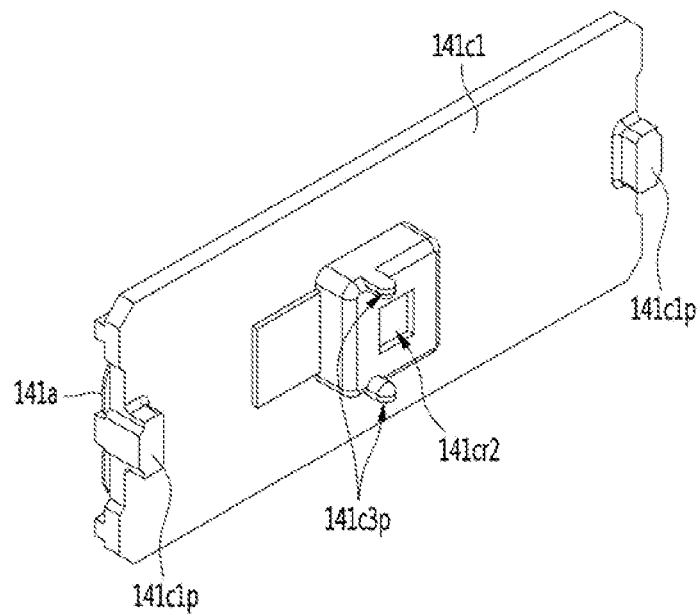

【FIG. 17h】
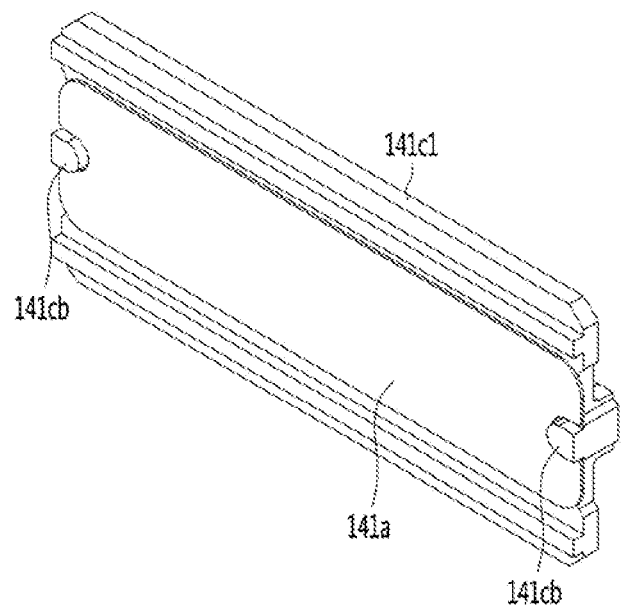
【FIG. 18a】
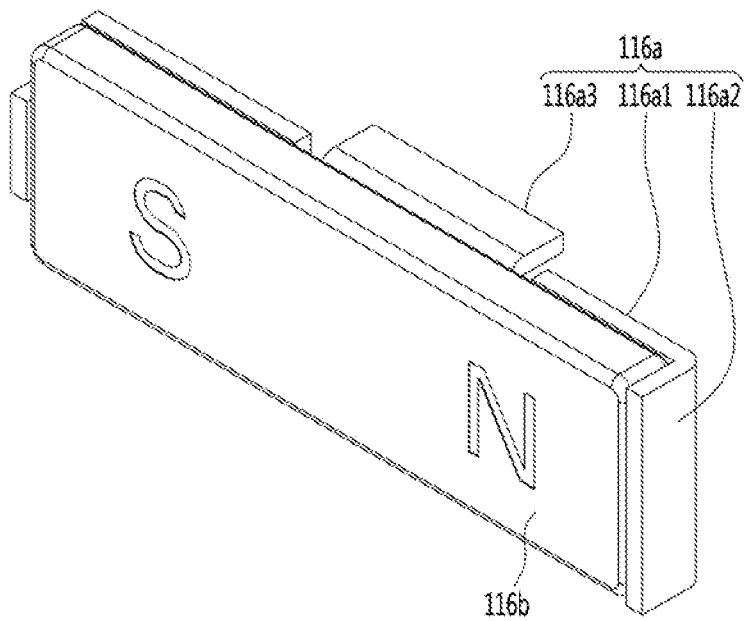

[FIG. 18b]
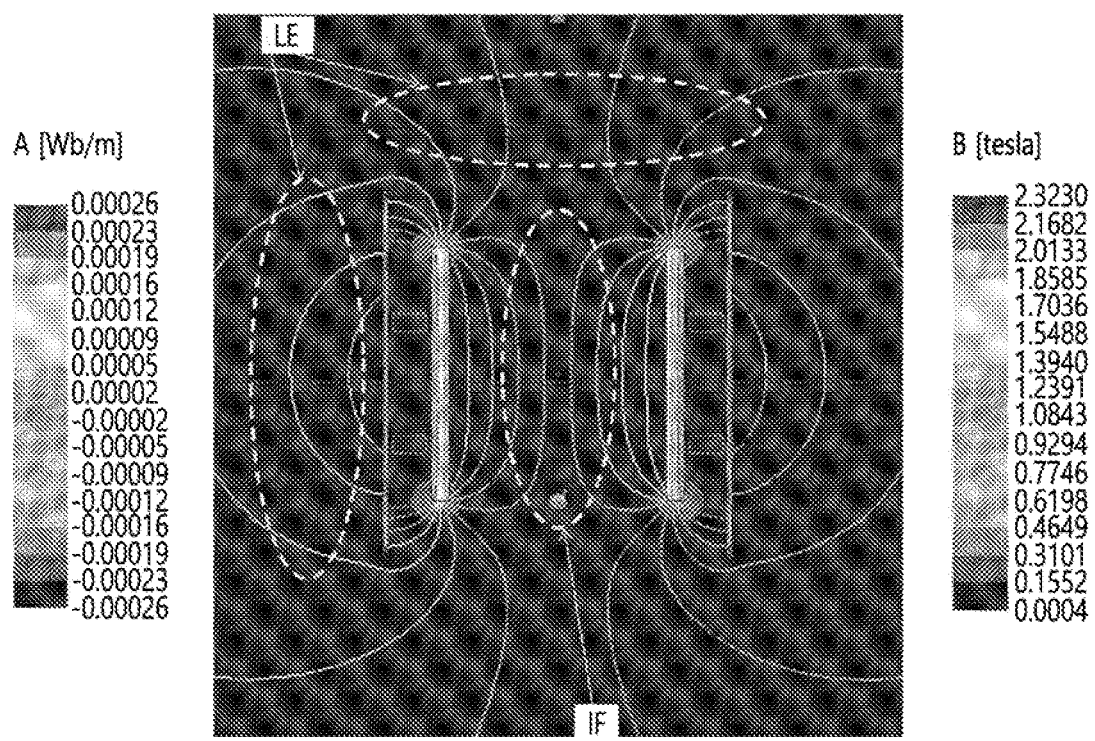

[FIG. 18c]
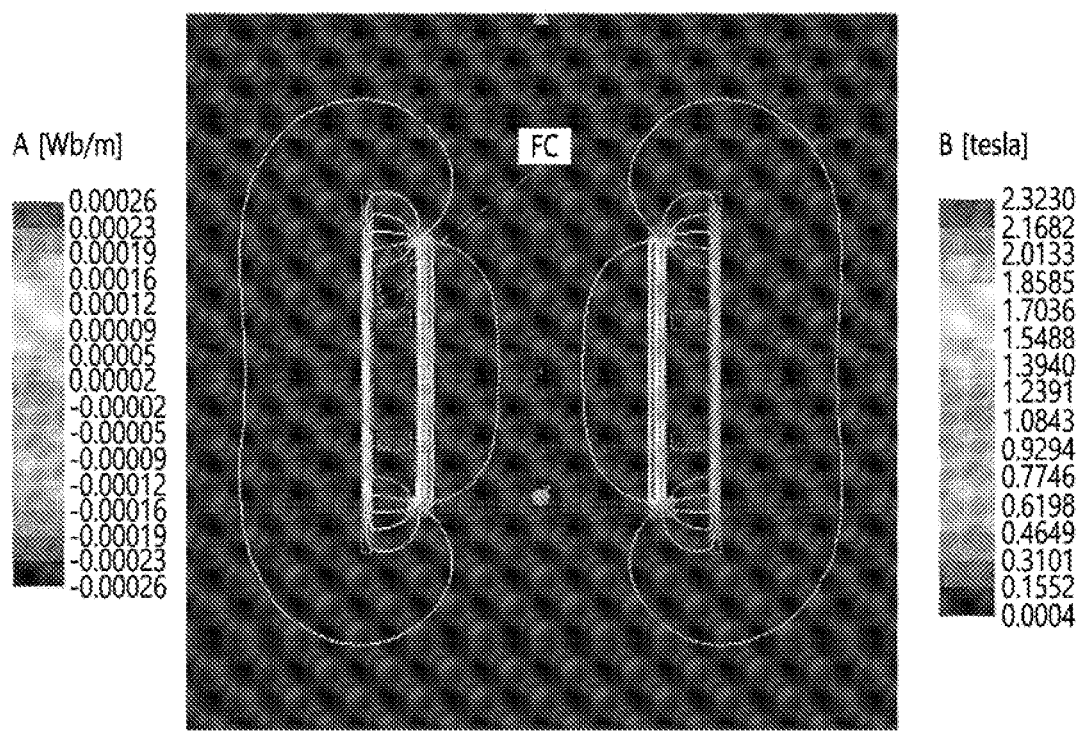
[FIG. 18d]
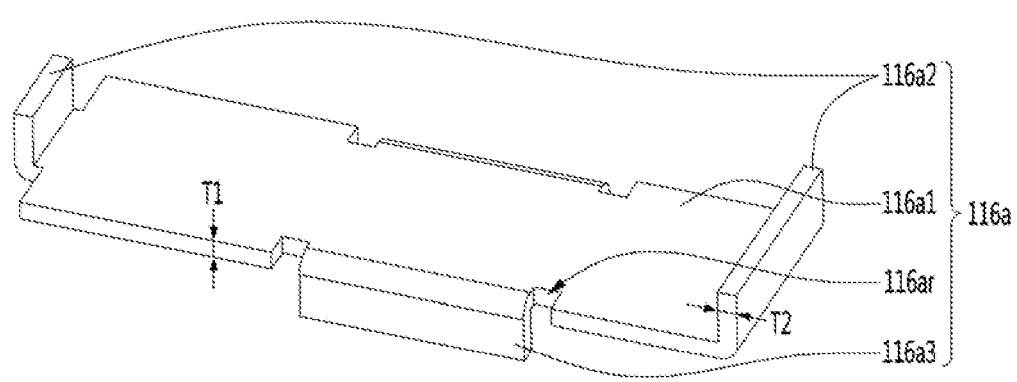

[FIG. 18e]
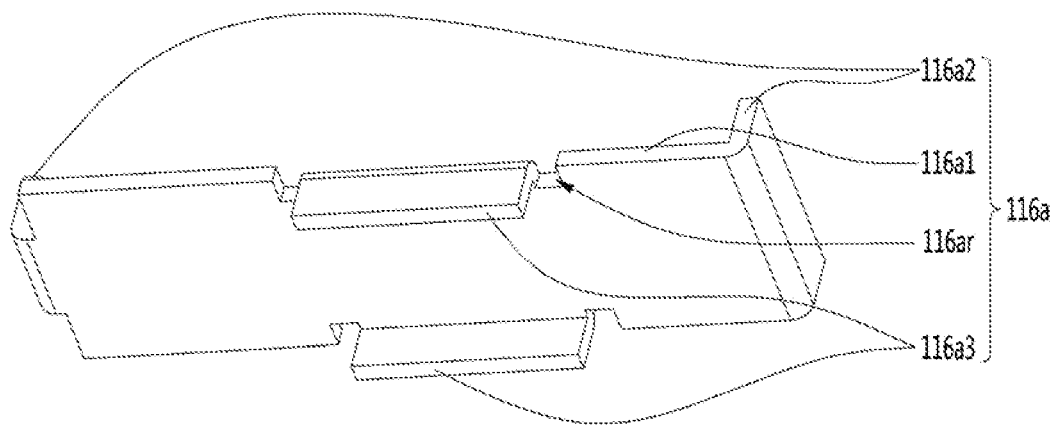
[FIG. 18f]
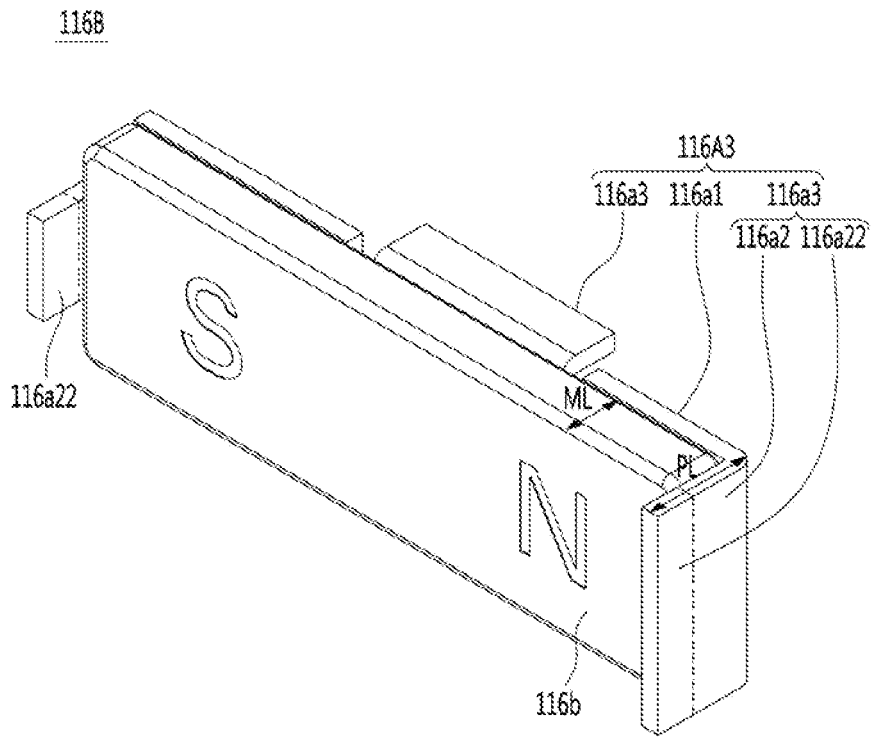

[FIG. 18g]
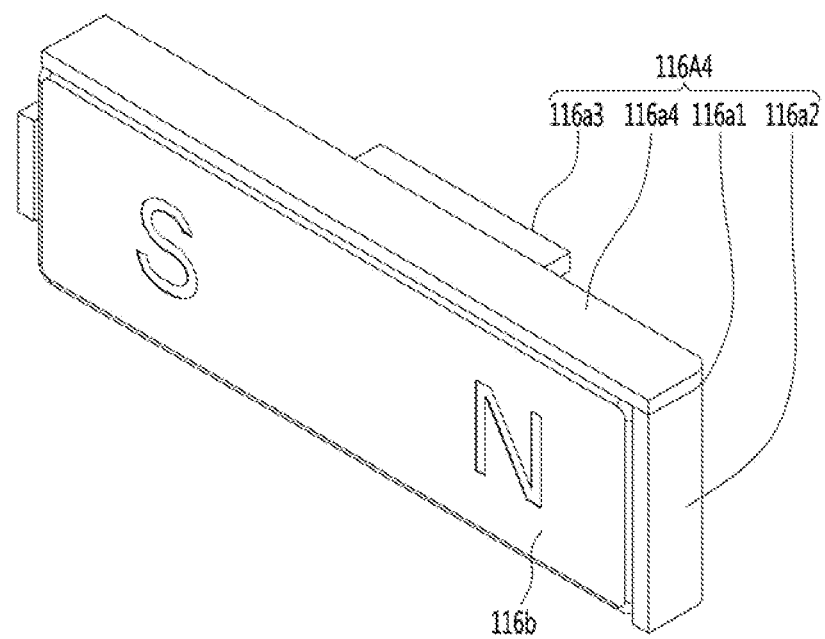
[FIG. 19]
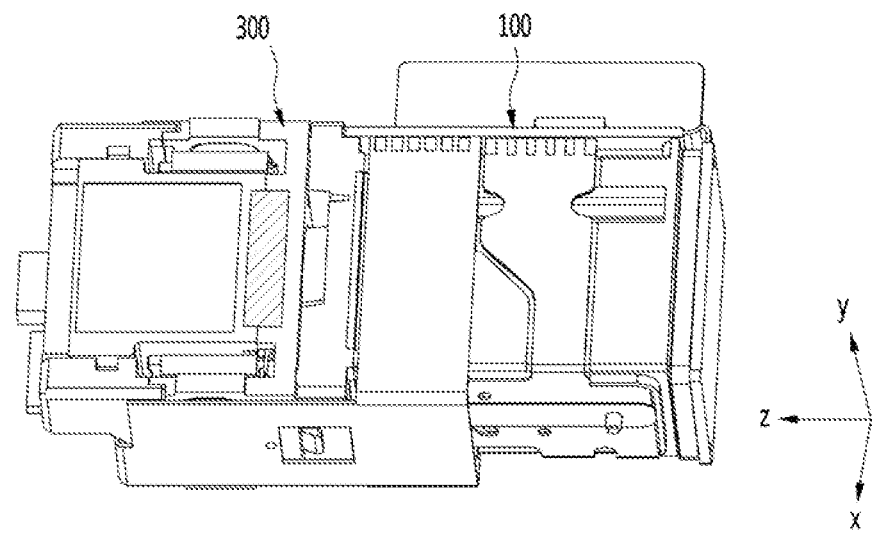

[FIG. 20a]
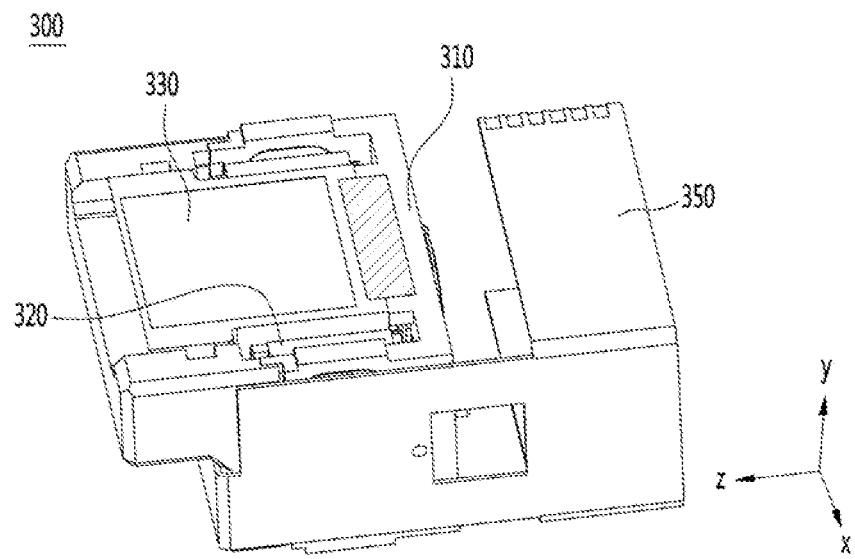
[FIG. 20b]
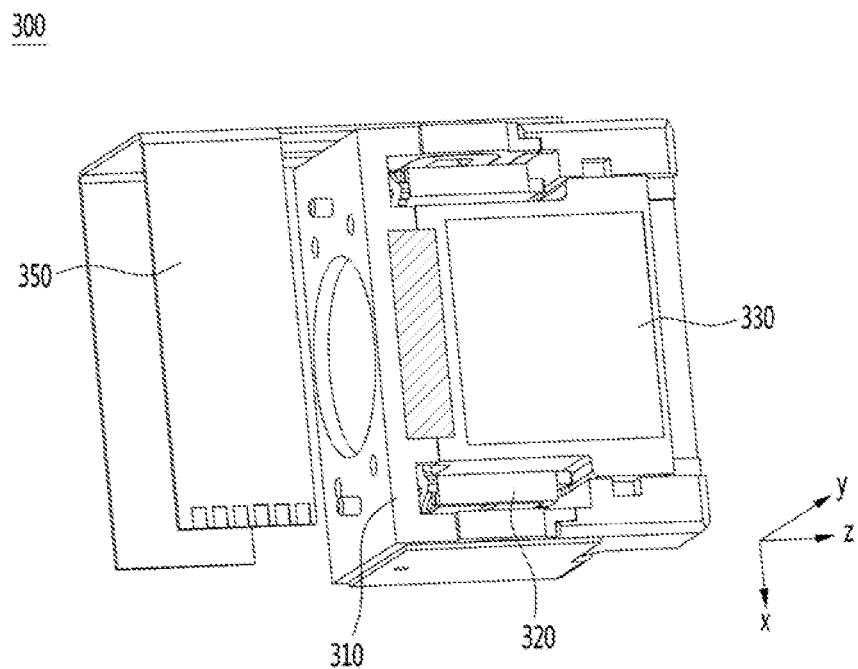

[FIG. 21a]
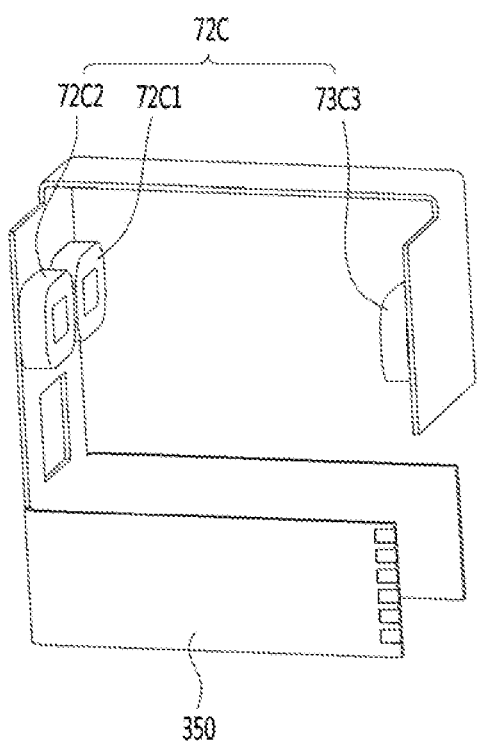

【FIG. 21b】
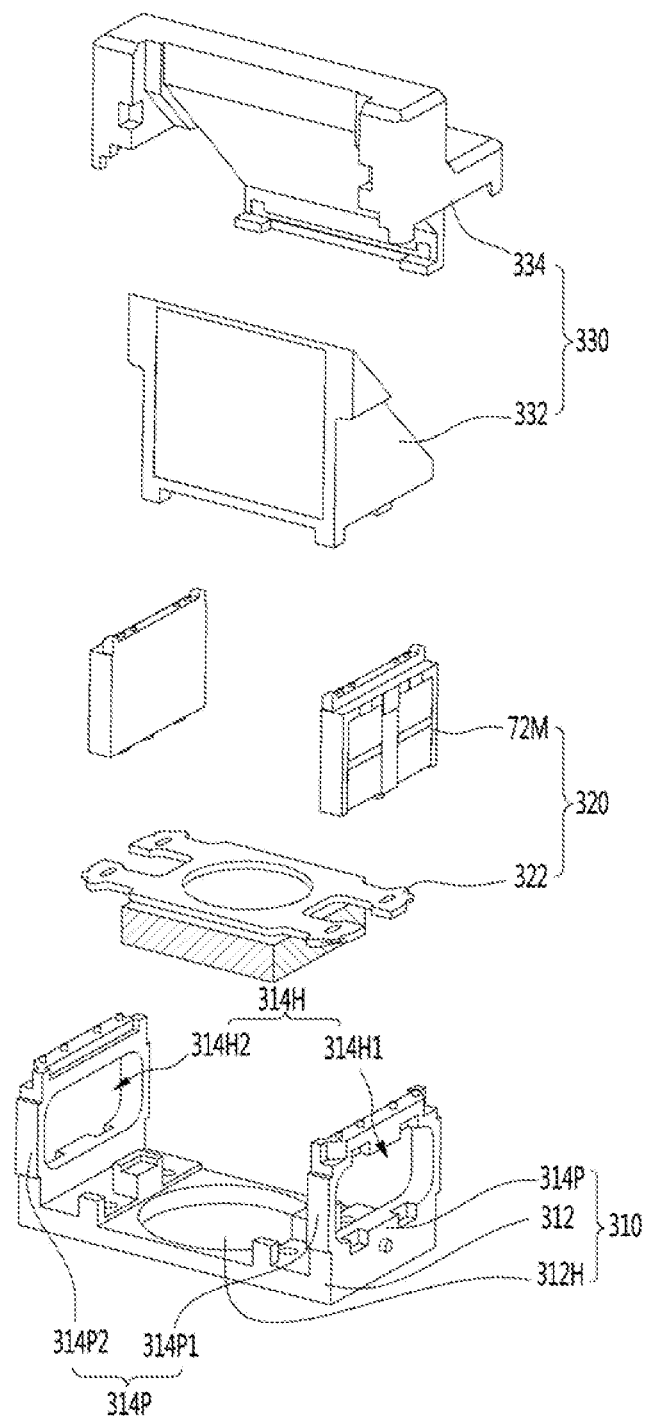

[FIG. 21c]
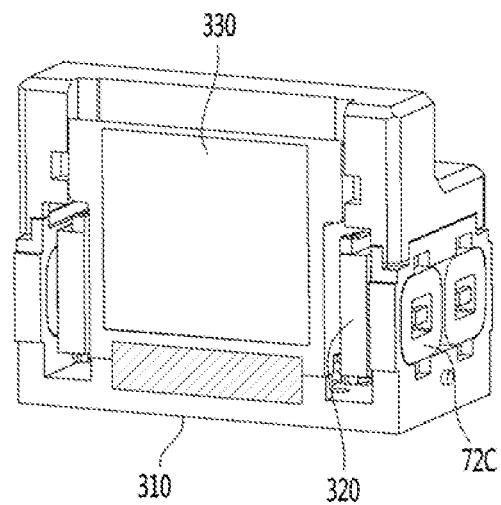
[FIG. 22a]
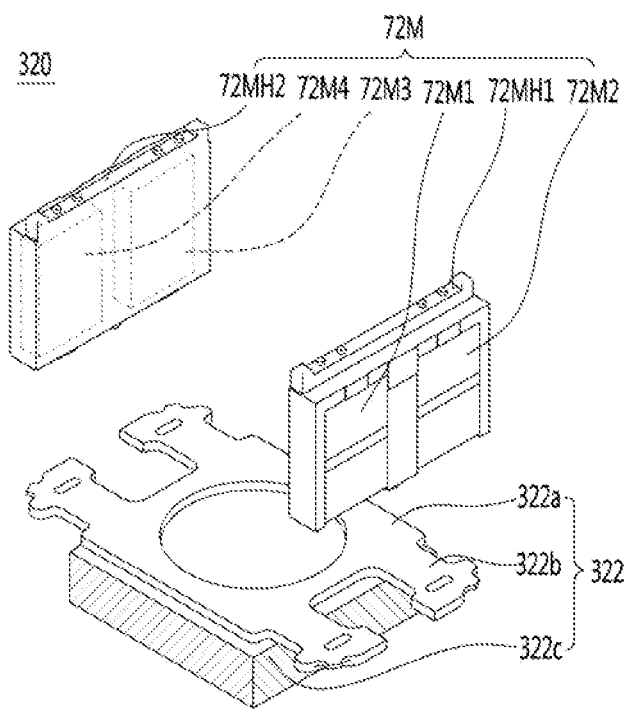

[FIG. 22b]
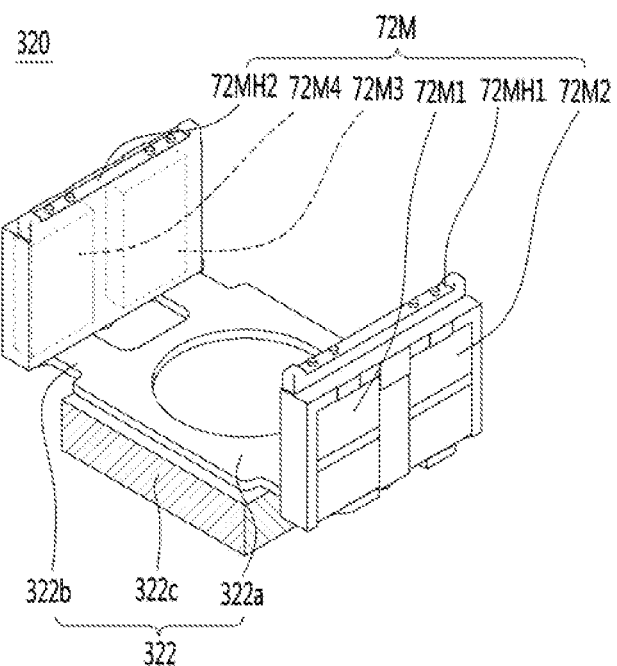
[FIG. 22c]
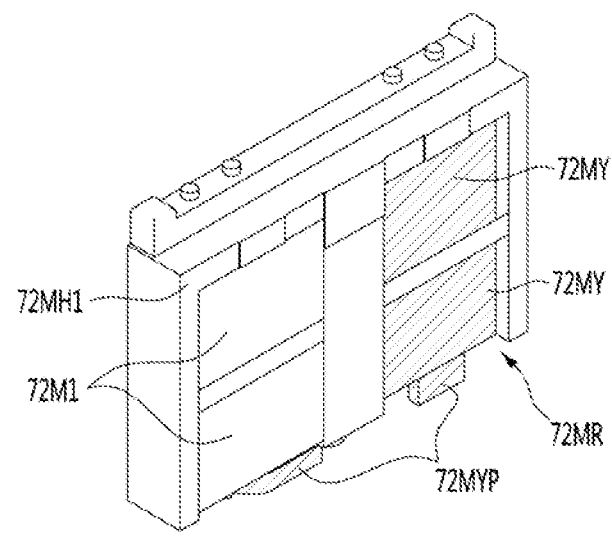

[FIG. 23]
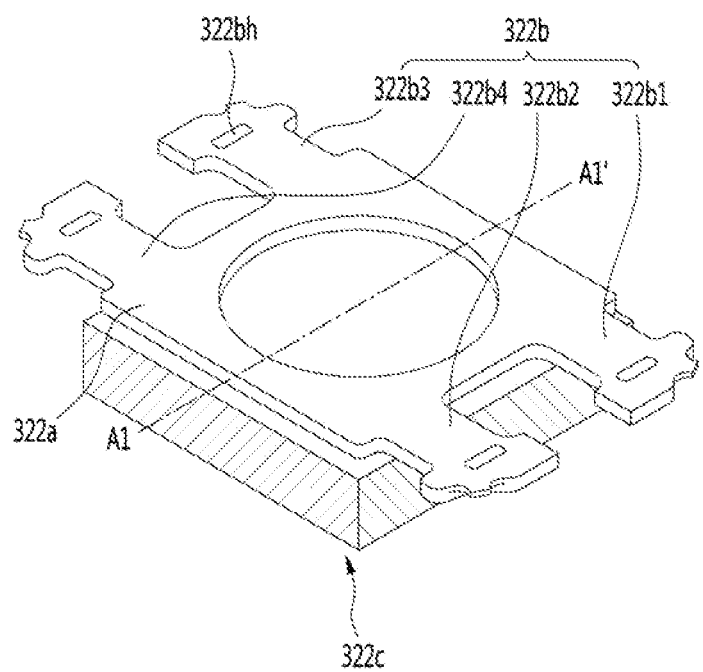
[FIG. 24]
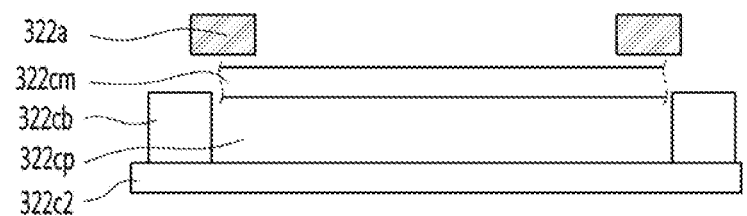

[FIG. 25a]
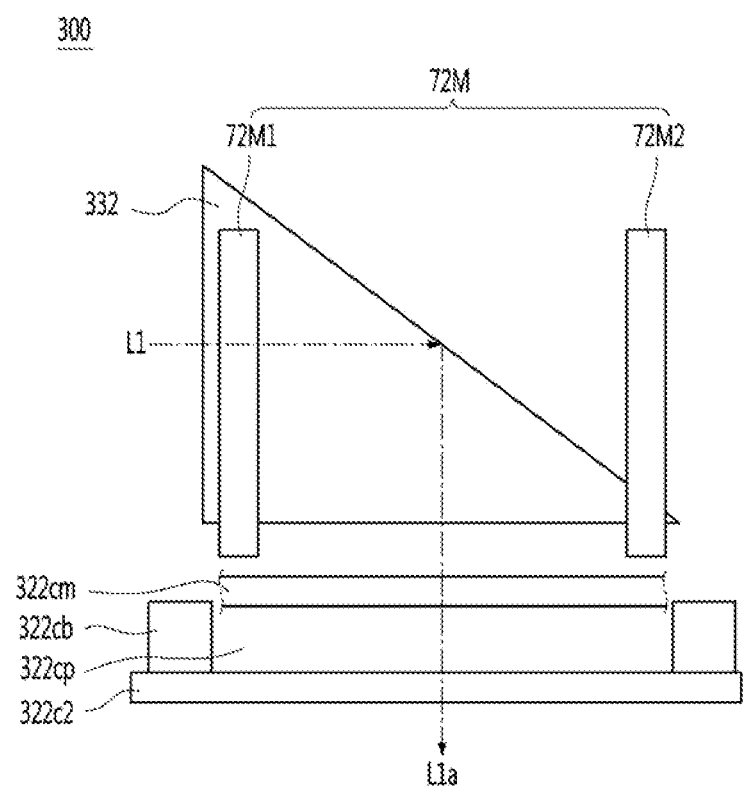

[FIG. 25b]
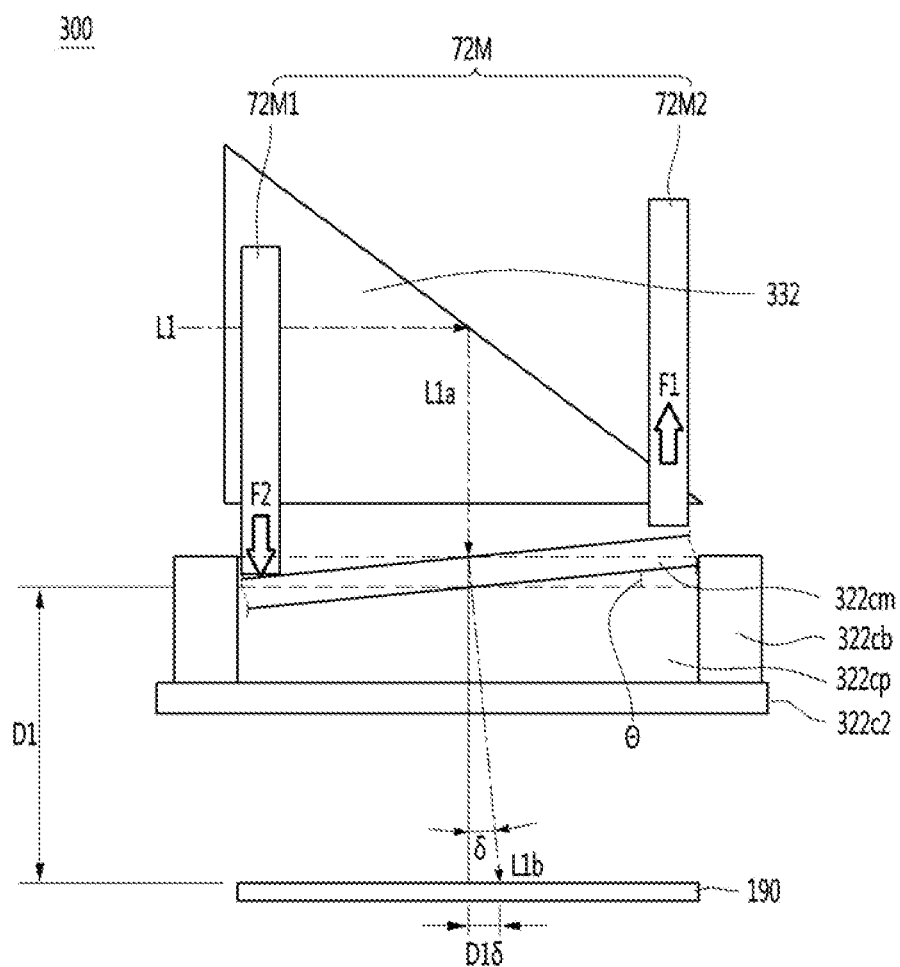

[FIG. 26]
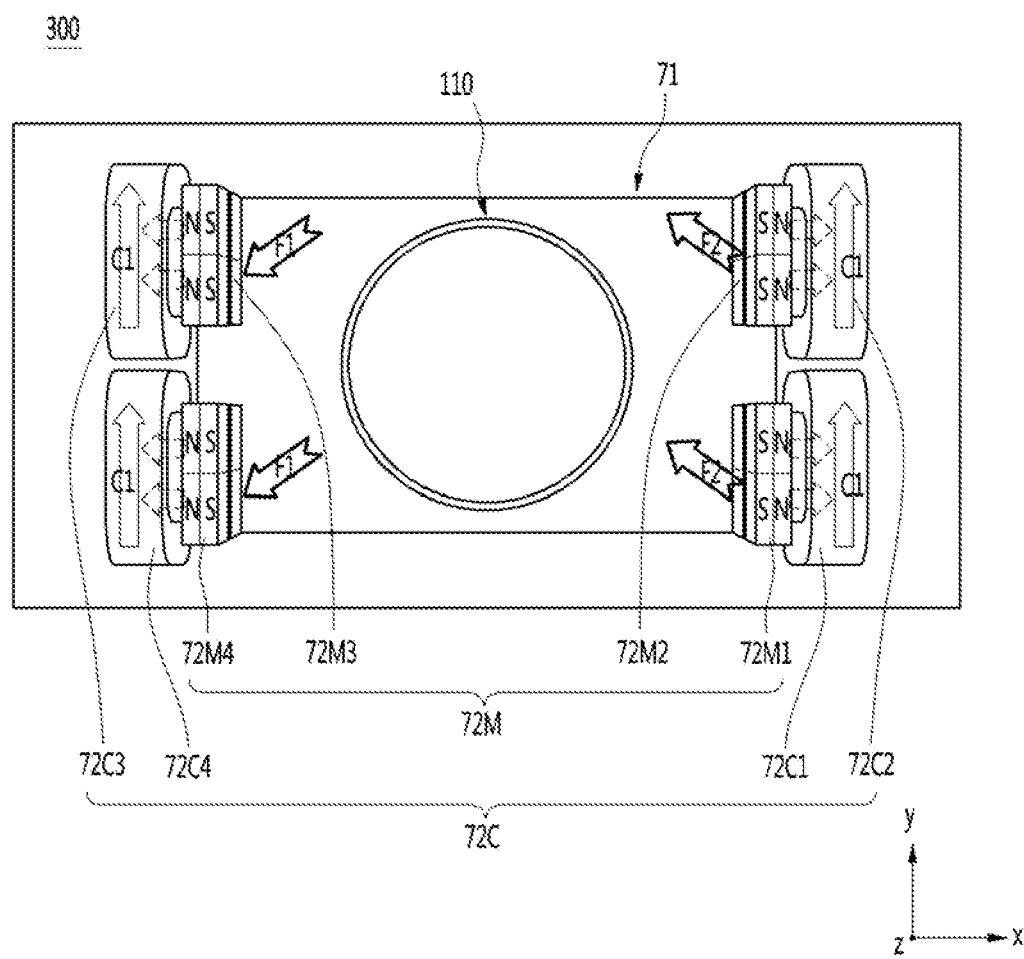

[FIG. 27]
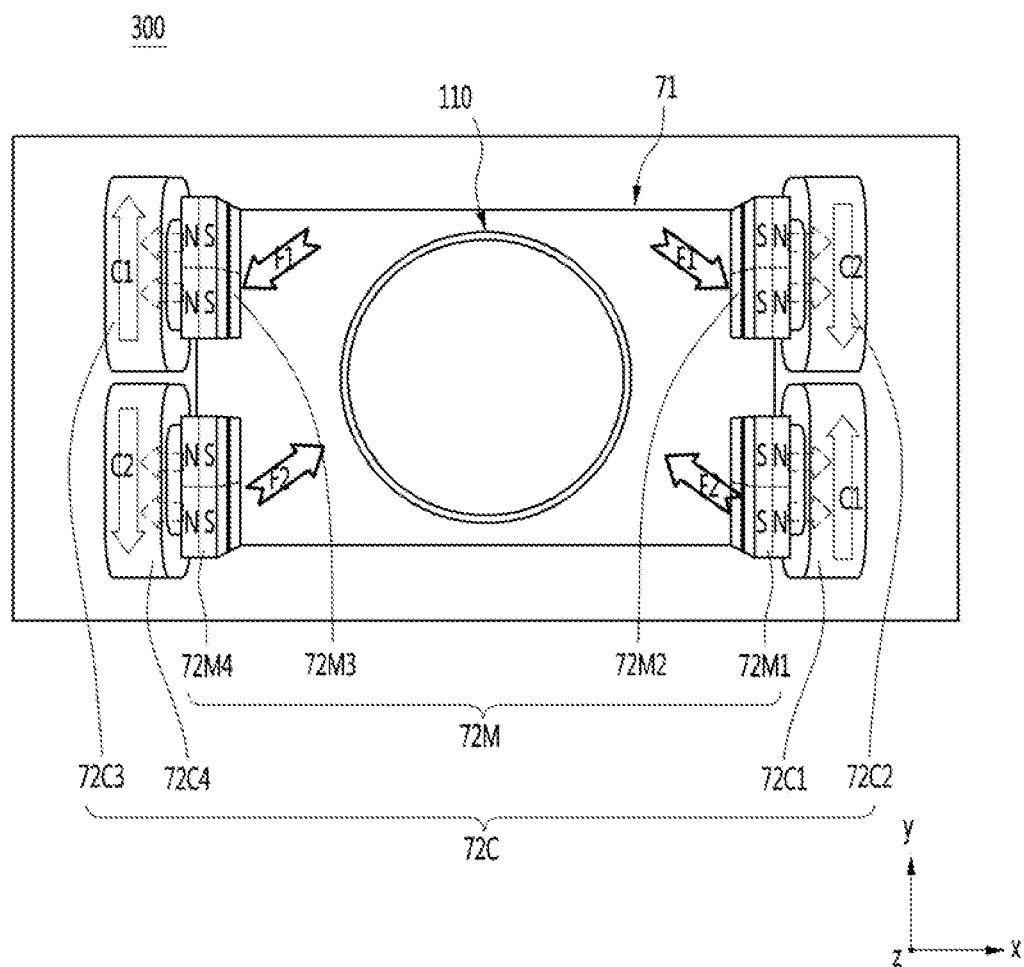

【FIG. 28】
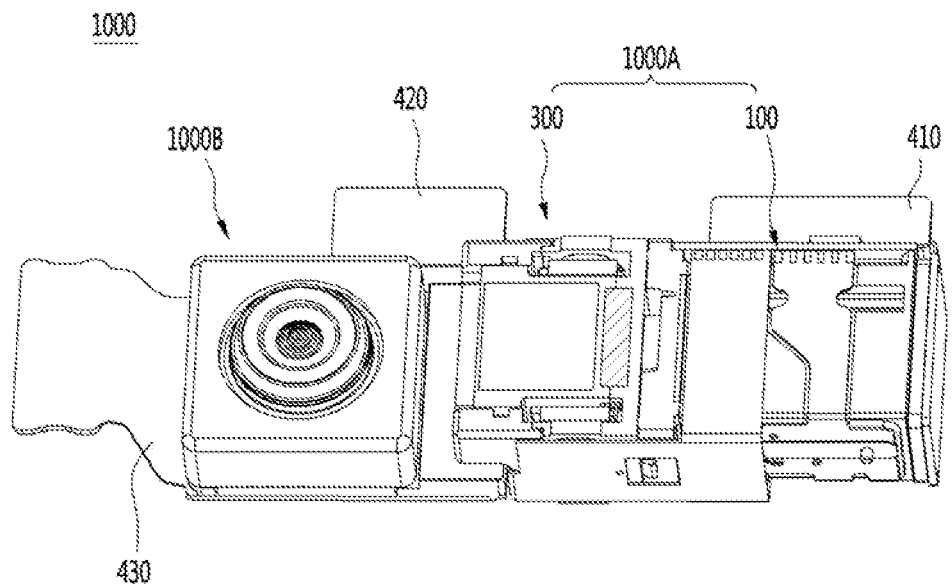
【FIG. 29】
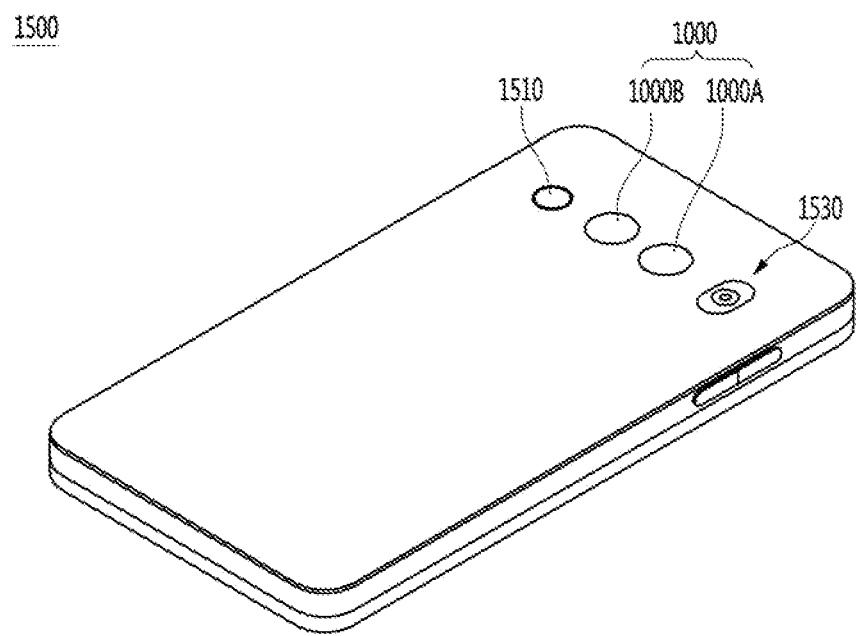

[FIG. 30]
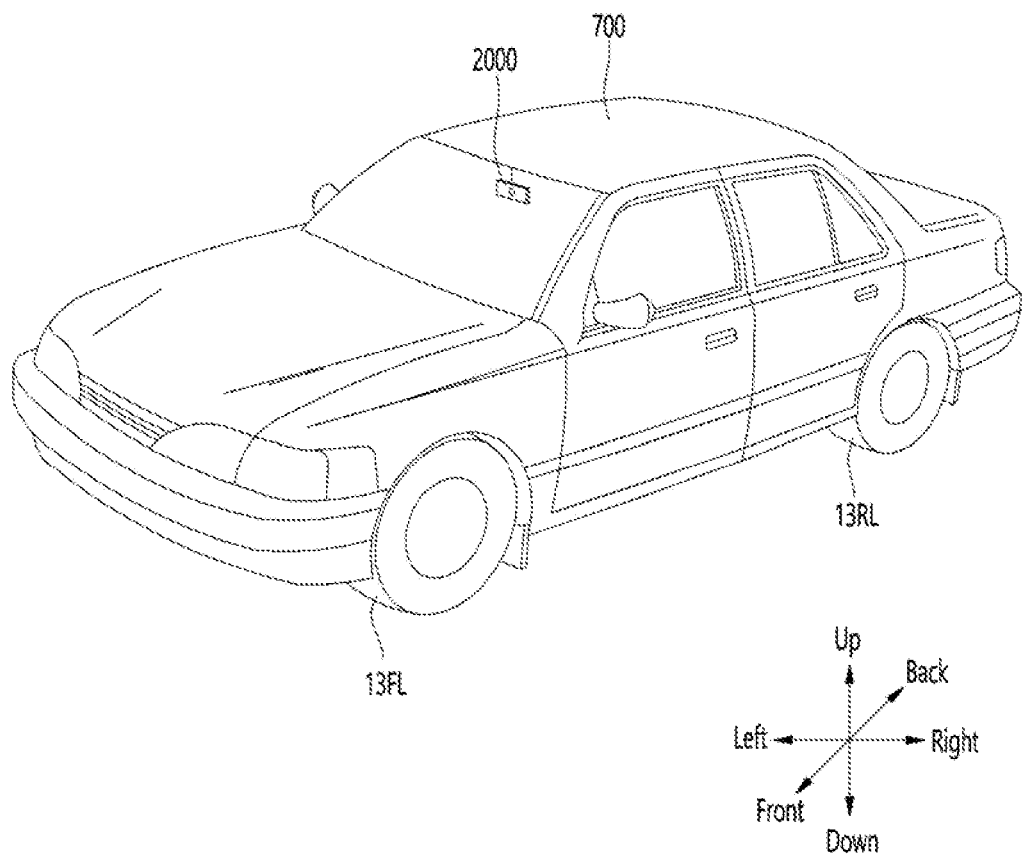

CAMERA MODULE AND CAMERA APPARATUS INCLUDING SAME

CROSS REFERENCE TO RELATED APPLICATIONS

This application is the National Phase of PCT International Application No. PCT/KR2020/006119, filed on May 8, 2020, which claims priority under 35 U.S.C. 119(a) to Patent Application No. 10-2019-0054805, filed in the Republic of Korea on May 10, 2019, all of which are hereby expressly incorporated by reference into the present application.

TECHNICAL FIELD

An embodiment relates to a camera module and a camera device including the same.

BACKGROUND ART

A camera module performs a function of photographing a subject and storing it as an image or a moving image, and is mounted on a mobile terminal such as a mobile phone, a laptop a drone, a vehicle, and the like.

Meanwhile, an ultra-small camera module is built into a portable device such as a smartphone, a tablet PC, and a notebook, and such a camera module may perform an autofocus (AF) function adjusting automatically a distance between an image sensor and a lens to adjust a focal length of the lens.

In addition, recently, a camera module may perform a zooming function of zooming up or zooming out photographing a subject by increasing or decreasing a magnification of a long-distance subject through a zoom lens.

Further, recently, a camera module adopts an image stabilization (IS) technology to correct or prevent image shake caused by camera movement due to an unstable fixing device or user movement.

Such an image stabilization (IS) technology includes an optical image stabilizer (OIS) technology and an image stabilization technology using an image sensor.

The OIS technology is a technology that corrects movement by changing a light path, and the image stabilization technology using the image sensor is a technology that corrects movement by mechanical and electronic methods, but the OIS technology is often used.

In addition, a camera module for a vehicle is a product for transmitting images around a vehicle or inside a vehicle to a display, and may be mainly used for a parking assistance system and a traveling assistance system.

In addition, the camera module for the vehicle detects a lane, a vehicle, and the like around the vehicle, collects, and transmits related data, and thus it is possible to warn from an ECU or control the vehicle.

Meanwhile, a zoom actuator is used for a zooming function of a camera module, but frictional torque is generated when a lens is moved by mechanical movement of the actuator, and there are technical problems such as a decrease in driving force, an increase in power consumption, or a deterioration in control characteristics due to the friction torque.

Specifically, in order to achieve the best optical characteristics by using a plurality of zoom lens groups in a camera module, an alignment between the plurality of lens groups and an alignment between the plurality of lens groups and an image sensor should be well matched, but when a decentering in which a spherical center between the lens groups deviates from an optical axis, a tilt which is a phenomenon of lens tilt, or a phenomenon in which central axes of the lens groups and the image sensor are not aligned occurs, an angle of view changes or defocus occurs, which adversely affects image quality or resolution.

Meanwhile, when increasing a separation distance in a region in which friction occurs in order to reduce a friction torque resistance while moving a lens for a zooming function in a camera module, there is a contradiction in technical problems in which a lens decentering or a lens tilt are deepened when zoom movement or reversal of the zoom movement is performed.

Meanwhile, in an image sensor, as a pixel is higher, a resolution increases and a size of the pixel becomes smaller, and when the size of the pixel becomes smaller, an amount of light received at the same time will be reduced. Therefore, in a darker environment, in a high-pixel camera, image shake due to camera shake that occurs while a shutter speed is slower occurs more seriously.

Accordingly, recently, an OIS function has been indispensable for photographing an image without deformation using a high-pixel camera in dark nights or moving images.

Meanwhile, OIS technology is a method to correct image quality by changing an optical path by moving a lens or an image sensor of a camera. In particular, in the OIS technology, movement of the camera is sensed through a gyro sensor, and a distance that the lens or the image sensor should move based on the movement is calculated.

For example, an OIS correction method includes a lens moving method and a module tilting method. In the lens moving method, only a lens in a camera module is moved in order to realign the center of an image sensor and an optical axis. On the other hand, the module tilting method is a method of moving the entire module including the lens and the image sensor.

Specifically, the module tilting method has an advantage that a correction range is wider than that of the lens moving method and a focal length between the lens and the image sensor is fixed, and thus image deformation may be minimized.

Meanwhile, in case of the lens moving method, a hall sensor is used to sense a position and movement of the lens. On the other hand, in the module tilting method, a photo reflector is used to sense movement of the module. However, both methods use a gyro sensor to sense movement of a user of the camera.

An OIS controller uses data recognized by the gyro sensor to predict a position in which the lens or the module should move in order to compensate for movement of a user.

Recently, an ultra-thin and ultra-small camera module is required in accordance with technological trends, but since the ultra-small camera module has a space limitation for OIS drive, there is a problem that it is difficult to implement the OIS function applied to a general large camera, and there is a problem that the ultra-thin and ultra-small camera module cannot be implemented when the OIS drive is applied.

In addition, in the conventional OIS technology, an OIS driver is disposed at a side surface of a solid-state lens assembly within a limited camera module size, and thus there is a problem that it is difficult to secure a sufficient amount of light because a size of a lens to be subjected to OIS is limited.

Specifically, in order to achieve the best optical characteristics in a camera module, an alignment between the lens groups at the time of OIS implementation should be well matched through movement of a lens or tilting of a module, but in the conventional OIS technology, when a decenter in which a spherical center between the lens groups deviates from an optical axis or a tilt which is a phenomenon of lens tilt occurs, there is a problem that adversely affects image quality or resolution.

In addition, the conventional OIS technology may implement AF or Zoom at the same time as OIS driving, but an OIS magnet and an AF or Zoom magnet are disposed close to each other due to space limitation of a camera module and a position of a driving part of the conventional OIS technology, and cause a magnetic field interference, and thus there is a problem that the OIS driving is not performed normally, and a decent or a tilt phenomenon is induced.

Further, in the conventional OIS technology, since a mechanical driving device is required for moving the lens or tilting the module, there is a problem that a structure is complicated and power consumption is increased.

Meanwhile, as described above, a camera module is applied to vehicles together with a radar, and may be used for an advanced driver assistance system (ADAS), which may greatly affect the safety and life of drivers and pedestrians as well as convenience for the driver.

For example, an advanced driver assistance system (ADAS) include an autonomous emergency braking system (AEB) that reduces speed or stops by itself even if a driver does not step on a brake in an event of a collision, a lane keep assist system (LKAS) that maintains a lane by controlling a traveling direction when leaving the lane, an advanced smart cruise control (ASCC) that maintains a distance from a vehicle ahead while running at a predetermined speed, an active blind spot detection system (ABSD) that detects the danger of blind spot collision and helps to change to a safe lane, and an around view monitor system (AVM) that visually displays a situation around a vehicle.

In such an advanced driver assistance system (ADAS), a camera module functions as a core component together with a radar and the like, and a portion in which the camera module is applied is gradually increasing.

For example, in case of an autonomous emergency braking system (AEB), a vehicle or a pedestrian in front of a vehicle is detected by a camera sensor and a radar sensor in front of the vehicle, so that emergency braking may be automatically performed when a driver does not control the vehicle.

Alternatively, in case of a lane keep assist system (LKAS), it detects through a camera sensor whether a driver leaves a lane without operating a turn signal, and automatically steers a steering wheel, so that it may control to maintain the lane.

In case of an around view monitor system (AVM), it may display visually a situation around a vehicle through a camera sensor disposed on four sides of the vehicle.

When a camera module is applied to an advanced driver assistance system (ADAS) of a vehicle, OIS technology is more important due to vibration of the vehicle, and a precision of OIS data may be directly related to the safety or life of a driver or pedestrian. In addition, when implementing AF or Zoom, a plurality of lens assemblies are driven by an electromagnetic force between a magnet and a coil, and there is a problem that a magnetic field interference occurs between magnets mounted in each lens assembly. There is a problem that AF or Zoom driving is not performed normally, and thrust is deteriorated due to such a magnetic field interference between magnets.

In addition, there is a problem that a decenter or tilt phenomenon due to a magnetic field interference between magnets is induced.

When an issue in a precision in camera control occurs or thrust is deteriorated due to such a magnetic field interference, or a decent or tilt phenomenon is induced, it may be directly related to the safety or life of a driver who is a user, or a pedestrian.

In addition, when detachment of each component of a camera module, for example, a magnet or the like, occurs in an environment in which vibration is severe such as a vehicle, it may cause not only mechanical reliability but also large problems such as thrust, precision, and control.

Meanwhile, in the related art, a Hall sensor is disposed inside the winding of the coil to detect a change in magnetic flux of a predetermined magnet mounted on the moving lens housing to detect the position of the lens housing. However, when the Hall sensor is positioned inside the coil, the distance between the Hall sensor and the magnet is determined by the height of the coil.

However, in the related art, there is a driving force required for the movement of the moving lens housing, and in order to secure this driving force, the height of the coil is required to be higher than a predetermined height.

However, when the height of the coil is increased in this way, since the magnetic flux of the magnet is blocked by the coil, there is a technical contradiction in which the sensitivity of the Hall sensor disposed inside the coil is weakened. According to the unpublished internal technology of the applicant, in order to solve this problem, the optimum point of the sensitivity and driving force of the Hall sensor is set by a coil of an appropriate height.

Meanwhile, contents described in items merely provide background information of the present disclosure and do not constitute the related art.

DISCLOSURE

Technical Problem

One of technical problems of embodiments is to provide a camera actuator capable of preventing generation of friction torque when moving a lens by zooming in a camera module, and a camera module including the same.

In addition, one of the technical problems of the embodiments is to provide a camera actuator capable of preventing a lens decentering, a lens tilt, or occurrence of a phenomenon that a center axis of an image sensor does not coincide with a center of a lens during a lens shift through zooming in a camera module, and the camera module including the same.

In addition, one of the technical problems of the embodiments is to provide an ultra-thin and ultra-small camera actuator and a camera module including the same.

In addition, one of the technical problems of the embodiments is to provide a camera actuator that may secure a sufficient amount of light by eliminating lens size limitation of an optical system lens assembly when OIS is implemented, and a camera module including the same.

In addition, one of the technical problems of the embodiments is to provide a camera actuator capable of achieving the best optical characteristics and a camera module including the same by minimizing occurrence of a decenter or tilt phenomenon when the OIS is implemented.

In addition, one of the technical problems of the embodiments is to provide a camera actuator capable of simultaneously increasing the sensitivity of the hall sensor while increasing the driving force and a camera module including the same.

In addition, one of the technical problems of the embodiments is to provide a camera actuator capable of preventing a magnetic field interference with an AF or Zoom magnet when the OIS is implemented, and a camera module including the same.

In addition, one of the technical problems of the embodiments is, when implementing AF or Zoom, to provide a camera actuator capable of preventing a magnetic field interference between magnets mounted on each lens assembly when a plurality of lens assemblies are driven by an electromagnetic force between a magnet and a coil, and a camera module including the same.

In addition, the embodiment is to provide a camera actuator capable of preventing detachment of a magnet and a yoke, and a camera module including the same.

In addition, one of the technical problems of the embodiments is to provide a camera actuator capable of implementing the OIS with low power consumption, and a camera module including the same.

The technical problems of the embodiments are not limited to those described in this item, but include those that may be understood from the entire description of the invention.

Technical Solution

A camera module or camera device according to an embodiment may include a base, a first lens assembly disposed in the base, a first coil part disposed on the base, a first spacer disposed on the base, and a first position detection sensor disposed on the first spacer.

The first spacer may include a first support portion and a first protrusion protruding from the first support portion, the first position detection sensor may be disposed on the first protrusion, and the first protrusion may be disposed in the hollow of the first coil unit.

In addition, the camera module or camera device according to the embodiment may include a base including an opening, a first lens assembly disposed in the base and including a first magnet, and a first coil disposed on the base; a first spacer disposed on the base and a first position detection sensor disposed on the first spacer.

The first spacer may include a first support portion and a first protrusion protruding from the first support portion.

The first protrusion may be disposed in the opening to correspond to the first magnet.

A first circuit board may be disposed between the first position detection sensor and the first support part, wherein the first circuit board may include a first substrate region disposed on the first support part and a second substrate region disposed on the first protrusion, wherein a portion of the second substrate region may be connected to the first substrate region.

The first position detection sensor may be disposed in the second substrate area.

The second substrate area may include a second substrate groove, the first protrusion may include a coupling protrusion, and the coupling protrusion of the first protrusion may be coupled to the second substrate groove of the second substrate area.

The first substrate region may include a first substrate groove, the first support portion includes a first coupling protrusion, and the first substrate groove of the first substrate region may be coupled to the first coupling protrusion of the first support part.

The first support part may include a support protrusion on which a part of the first coil part is disposed.

The embodiment may include a second lens assembly disposed in a position corresponding to the first lens assembly in the base,
a second coil portion disposed at a position corresponding to the first coil portion of the base,
a second spacer disposed at a position corresponding to the first spacer of the base:
and the second spacer includes a second support portion and a second protrusion protruding from the second support portion, and
the second position detection sensor may be disposed on the second protrusion, and the second protrusion may be disposed in the hollow of the second coil part.

The embodiment includes a second circuit board disposed between the second position detection sensor and the second support,
the second circuit board includes a third substrate region disposed on the second support portion and a fourth substrate region disposed on the second protrusion, and a portion of the fourth substrate region can be connected with the third substrate region.

The embodiment may include a fifth substrate region connecting the first circuit board and the second circuit board.

The first lens assembly includes a first yoke and a first magnet, the first yoke includes first and second bent parts, and the first bent part of the first yoke may be coupled to a groove of the first lens assembly and the second bent part may be coupled to one side of the first magnet.

The embodiment may include a third yoke coupled to the first support part and having a yoke groove, and the first support part may include a second coupling protrusion coupled to the yoke groove of the third yoke.

In addition, the camera module or camera device according to the embodiment may include a base, a first lens assembly disposed in the base, a first coil part disposed on the base, a first spacer disposed on the base, and a first circuit board disposed on the first spacer, and a first position detection sensor disposed on the first circuit board.

The first circuit board, the second substrate region includes a first substrate region disposed on the spacer and a second substrate region spaced apart from the first substrate region, wherein the first position detection sensor may be disposed on the second substrate region, and the second substrate region may be disposed in a hollow portion of the first coil unit.

The first spacer includes a first support portion and a first protrusion protruding from the first support portion,
The first protrusion may be disposed in the opening to correspond to the first magnet.

In addition, the camera module or camera device according to the embodiment may include a base, a first lens assembly disposed in the base, a first coil part disposed on the base, a first spacer disposed on the base, and a first circuit board disposed on the first spacer, and a first position detection sensor disposed on the first circuit board.

The first coil unit may be disposed on the first circuit board and the first spacer.

The first spacer may include a first support part and a first protrusion protruding from the first support part, and the first position detection sensor may be disposed on the first protrusion part.

In the first support part, a first thickness of the first-first support part overlapping the first coil part may be thinner than a second thickness of the first-second support part not overlapping the first coil part.

A camera module according to an embodiment may include a base 20, a first lens assembly 110 and a second lens assembly 120 disposed on the base 20, wherein the first lens assembly 110 may include a first driving part 116 and a third driving part 141. The second lens assembly 120 may include a second driving part 126 and a fourth driving part 142.

In the first lens assembly 110, the first driving part 116 may include a first magnet 116b and a first yoke 116a. The third driving part 141 may include a first coil part 141b and a third yoke 141a.

In the second lens assembly 120, the second driving part 126 may include a second magnet 126b and a second yoke 126a, and the fourth driving part 142 may include a second coil part 142b and a fourth yoke 142a.

The first yoke 116a may include a first support portion 116a1 and a first side protruding portion 116a2 extending from the first support portion 116a1 toward a first side surface of the first magnet 116b.

The first yoke 116a may include a first fixed protruding portion 116a3 extending in a direction opposite to the first side protruding portion 116a2.

A thickness of the first side protruding portion 116a2 may be thicker than that of the first support portion 116a1.

The first yoke 116a may include a first extension protruding portion 116a22 extending more upward than an upper surface of the first magnet 116b from the first side protruding portion 116a2.

The total thickness PL of the first side protruding portion 116a2 and the first extension protruding portion 116a22 may be greater than a thickness ML of the first magnet 116b.

The first yoke 116a may include a second side protruding portion 116a4 protruding to a second side surface of the first magnet 116b.

In addition, a camera module according to an embodiment may include a base including a first side wall and a second side wall corresponding to the first side wall, a first guide part disposed adjacent to the first side wall of the base, a second guide part disposed adjacent to the second side wall of the base, a first lens assembly that moves along the first guide part, a second lens assembly that moves along the second guide part, a first ball disposed between the first guide part and the first lens assembly, and a second ball disposed between the second guide part and the second lens assembly.

The first lens assembly may include a first groove in which the first ball is disposed, and the second lens assembly may include a second groove in which the second ball is disposed.

The first guide part, the first ball, and the first groove may be disposed on a virtual straight line from the first side wall toward the second side wall.

In addition, a camera module according to an embodiment may include a base, a first guide part disposed on one side of the base, a second guide part disposed on the other side of the base, a first lens assembly corresponding to the first guide part, a second lens assembly corresponding to the second guide part, a first ball disposed between the first guide part and the first lens assembly; and a second ball disposed between the second guide part and the second lens assembly.

The first guide part may include a first-first rail of a first shape and a first-second rail of a second shape, the second guide part may include a second-first rail of the first shape and a second-second rail of the second shape.

The first shape of the first guide part and the second shape of the first guide part may be different shapes.

The first-first rail of the first shape and the second-first rail of the first shape may be positioned diagonally, and the first-second rail of the second shape and the second-second rail of the second shape may be positioned diagonally.

In addition, a camera module according to an embodiment may include a base, a first guide part disposed on one side of the base, a second guide part disposed on the other side of the base, a first lens assembly corresponding to the first guide part, a second lens assembly corresponding to the second guide part, a first ball disposed between the first guide part and the first lens assembly; and a second ball disposed between the second guide part and the second lens assembly.

The first guide part may include two first rails, and the second guide part may include two second rails.

The first lens assembly may include a first lens barrel and a first driving part, and the second lens assembly may include a first lens barrel and a second driving part.

The first driving part may correspond to the two first rails, and the second driving part may correspond to the two second rails.

The first guide part may be disposed between the first lens assembly and the first side wall of the base, and the second guide part may be disposed between the second lens assembly and the second side wall of the base.

The first guide part may include two first rails, and the second guide part may include two second rails.

The first ball may include two, one of the first balls may move along one of the two first rails, and the other one of the first balls may move along the other one of the two first rails.

The first shape of the first guide part and the second guide part may be an L-shape, and the second shape of the first guide part and the second guide part may be a V-shape.

The second guide part, the second ball, and the second groove may be disposed on a virtual straight line from the first side wall toward the second side wall.

The first lens assembly may include a first lens barrel on which a lens is disposed and a first driving part, the first groove of the first lens assembly may be in plural, and a distance between two first grooves of the plurality of first grooves with respect to an optical axis direction may be longer than a thickness of the first lens barrel.

A camera module according to an embodiment may further include a third lens assembly including a third housing, wherein the first guide part may include a first protrusion formed on a first surface of the first guide part and a second protrusion formed on a second surface thereof, the first protrusion of the first guide part may be coupled to a third side wall disposed between the first side wall and the second side wall of the base, and the second protrusion of the first guide part may be coupled to the third housing.

The first groove of the first lens assembly may be V-shaped, and the first rail of the first guide part may include an L-shaped first rail and a V-shaped first rail.

The second groove of the second lens assembly may be V-shaped, and the second rail of the second guide part may include an L-shaped second rail and a V-shaped second rail.

The V-shaped first rail and the V-shaped second rail may be disposed diagonally to each other, and the L-shaped first rail and the L-shaped second rail may be disposed diagonally to each other.

In addition, a camera module actuator or a camera module including the same according to an embodiment may include a lens unit 222c, a shaper unit 222 disposed on the lens unit 222c, a first driving part 72M coupled to the shaper unit 222, and a second driving part 72C disposed to correspond to the first driving part 72M.

A camera module according to an embodiment may further include a housing 210 in which the second driving part 72C is disposed, wherein the housing 210 may include a housing body 212 in which the lens unit is disposed, a first housing side portion 214P1 disposed in a direction in which a first protruding region b12 protrudes, and a second housing side portion 214P2 disposed in a direction in which a second protruding region b34 protrudes.

The lens unit 222c may include a translucent support 222c2, a tunable prism, a second translucent support (not shown), or a liquid lens.

The lens unit 222c may perform a lens function in addition to a prism function of changing a light path, but the embodiment is not limited thereto.

The first housing side portion 214P1 and the second housing side portion 214P2 may include a driving part hole 214H in which the second driving part 72C is disposed.

The housing may include first to fourth jig holes formed to be overlapped vertically with the first to fourth protrusions.

The housing may include an opening 212H formed between the first to fourth jig holes.

In addition, a camera actuator according to an embodiment may include a housing 210, an image shaking control unit 220 including a shaper unit 222 and a first driving part 72M and disposed on the housing 210, and a second driving part 72C disposed on the housing 210.

The shaper unit 222 may include a shaper body 222a, a protruding portion 222b extending from the shaper body 222a to a side surface thereof and coupled to the first driving part 72M, and a lens unit 222c disposed on the shaper body 222a.

A camera actuator according to an embodiment may include a prism unit 230 provided on the image shaking control unit 220 and including a fixed prism 232.

The lens unit 222c may include a translucent support 222c2, a tunable prism 222cp, or a liquid lens.

A second translucent support (not shown). The first driving part 72M may include a magnet coupled to the protruding portion 222, and the second driving part 72C may include a coil coupled to the shaper body 222a.

A camera module according to an embodiment may include a lens assembly, an image sensor unit disposed on one side of the lens assembly, and any one of the camera actuators disposed on the other side of the lens assembly.

Advantageous Effects

According to a camera actuator and a camera module including the same according to an embodiment, there is a technical effect that may solve a problem of generation of friction torque during zooming.

For example, according to the embodiment, a lens assembly is driven in a state in which the first guide part and the second guide part, which are precisely numerically controlled in the base, are coupled to each other, so that friction resistance is reduced by reducing friction torque, and thus there are technical effects such as improvement of driving force, reduction of power consumption, and improvement of control characteristics during zooming.

Accordingly, according to the embodiment, there is a complex technical effect that image quality or resolution may be improved remarkably by preventing occurrence of a phenomenon that a decenter of a lens, tilt of the lens, and a central axis of a lens group and an image sensor are not aligned while minimizing the friction torque during zooming.

In addition, a camera actuator according to the embodiment and a camera module including the same solve a problem of lens decenter or tilt generation during zooming, and align a plurality of lens groups well to prevent a change in an angle of view or occurrence of defocusing, and thus there is a technical effect that image quality or resolution is significantly improved.

For example, according to the embodiment, the first guide part includes the first-first rail and the first-second rail, and the first-first rail and the first-second rail guide the first lens assembly, and thus there is a technical effect that accuracy of alignment may be improved.

In addition, according to the embodiment, a center of a protrusion of the first guide part and a center of a groove of the third housing do not coincide, are spaced apart from each other, and are eccentrically disposed in order to increase the accuracy of lens alignment between a plurality of lens groups, and thus there is a technical effect that decenter and lens tilt may be minimized during zooming by increasing the accuracy of alignment between the lens groups.

Further, according to the embodiment, a center of a protrusion of the base and centers of grooves of the first and second guide parts do not coincide with each other, are spaced apart from each other, and are eccentrically disposed in order to increase the accuracy of lens alignment between a plurality of lens groups, and thus there is a technical effect that decenter and lens tilt may be minimized during zooming by increasing the accuracy of alignment between the lens groups.

In addition, two rails for each lens assembly are provided, and thus there is a technical effect that even though any one of the rails is distorted, the accuracy may be secured by the other one.

Further, according to the embodiment, the two rails for each lens assembly are provided, and thus there is a technical effect that despite an issue of the frictional force of the ball described later at any one of the rails, the driving force may be secured as the cloud driving proceeds smoothly in the other one.

Furthermore, according to the embodiment, since the two rails for each lens assembly are provided, it is possible to secure widely a distance between balls described later, and accordingly, there is a technical effect that a driving force may be improved, interference of a magnetic field may be prevented, and tilt may be prevented when the lens assembly is stopped or moved.

In the related art, when guide rails are disposed on the base itself, a gradient is generated along an injection direction, and thus there is difficulty in dimensional control, and there was a technical problem that friction torque increases and driving force decreases when injection is not performed normally.

On the other hand, according to the embodiment, the first guide part and the second guide part which are formed separately from the base are applied separately without disposing the guide rails on the base itself, and thus there is a special technical effect that generation of a gradient along the injection direction may be prevented.

In addition, according to the embodiment, there is a technical effect that it is possible to provide an ultra-thin and ultra-small camera actuator and a camera module including the same.

For example, according to the embodiment, the image shaking control unit 220 is disposed so as to utilize a space below the prism unit 230 and overlap each other, and thus there is a technical effect that it is possible to provide an ultra-thin and ultra-small camera actuator and a camera module including the same.

In addition, according to the embodiment, there is a technical effect that it is possible to provide a camera actuator capable of securing a sufficient amount of light and a camera module including the same by eliminating lens size limitation of an optical system lens assembly when the OIS is implemented.

For example, according to the embodiment, lens size limitation of an optical system lens assembly is eliminated by disposing the image shaking control unit 220 under the prism unit 230 when the OIS is implemented, and thus there is a technical effect that it is possible to provide a camera actuator capable of securing a sufficient amount of light and a camera module including the same.

In addition, according to the embodiment, there is a technical effect that it is possible to provide a camera actuator capable of achieving the best optical characteristics and a camera module including the same by minimizing occurrence of a decenter or tilt phenomenon when the OIS is implemented.

For example, according to the embodiment, the image shaking control unit 220 stably disposed on the housing 210 is provided, and a shaper unit 322 described later and a first driving part 72M are included, and thus there is a technical effect that it is possible to provide a camera actuator capable of achieving the best optical characteristics and a camera module including the same by minimizing occurrence of a decenter or tilt phenomenon when the OIS is implemented through a lens unit 322c including a tunable prism 322cp.

In addition, the camera actuator and the camera module including the same according to the embodiment, there is a technical effect that can increase the thrust while increasing the sensitivity of the hall sensor at the same time. For example, according to the embodiment, since the first spacer 141c may include a first protrusion 141c3 protruding from the first support 141cl, and the first position detection sensor 71 is disposed on the first protrusion 141c3, the second distance DH2 between the first magnet 116b and the first coil unit 141b is significantly reduced, there is a technical effect of remarkably improving the magnetic flux between the magnet and the coil unit.

For example, according to the embodiment, as the first position detection sensor 71 is disposed on the first protrusion 141c3, the second distance DH2 between the first magnet 116b and the first coil unit 141b can be secured to 400 μm or less, twice as short as compared to the comparative example, and thus the magnetic flux between the first magnet 116b and the first coil unit 141b is 150 (mT·m$^2$) compared to the comparative example. There is a unique technical effect that can be secured about three times higher than that of the comparative example.

Also, according to the embodiment, as the first position detection sensor 71 is disposed on the first protrusion 141c3, there is a special technical effect that the magnetic flux blocking by the first coil portion 141b is significantly reduced.

In addition, according to the embodiment, the first circuit board 41a may include a first substrate region 41al disposed on the first spacer 141c and a second substrate region 41a3 spaced apart from the first substrate region 41al, the first position detection sensor 71 may be disposed on the second substrate region 41a3, and the second substrate region 41a3 may be disposed in the hollow of the coil unit 141b, a coil driver.

Accordingly, according to the embodiment, as the first position detection sensor 71 is disposed on the second substrate area 41a3, the second distance DH2 between the first magnet 116b and the first coil unit 141b can be secured 400 μm or less, which is at least twice as short as compared to the comparative example.

Therefore, compared to the comparative example, the magnetic flux between the first magnet 116b and the first coil part 141b can be secured up to about 150 (mT·m 2), about three times higher than that of the comparative example.

Also, according to the embodiment, as the first position detection sensor 71 is disposed on the second substrate area 41a2, there is a special technical effect that the magnetic flux blocking by the first coil unit 141b is significantly reduced.

In addition, the second substrate region 41a3 of the first circuit board 41a may include a second substrate groove 41a3r, and the coupling protrusion 141c3p of the first spacer may be coupled to the second substrate groove 41a3r of the first circuit board 41a. Accordingly, it is possible to stably support the second substrate area 41a3 on which the first position sensor 71 is seated.

Accordingly, the embodiment can significantly improve the precision of camera control by precisely controlling the distance between the first position detection sensor 71 and the first magnet 116b such that there is a special technical effect that can prevent a decent or tilt phenomenon of the camera module.

Also, the first substrate region of the first circuit board 41a may include a first substrate groove 41r. Through this, the first coupling protrusion 141c1p provided on the first support part 141c1 of the first spacer to be described later is firmly coupled to the first substrate groove 41r of the first revolving board, so that the precision of the control of the camera module improvement and mechanical reliability can be significantly improved.

In addition, according to the embodiment, the thickness of the first support portion 141c1 of the first spacer 141c can be precisely classified and controlled for overlapping region and non-overlapping region with the first coil unit 141b, and overlapping region and non-overlapping region with the first circuit board 41a. Accordingly, when the first coil unit 141b is mounted, the horizontal degree is precisely controlled to significantly improve the precision of camera control, thereby having a special technical effect that can prevent a decent or tilt phenomenon of the camera module.

In addition, according to the embodiment, there is a technical effect that it is possible to provide a camera actuator capable of preventing a magnetic field interference with an AF or Zoom magnet and a camera module including the same when the OIS is implemented.

For example, according to the embodiment, when the OIS is implemented, the first driving part 72M, which is a magnet driving part, is disposed on the second camera actuator 200 separated from the first camera actuator or the first camera module 100, and thus there is a technical effect that that it is possible to provide a camera actuator capable of preventing a magnetic field interference with an AF or Zoom magnet and a camera module including the same.

In addition, according to the embodiment, there is a technical effect that it is possible to provide a camera actuator capable of preventing a magnetic field interference between magnets mounted on each lens assembly when a plurality of lens assemblies are driven by an electromagnetic force between a magnet and a coil when AF or Zoom is implemented, and a camera module including the same.

For example, according to the embodiment, a yoke in a magnet driving part of a first lens assembly 110 or a second lens assembly 120 includes a side protruding portion extending to a side surface of the magnet, and thus there is a technical effect that it is possible to provide a camera actuator capable of preventing a magnetic field interference between magnets mounted on each lens assembly when a plurality of lens assemblies are driven by an electromagnetic force between a magnet and a coil when AF or Zoom is implemented, and a camera module including the same.

For example, according to the embodiment, a yoke in a magnet driving part of a first lens assembly 110 or a second lens assembly 120 includes a side protruding portion extending to a side surface of the magnet to prevent leakage flux generated in the magnet, and the side protruding portion is disposed in a region having a high magnetic flux density so that the magnetic flux is concentrated (FC), and thus there is a problem that thrust is significantly improved by increasing a density between a flux line and the coil to increase the Lorentz Force.

In addition, in the embodiment, there is a technical effect that may provide a camera actuator capable of preventing detachment of a magnet and a yoke, and a camera module including the same.

According to the embodiment, as the first yoke 116a includes the first side protruding portion 116a2 extending to the side surface of the first magnet 116b, there is an effect capable of preventing magnetic field interference between magnets mounted in each lens assembly, and there is a complex technical effect that thrust is improved by concentration of magnetic flux and the mechanical reliability is improved by firmly fixing the first magnet 116b.

In addition, according to the embodiment, there is a technical effect that it is possible to provide a camera actuator capable of implementing the OIS with low power consumption and a camera module including the same.

For example, according to the embodiment, unlike the conventional method of moving a plurality of solid lenses, the OIS is implemented by driving the shaper unit 222 through the lens unit 222c including the tunable prism, the first driving part 72M which is a magnet driving part, and the second driving part 72C which is a coil driving part, and thus there is a technical effect that it is possible to provide a camera actuator capable of implementing the OIS with low power consumption and a camera module including the same.

In addition, according to the embodiment, the prism unit 230 and the lens unit 222c including the tunable prism may be disposed very close to each other, and thus there is a special technical effect that even though the change in the optical path is made fine in the lens unit 222c, the change in the optical path may be widely secured in the actual image sensor unit.

The technical effects of the embodiments are not limited to those described in this item, but include those that may be understood from the entire description of the invention.

DESCRIPTION OF DRAWINGS

FIG. 1 is a perspective view of a camera module according to an embodiment.

FIG. 2 is a perspective view in which a part of a configuration of the camera module according to the embodiment shown in FIG. 1 is omitted.

FIG. 3 is an exploded perspective view in which a part of a configuration of the camera module according to the embodiment shown in FIG. 1 is omitted.

FIG. 4 is a perspective view of a first guide part and a second guide part of the camera module according to the embodiment shown in FIG. 3.

FIG. 5 is an additional perspective view of the first guide part and the second guide part of the embodiment shown in FIG. 4.

FIG. 6A is a perspective view of the first guide part of the embodiment shown in FIG. 5.

FIG. 6B is a perspective view in a left direction of the first guide part of the embodiment shown in FIG. 6A.

FIG. 7A is a perspective view of a first lens assembly of the camera module according to the embodiment shown in FIG. 3.

FIG. 7B is a perspective view in which a part of a configuration of the first lens assembly 110 shown in FIG. 7A is removed.

FIG. 8A is a cross-sectional view taken along line B1-B2 in the camera module according to the embodiment shown in FIG. 2.

FIG. 8B is a driving example view of a camera module according to an embodiment.

FIG. 9 is a perspective view of a third lens assembly in the camera module according to the embodiment shown in FIG. 3 in a first direction.

FIG. 10 is a perspective view of the third lens assembly 130 shown in FIG. 9 in a second direction.

FIG. 11A is a perspective view of a base of the camera module according to the embodiment shown in FIG. 3.

FIG. 11B is a front view of the base shown in FIG. 11A.

FIG. 12 is an enlarged view of a first region of the base shown in FIG. 11B.

FIG. 13A is an illustrative view showing a combination of a third lens assembly and a first guide part in the camera module according to the embodiment shown in FIG. 3.

FIG. 13B is an enlarged view showing a coupling region of the third lens assembly shown in FIG. 13A.

FIG. 13C is a cross-sectional example view showing a combination of the third lens assembly and the first guide part shown in FIG. 13A.

FIG. 14A is an illustrative view showing a combination of a base and a first guide part of the camera module according to the embodiment shown in FIG. 3.

FIG. 14B is an enlarged view showing a coupling region of the first guide part shown in FIG. 14A.

FIG. 14C a cross-sectional example view showing a combination of the base and the first guide part shown in FIG. 14A.

FIG. 15A is a cross-sectional view taken along line C1-C2 in the camera module according to the embodiment shown in FIG. 1.

FIG. 15B is a driving example view of a camera module according to an embodiment.

FIG. 16A is an enlarged view of the S region shown in FIG. 15A.

FIG. 16B is a detailed view of the S region shown in FIG. 16a.

FIG. 16C is magnetic flux data according to the separation distance between the magnet and the position detection sensor in embodiments and comparative examples. FIG. 17A is a perspective view of a third driving unit and a circuit board in the camera module according to the embodiment shown in FIG. 2.

FIG. 17B is a perspective view of a circuit board in the camera module according to the embodiment shown in 17A.

FIG. 17C is a perspective view of a first circuit board and a first position detection sensor in the circuit board 41 according to the embodiment shown in FIG. 17B.

FIG. 17D is a plan view of the third driving unit CS1 in the embodiment shown in FIG. 17A.

FIG. 17E is a cross-sectional view taken along line SA1-SA2 of FIG. 17D.

FIG. 17F is a perspective view in which the circuit board is omitted in the embodiment shown in FIG. 17A.

FIG. 17G is a right perspective view of the first spacer and the third yoke shown in FIG. 17F;

FIG. 17H is a left perspective view of the first spacer and the third yoke shown in FIG. 17F;

FIG. 18A is a perspective view of a first driving part 116 of the camera module according to the embodiment shown in FIG. 15B.

FIG. 18B shows data of a magnetic flux density distribution in Comparative Example.

FIG. 18C shows data of a magnetic flux density distribution in Example.

FIG. 18D is a detailed perspective view of a first yoke 116a in the first driving part 116 in Example.

FIG. 18E is a bottom perspective view of the first yoke 116a.

FIG. 18F is a perspective view of a first driving part 116B of a camera module according to a first additional embodiment.

FIG. 18G is a perspective view of a first drive part 116C of a camera module according to a second additional embodiment.

FIG. 19 is a perspective view showing a camera module of an embodiment including a second camera actuator.

FIG. 20A is a perspective view of the second camera actuator in the camera module of the embodiment shown in FIG. 19 in a first direction.

FIG. 20B is a perspective view of the second camera actuator in the camera module of the embodiment shown in FIG. 19 in a second direction.

FIG. 21A is a perspective view of a first circuit board and a coil part of the second camera actuator of the embodiment shown in FIG. 20B.

FIG. 21B is a partially exploded perspective view of the second camera actuator of the embodiment shown in FIG. 20B.

FIG. 21C is a perspective view in which the first circuit board is removed from the second camera actuator of the embodiment shown in FIG. 20B.

FIG. 22A is an exploded perspective view of an image shaking control unit of the second camera actuator of the embodiment shown in FIG. 21B.

FIG. 22B is a combined perspective view of the image shaking control unit of the second camera actuator of the embodiment shown in FIG. 22A.

FIG. 22C is an exploded perspective view of a first driving part in the image shaking control unit shown in FIG. 22A.

FIG. 23 is a perspective view of a shaper unit of the second camera actuator of the embodiment shown in FIG. 22A.

FIG. 24 is a cross-sectional view of a lens unit taken along line A1-A1' of the shaper unit 322 shown in FIG. 23.

FIGS. 25A to 25B are illustrative views showing an operation of the second camera actuator of an embodiment.

FIG. 26 is a first operation example view of the second camera actuator of the embodiment.

FIG. 27 is a second operation example view of the second camera actuator of the embodiment.

FIG. 28 is a perspective view of a camera module according to another embodiment.

FIG. 29 is a perspective view of a mobile terminal to which a camera module according to an embodiment is applied.

FIG. 30 is a perspective view of a vehicle to which a camera module according to an embodiment is applied.

MODE FOR INVENTION

Hereinafter, embodiments will be described in detail with reference to the accompanying drawings. While the invention may be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims.

Although the terms "first," "second," etc. may be used to describe various elements, these elements should not be limited by these terms. These terms are only used to distinguish one element from another. In addition, terms defined specially in consideration of a configuration and operation of the embodiment are only for describing the embodiment, and do not limit the scope of the embodiment.

In describing the embodiments, when elements are described with terms "above (up) or below (down)", "front (head) or back (rear)", the terms "above (up) or below (down)", "front (head) or back (rear)" may include both meanings that two elements are in direct contact with each other, or one or more other components are disposed between the two elements to form. Further, when expressed as "on (over)" or "under (below)", it may include not only the upper direction but also the lower direction based on one element.

In addition, relational terms such as "on/above" and "under/below" used below do not necessarily require or imply any physical or logical relationship or order between such entities or elements, and may be used to distinguish any entity or element from another entity or element.

Embodiment

FIG. 1 is a perspective view of a camera module 100 according to an embodiment, FIG. 2 is a perspective view in which a part of the configuration of the camera module according to the embodiment shown in FIG. 1 is omitted, and FIG. 3 is an exploded perspective view in which a part of the configuration of the camera module according to the embodiment shown in FIG. 1 is omitted.

Referring to FIG. 1, the camera module 100 according to the embodiment may include a base 20, a circuit board 40 disposed outside the base 20, a fourth driving part 142, and a third lens assembly 130.

FIG. 2 is a perspective view in which the base 20 and the circuit board 40 are omitted in FIG. 1, and referring to FIG. 2, a camera module 100 according to an embodiment includes a first guide part 210, a second guide part 220, a first lens assembly 110, a second lens assembly 120, a third driving part 141, and a fourth driving part 142.

The third driving part 141 and the fourth driving part 142 may include a coil or a magnet.

For example, when the third driving part 141 and the fourth driving part 142 include the coil, the third driving part 141 may include a first coil part 141b and a first yoke 141a, and the fourth driving part 142 may include a second coil part 142b and a second yoke 142a.

Or, conversely, the third driving part 141 and the fourth driving part 142 may include the magnet.

In an xyz-axis direction shown in FIG. 3, a z-axis may refer to an optic axis direction or a direction parallel thereto, an xz plane represents the ground, and an x-axis may refer to a direction perpendicular to the z-axis on the ground (xz plane), and a y-axis may refer to a direction perpendicular to the ground.

Referring to FIG. 3, a camera module 100 according to an embodiment may include a base 20, a first guide part 210, a second guide part 220, a first lens assembly 110, a second lens assembly 120, and a third lens assembly 130.

For example, the camera module 100 according to the embodiment may include the base 20, the first guide part 210 disposed on one side of the base 20, the second guide part 220 disposed on the other side of the base 20, the first lens assembly 110 corresponding to the first guide part 210, the second lens assembly 120 corresponding to the second guide part 220, a first ball 117 (see FIG. 7A) disposed between the first lens assembly 110 and the first guide part 210, and a second ball (not shown) disposed between the second guide part 220 and the second lens assembly 120.

In addition, the embodiment may include the third lens assembly 130 disposed in front of the first lens assembly 110 in the optic axis direction.

Hereinafter, specific features of the camera device according to the embodiment will be described with reference to the drawings.

<Guide Part>

Referring to FIG. 2 and FIG. 3, the embodiment may include a first guide part 210 disposed adjacent to the first side wall 21a (see FIG. 11A) of the base 20, and a second guide part 220 disposed adjacent to the second side wall 21b (referring to FIG. 11A) of the base 20.

The first guide part 210 may be disposed between the first lens assembly 110 and the first side wall 21a of the base 20.

The second guide part 220 may be disposed between the second lens assembly 120 and the second side wall 21b of the base 20. The first side wall 21a and the second side wall 21b of the base may be disposed to face each other.

According to the embodiment, a lens assembly is driven in a state in which the first guide part 210 and the second guide part 220, which are precisely numerically controlled in the base, are coupled to each other, so that friction resistance is reduced by reducing friction torque, and thus there are technical effects such as improvement of driving force, reduction of power consumption, and improvement of control characteristics during zooming.

Accordingly, according to the embodiment, there is a complex technical effect that image quality or resolution may be improved remarkably by preventing occurrence of a phenomenon that a decenter of a lens, tilt of the lens, and a central axis of a lens group and an image sensor are not aligned while minimizing the friction torque during zooming, In the related art, when guide rails are disposed on the base itself, a gradient is generated along an injection direction, and thus there is difficulty in dimensional control, and there was a technical problem that friction torque increases and driving force decreases when injection is not performed normally.

On the other hand, according to the embodiment, the first guide part 210 and the second guide part 220 which are formed separately from the base 20 are applied separately without disposing the guide rails on the base itself, and thus there is a special technical effect that generation of a gradient along the injection direction may be prevented.

The base 20 may be injected in a Z-axis direction. In the related art, when a rail is integrally formed with the base, there is a problem that a straight line of the rail is distorted due to a gradient generated while the rail is injected in the Z-axis direction.

According to the embodiment, since the first guide part 210 and the second guide part 220 are injected separately from the base 20, it is possible to prevent generation of a gradient remarkably as compared with the related art, and thus there is a special technical effect that precise injection may be performed and generation of a gradient due to injection may be prevented.

In the embodiment, the first guide part 210 and the second guide part 220 may be injected on an X axis, and a length injected may be shorter than the base 20. In this case, when rails 212 and 222 are disposed on the first guide part 210 and the second guide part 220, generation of a gradient during injection may be minimized, and there is a technical effect that possibility that the straight line of the rail is distorted is low.

FIGS. 4 and 5 are enlarged perspective views of a first guide part 210 and a second guide part 220 of the camera module according to the embodiment.

Referring to FIG. 4, in an embodiment, the first guide part 210 may include a single or a plurality of first rails 212. In addition, the second guide part 220 may include a single or a plurality of second rails 222.

For example, the first rail 212 of the first guide part 210 may include a first-first rail 212a and a first-second rail 212b. The first guide part 210 may include a first support portion 213 between the first-first rail 212a and the first-second rail 212b.

According to the embodiment, two rails for each lens assembly are provided, and thus there is a technical effect that even though any one of the rails is distorted, the accuracy may be secured by the other one.

In addition, according to the embodiment, the two rails for each lens assembly are provided, and thus there is a technical effect that despite an issue of the frictional force of the ball described later at any one of the rails, the driving force may be secured as the cloud driving proceeds smoothly in the other one.

The first rail 212 may be connected from one surface of the first guide part 210 to the other surface thereof.

A camera actuator according to the embodiment and a camera module including the same solve a problem of lens decenter or tilt generation during zooming, and align a plurality of lens groups well to prevent a change in an angle of view or occurrence of defocusing, and thus there is a technical effect that image quality or resolution is significantly improved.

For example, according to the embodiment, the first guide part 210 includes the first-first rail 212a and the first-second rail 212a, and the first-first rail 212a and the first-second rail 212a guide the first lens assembly 110, and thus there is a technical effect that accuracy of alignment may be improved.

In addition, according to the embodiment, since the two rails for each lens assembly are provided, it is possible to secure widely a distance between balls described later, and accordingly, there is a technical effect that a driving force may be improved, interference of a magnetic field may be prevented, and tilt may be prevented when the lens assembly is stopped or moved.

In addition, the first guide part 210 may include a first guide protruding portion 215 that extends in a side surface direction perpendicular to a direction in which the first rail 212 extends.

A first protrusion 214p may be included on the first guide protruding portion 215. For example, the first protrusion 214p may include a first-first protrusion 214p1 and a first-second protrusion 214p2.

Referring to FIG. 4, in the embodiment, the second guide part 220 may include a single or a plurality of second rails 222.

For example, the second rail 222 of the second guide part 220 may include a second-first rail 222a and a second-second rail 222b. The second guide part 220 may include a second support portion 223 between the second-first rail 222a and the second-second rail 222b.

The second rail 222 may be connected from one surface of the second guide part 210 to the other surface thereof.

In addition, the second guide part 220 may include a second guide protruding portion 225 that extends in a side surface direction perpendicular to a direction in which the second rail 222 extends.

A second protrusion 224p including a second-first protrusion 224p1 and a second-second protrusion 224p2 may be included on the second guide protruding portion 225.

The first-first protrusion 214p1 and first-second protrusion 214p2 of the first guide part 210 and the second-first protrusion 224p1 and second-second protrusion 224p2 of the second guide part 220 may be coupled to a third housing 21 of a third lens assembly 130 described later.

According to the embodiment, the first guide part 210 includes the first-first rail 212a and the first-second rail 212b, and the first-first rail 212a and the first-second rail 212b guide the first lens assembly 110, and thus there is a technical effect that accuracy of alignment may be improved.

In addition, according to the embodiment, the second guide part 220 includes the second-first rail 222a and the second-second rail 222b, and the second-first rail 222a and the second-second rail 222b guide the second lens assembly 120, and thus there is a technical effect that alignment accuracy may be increased.

Further, two rails for each lens assembly are provided, and thus there is a technical effect that even though any one of the rails is distorted, the accuracy may be secured by the other one.

In addition, according to the embodiment, since the two rails for each lens assembly are provided, it is possible to secure widely a distance between balls described later, and accordingly, there is a technical effect that a driving force may be improved, interference of a magnetic field may be prevented, and tilt may be prevented when the lens assembly is stopped or moved.

Further, according to the embodiment, the two rails for each lens assembly are provided, and thus there is a technical effect that despite an issue of the frictional force of the ball described later at any one of the rails, the driving force may be secured as the cloud driving proceeds smoothly in the other one.

Furthermore, according to the embodiment, the first guide part 210 and the second guide part 220 which are formed separately from the base 20 are applied separately without disposing the guide rails on the base itself, and thus there is a special technical effect that generation of a gradient along the injection direction may be prevented.

In the related art, when guide rails are disposed on the base itself, a gradient is generated along an injection direction, and thus there is difficulty in dimensional control, and there was a technical problem that friction torque increases and driving force decreases when injection is not performed normally.

Next, referring to FIG. 5, the first rail 212 of the first guide part 210 may include a first-first rail 212a having a first shape R1 and a first-second rail 212b having a second shape R2.

Further, the second rail 222 of the second guide part 220 may include a second-first rail 222a of the first shape R1 and a second-second rail 222b of the second shape R2.

The first shape R1 of the first guide part 210 and the second shape R2 of the first guide part 210 may be different shapes.

For example, the first shape R1 of the first guide part 210 and the second guide part 220 may be a V-shape. The second shape R2 of the first guide part 210 and the second guide part 220 may be an L-shape, but the embodiment is not limited thereto.

The first-first rail 212a of the first shape R1 and the second-first rail 222a of the first shape R1 may be positioned diagonally.

The first-second rail 212b of the second shape R2 and the second-second rail 222b of the second shape R2 may be positioned diagonally.

Subsequently, referring to FIG. 5, the first guide part 210 may include a single or a plurality of first guide part holes 210h in which a protrusion of a base is coupled in a first guide protrusion 215. For example, the first guide part hole 210h may include a first regular hole 210ha and a first long hole 210hb in the first guide protrusion 215. In the embodiment, the first regular hole 210ha is firmly coupled to the first guide protrusion 215, and the first long hole 210hb is formed larger than the first guide protrusion 215, and thus there is a special technical effect that generation of a minute tolerance of the first guide protrusion 215 generated in a Y-axis direction may be covered and rotation in an X-axis direction may be prevented. A regular hole and a long hole described below may also perform the same function.

In the embodiment, a first-second distance D12 of the plurality of first guide part holes 210h to which a protrusion of the base 20 is coupled may be different from a first-first distance D11 between first protrusions 214p of the plurality of first guide parts 210, and accordingly, a coupling axis is formed in various ways, and a stable coupling force may be secured, thereby improving mechanical reliability.

For example, the first-second distance D12 of the plurality of first guide part holes 210h to which the protrusion of the base 20 is coupled may be formed wider than the first-first distance D11 between the first protrusions 214p of the plurality of first guide parts 210 coupled to a housing, and accordingly, a stable coupling force may be secured and mechanical reliability may be improved, but a length of the distance is not limited thereto.

The first regular hole 210ha may be a circular hole, and in the first long hole 210hb, a diameter in a first axis direction may be different from that in a second axis direction perpendicular the first axis direction. For example, in the first long hole 210hb, a diameter in the y-axis direction perpendicular to the x-axis may be larger than that in the x-axis direction horizontal to the ground.

In addition, the second guide part 220 may include a single or a plurality of second guide part holes 220h in a second guide protrusion 225. For example, the second guide part hole 220h may include a second regular hole 220ha and a second long hole 220hb in the second guide protrusion 225.

In addition, in the embodiment, a second-second distance D22 of the plurality of second guide part holes 220h to which a protrusion of the base 20 is coupled may be different from a second-first distance D21 between second protrusions 224p of the plurality of second guide parts 220, and accordingly, a coupling axis is formed in various ways, and a stable coupling force may be secured, thereby improving mechanical reliability.

For example, the second-second distance D22 of the plurality of second guide part holes 220h to which the protrusion of the base 20 is coupled may be formed wider than the second-first distance D21 between the second protrusions 224p of the plurality of second guide parts 220 coupled to the housing, and accordingly, a stable coupling force may be secured and mechanical reliability may be improved, but a length of the distance is not limited thereto.

The second regular hole 220ha may be a circular hole, and in the second long hole 220hb, a diameter in a first axis direction may be different from that in the second axis direction perpendicular the first axis direction. For example, in the second long hole 220hb, a diameter in the y-axis direction perpendicular to the x-axis may be larger than that in the x-axis direction horizontal to the ground.

The first regular hole 210ha and the second regular hole 220ha may be positioned diagonally. In addition, the first long hole 210hb and the second long hole 220hb may be positioned diagonally. However, the embodiment is not limited thereto, the first regular hole 210ha and the second regular hole 220ha may be positioned at an upper portion, and the first long hole 210hb may be disposed below the first regular hole 210ha. In addition, the first long hole 210hb and the second long hole 220hb may be positioned at a parallel position, and the second long hole 220hb may be disposed below the second regular hole 220ha. The first long hole 210hb may be disposed above the first regular hole 210ha, and the second long hole 220hb may be disposed above the second regular hole 220ha.

Next, FIG. 6A is a perspective view of the first guide part 210 of the embodiment shown in FIG. 5, and FIG. 6B is a perspective view in a left direction of the first guide part 210 of the embodiment shown in FIG. 6A.

In the embodiment, a first-first recess 214r1 in a circular shape may be disposed around a first-first protrusion 214p1 of the first guide part 210. Further, in the embodiment, a first-second recess 214r2 in a circular shape may be disposed around a first-second protrusion 214p2 of the first guide part 210.

In addition, a second-first recess (not shown) in a circular shape may be disposed around a second-first protrusion 224p1 of the second guide part 220. Further, a second-second recess (not shown) in a circular shape may be disposed around a second-second protrusion 224p2 of the second guide part 220.

According to the embodiment, there is a technical effect that when the first-first protrusion 214p1 and the first-second protrusion 214p2 are formed, generation of burrs therearound may be prevented by the first-first recess 214r1 and the first-second recess 214r2 are disposed around the first-first protrusion 214p1 and the first-second protrusion 214p2 of the first guide part 210, respectively.

Accordingly, there is a technical effect that the first-first protrusion 214p1 and the first-second protrusion 214p2 of the first guide part 210 may be firmly and tightly coupled to a third housing 21.

Next, referring to FIG. 6A, a single or a plurality of first ribs 217 may be disposed between a first support portion 213 and a first-second rail 212b.

In the related art, as an amount of an injected material increases or as a thickness of the injected material increases, shrinkage occurs, which makes it difficult to control dimensions, but on the other hand, when the amount of the injected material is reduced, a contradiction occurs in which strength is weakened.

According to the embodiment, the first rib 217 is disposed between the first support portion 213 and the first-second rail 212b, and thus there is a complex technology effect that accuracy of dimensional control may be improved by reducing the amount of injection material, and strength may be secured.

Next, referring to FIG. 6B, a first rail 212 of the first guide part 210 may include a rail part recess 212rb. In addition, the first support portion 213 of the first guide part 210 may include a support portion recess 213r.

According to the embodiment, the rail part recess 212rb and the support portion recess 213r is provided in the first guide part 210, and thus there is a complex technology effect that accuracy of dimensional control may be improved and strength may be secured by reducing the amount of injection material to prevent shrinkage.

In addition, referring to FIG. 6B, the first guide part 210 may include a first-third protrusion 214p3 disposed in a region opposite to the first-first protrusion 214p1, and the first-fourth protrusion 214p4 disposed in a region opposite to the first-second protrusion 214p2.

The first-third protrusion 214p3 and the first-fourth protrusion 214p4 may be coupled to a base hole of a third side wall 21c of a base 20 described later.

<First and Second Lens Assemblies and Balls>

Next, FIG. 7A is a perspective view of a first lens assembly 110 of the camera module according to the embodiment shown in FIG. 3, and FIG. 7B is a perspective view in which a part of a configuration of the first lens assembly 110 shown in FIG. 7A is removed.

Referring briefly to FIG. 3, the embodiment may include a first lens assembly 110 moving along the first guide part 210 and a second lens assembly 120 moving along the second guide part 220.

Referring again to FIG. 7A, the first lens assembly 110 may include a first lens barrel 112a on which a first lens 113 is disposed and a first driving part housing 112b on which a first driving part 116 is disposed. The first lens barrel 112a and the first driving part housing 112b may be a first housing, and the first housing may be in a barrel shape or a lens-barrel shape. The first driving part 116 may be a magnet driving part, but the embodiment is not limited thereto, and in some cases, a coil may be disposed therein.

In addition, the second lens assembly 120 may include a second lens barrel (not shown) on which a second lens (not shown) is disposed and a second driving part housing (not shown) on which a second driving part (not shown) is disposed. The second lens barrel (not shown) and the second driving part housing (not shown) may be a second housing, and the second housing may be in a barrel shape or a lens-barrel shape. The second driving part may be a magnet driving part, but the embodiment is not limited thereto, and in some cases, a coil may be disposed therein.

The first driving part 116 may correspond to the two first rails 212, and the second driving part may correspond to the two second rails 222.

In the embodiment, it is possible to drive using a single or a plurality of balls. For example, the embodiment may include a first ball 117 disposed between the first guide part 210 and the first lens assembly 110 and a second ball (not shown) disposed between the second guide part 220 and the second lens assembly 120.

For example, in the embodiment, the first ball 117 may include a single or a plurality of first-first balls 117a disposed above the first driving part housing 112b and a single or a plurality of first-second balls 117b below the first driving part housing 112b.

In the embodiment, the first-first ball 117a of the first ball 117 may move along a first-first rail 212a which is one of the first rails 212, and the first-second ball 117b of the first balls 117 may move along a first-second rail 212b which is another one of the first rails 212.

A camera actuator according to the embodiment and a camera module including the same solve a problem of lens decenter or tilt generation during zooming, and align a plurality of lens groups well to prevent a change in an angle of view or occurrence of defocusing, and thus there is a technical effect that image quality or resolution is significantly improved.

For example, according to the embodiment, the first guide part includes the first-first rail and the first-second rail, and the first-first rail and the first-second rail guide the first lens assembly 110, and thus there is a technical effect that accuracy of alignment between the second lens assembly 110 and an optic axis may be improved when the first lens assembly 110 moves.

Referring also to FIG. 7B, in an embodiment, the first lens assembly 110 may include a first assembly groove 112b1 on which the first ball 117 is disposed. The second lens assembly 120 may include a second assembly groove (not shown) on which the second ball is disposed.

The first assembly groove 112b1 of the first lens assembly 110 may be in plural. In this case, a distance between two first assembly grooves 112b1 of the plurality of first assembly grooves 112b1 with respect to an optic axis direction may be longer than a thickness of the first lens barrel 112a.

In the embodiment, the first assembly groove 112b1 of the first lens assembly 110 may be in a V-shape. Further, the second assembly groove (not shown) of the second lens assembly 120 may be in a V-shape. The first assembly groove 112b1 of the first lens assembly 110 may be in a U-shape in addition to the V-shape, or a shape that contacts the first ball 117 at two or three points. In addition, the second assembly groove (not shown) of the second lens assembly 120 may be in a U-shape in addition to the V-shape, or a shape that contacts the first ball 117 at two or three points.

Referring to FIG. 2 and FIG. 7A, in the embodiment, the first guide part 210, the first ball 117, and the first assembly groove 112b1 may be disposed on a virtual straight line from the first side wall 21a toward the second side wall 21b. The first guide part 210, the first ball 117, and the first assembly groove 112b1 may be disposed between the first side wall 21a and the second side wall 21b.

Referring to FIG. 8, in the first lens assembly 110, an assembly protrusion 112b2 may be disposed at a position opposite to the first assembly groove 112b1. In the embodiment, strength according to disposition of the assembly groove 112b1 is maintained by the assembly protrusion 112b2, and a recess region is provided at an upper end of the assembly protrusion 112b2 to reduce an amount of an injected material, thereby increasing accuracy of dimensional control by preventing shrinkage.

Next, FIG. 8A is a cross-sectional view taken along line B1-B2 in the camera module according to the embodiment shown in FIG. 2.

According to the embodiment, the first guide part 210 and the second guide part 220 may be disposed and inserted into the base 20, respectively, the first lens assembly 110 may be disposed to correspond to the first guide part 210, and the second lens assembly 120 may be disposed to correspond to the second guide part 220.

Meanwhile, according to the embodiment, there is a technical effect that it is possible to prevent the first lens assembly 110 and the second lens assembly 120 from being reversely inserted into the base 20.

For example, referring to FIG. 8A, a first upper portion and a first lower portion of the base 20 on which the first driving part housing 112b of the first lens assembly 110 is disposed may be spaced apart at a first distance A20.

In addition, a second upper portion and a second lower portion of the base 20 on which the first driving part housing 122b of the second lens assembly 120 is disposed may be spaced apart at a second distance A20.

In this case, a vertical width of the first driving part housing 112b may include a first width A110, and a vertical width of the second driving part housing 122b may include a second width B120.

In this case, unlike a distance and a width shown in FIG. 8A, when a dimensional control is designed so that the second width B120 which is the vertical width of the second driving part housing 122b is larger than the first distance A20 between the first upper portion and the first lower portion of the base 20, the second lens assembly 120 is not inserted into a base region in which the first lens assembly 110 is mounted, and thus there is a technical effect that reverse inserting is prevented.

In addition, unlike a distance and a width shown in FIG. 8A, when a dimensional control is designed so that the first width A110 which is the vertical width of the first driving part housing 112b is larger than the second distance B20 between the second upper portion and the second lower portion of the base 20, the first lens assembly 110 is not inserted into a base region in which the second lens assembly 120 is mounted, and thus there is a technical effect that reverse inserting is prevented.

Next, FIG. 8B is a driving example view of the camera module according to the embodiment.

An interaction in which an electromagnetic force DEM is generated between a first magnet 116 and a first coil part 141b in the camera module according to the embodiment will be described with reference to FIG. 8B.

As shown in FIG. 8B, a magnetization method of the first magnet 116 of the camera module according to the embodiment may be a vertical magnetization method. For example, in the embodiment, all of an N-pole 116N and an S-pole 116S of the first magnet 116 may be magnetized so as to face the first coil part 141b. Accordingly, the N-pole 116N and the S-pole 116S of the first magnet 116 may be respectively disposed so as to correspond to a region in which current flows in a y-axis direction perpendicular to the ground at the first coil part 141b.

Referring to FIG. 8B, in the embodiment, a magnetic force DM is applied in a direction opposite to an x-axis at the N-pole 116N of the first magnet 116, and when a current DE flows in a y-axis direction in a region of the first coil part 141b corresponding to the N-pole 116N, the electromagnetic force DEM acts in a z-axis direction based on the Fleming's left-hand rule.

In addition, in the embodiment, the magnetic force DM is applied in the x-axis direction at the S-pole 116S of the first magnet 116, and when the current DE flows in a direction opposite to the y-axis perpendicular to the ground at the first coil part 141b corresponding to the S pole 116S, the electromagnetic force DEM acts in a z-axis direction based on the Fleming's left-hand rule.

At this time, since a third driving part 141 including the first coil part 141b is in a fixed state, the first lens assembly 110, which is a mover on which the first magnet 116 is disposed, may be moved back and forth along a rail of the first guide part 210 in a direction parallel to the z-axis direction by the electromagnetic force DEM according to a current direction. The electromagnetic force DEM may be controlled in proportion to the current DE applied to the first coil part 141b.

Likewise, an electromagnetic force DEM is generated between a second magnet (not shown) and the second coil part 142b of the camera module according to the embodiment, and thus the second lens assembly 120 may be moved along a rail of the second guide part 220 horizontally with respect to the optic axis.

<Third Lens Assembly>

Next, FIG. 9 is a perspective view of a third lens assembly 130 in the camera module according to the embodiment shown in FIG. 3 in a first direction, and FIG. 10 is a perspective view of the third lens assembly 130 shown in FIG. 9 in a second direction, and is a perspective view in which a third lens 133 is removed.

Referring to FIG. 9, in an embodiment, the third lens assembly 130 may include a third housing 21, a third barrel 131, and a third lens 133.

In the embodiment, the third lens assembly 130 includes a barrel recess 21r at an upper end of the third barrel 131, and thus there is a complex technology effect that a thickness of the third barrel 131 of the third lens assembly 130 may be adjusted to be constant, and accuracy of dimensional control may be improved by reducing an amount of injection material.

In addition, according to the embodiment, the third lens assembly 130 may include a housing rib 21a and a housing recess 21b in the third housing 21.

In the embodiment, the third lens assembly 130 includes the housing recess 21b in the third housing 21, and thus there is a complex technology effect that accuracy of dimensional control may be improved by reducing the amount of injection material, and strength may be secured by including the housing rib 21a in the third housing 21.

Next, referring to FIG. 10, the third lens assembly 130 may include a single or a plurality of housing holes in a third housing 21. For example, the housing hole may include a third regular hole 22ha and a third long hole 22hb around a third barrel 131 of the third housing 21.

The housing hole may be coupled to a first protrusion 214p of a first guide part 210 and a second protrusion 224p of a second guide part 220.

The third regular hole 22ha may be a circular hole, and in the third long hole 22hb, a diameter in a first axis direction may be different from that in a second axis direction perpendicular the first axis direction. For example, in the third long hole 22hb, a diameter in the y-axis direction perpendicular to the x-axis may be larger than that in the x-axis direction horizontal to the ground.

The housing hole of the third lens assembly may include two third regular hole 22ha and two third long hole 22hb.

The third regular hole 22ha may be disposed below the third housing 21, and the third long hole 22hb may be disposed above the third housing 21, but the embodiment is not limited thereto. The third long hole 22hb may be positioned diagonally to each other, and the third regular hole 22ha may be positioned diagonally to each other.

In an embodiment, the third housing 21 of the third lens assembly 130 may include a single or a plurality of housing protrusions 21p. In the embodiment, the housing protrusion 21p is provided inside the third housing 21, and thus it is possible to prevent reverse insertion, and to prevent the third housing 21 from being coupled to the base 20 by turning left and right.

The number of the housing protrusions 21p may be plural, for example, four, but the embodiment is not limited thereto. Referring also to FIG. 11B, the housing protrusion 21p may be coupled to a side recess 23a disposed on a base-side protruding portion 23a.

<Base>

Next, FIG. 11A is a perspective view of the base 20 of the camera module according to the embodiment shown in FIG. 3, FIG. 11B is a front view of the base 20 shown in FIG. 11A, and FIG. 12 is an enlarged view of a first region 21cA of the base 20 shown in FIG. 11B.

Referring to FIG. 3, the first guide part 210, the second guide part 220, the first lens assembly 110, the second lens assembly 120, etc. may be disposed in the base 20 according to the embodiment. The third lens assembly 130 may be disposed at one side surface of the base.

Referring again to FIG. 11A, the base 20 may have a rectangular parallelepiped shape having a space therein.

For example, the base 20 may include a first side wall 21a, a second side wall 21b, a third side wall 21c, and a fourth side wall 21d, and the base 20 may include a plurality of side walls and a base upper surface 21e, and a base lower surface 21f.

For example, the base 20 may include the first side wall 21a and the second side wall 21b corresponding to the first side wall 21a. For example, the second side wall 21b may be disposed in a direction facing the first side wall 21a.

The first side wall 21a and the second side wall 21b may include a first opening 21bO and a second opening (not shown), respectively.

In addition, the base 20 may further include the third side wall 21c disposed between the first side wall 21a and the second side wall 21b and connecting the first side wall 21a and the second side wall 21b. The third side wall 21c may be disposed in a direction perpendicular to the first side wall 21a and the second side wall 21b.

The first, second, and third side walls 21a, 21b, and 21c may be formed in an injection shape integrally with each other, or may be in a form in which each of configurations is coupled.

Referring to FIG. 11B, a base protrusion may be disposed on the fourth side wall 21d of the base 20.

The base protrusion may include a first base protrusion 22p1, a second base protrusion 22p2, a third base protrusion 22p3, and a fourth base protrusion 22p4 disposed on the fourth side wall 21d.

The first to fourth base protrusions 22p1, 22p2, 22p3, and 22p4 may be coupled to a first guide part hole 210h and a second guide part hole 220h.

The fourth side wall 21d may be in an opened form, and may include a fourth opening 21dO.

The first guide part 210, the second guide part 220, the first lens assembly 110, and the second lens assembly 120 may be detachably coupled to the inside of the base 20 through the fourth opening 21dO.

Next, referring to FIGS. 11A and 11B, the base 20 may include a base protruding portion 23b protruding in a z-axis direction from the fourth side wall 21d. In the embodiment, the base protruding portion 23b is provided on the fourth side wall 21d, so that when the first guide part 210 and the second guide part 220 are assembled to the base 20, epoxy or adhesive is applied for bonding between the base 20 and the third housing 21 of the third lens assembly, thereby improving a strong bonding force.

In addition, the embodiment may include a side protruding portion 23a extending in an x-axis direction of the fourth side wall 21d of the base 20. The side protruding portion 23a of the base 20 may serve a guiding function when a main FPCB (sensor FPCB) is coupled to the base 20.

Subsequently, referring to FIG. 11A, the base 20 may include the base upper surface 21e and the base lower surface 21f.

The base upper surface 21e may include a base upper groove 21er.

In the embodiment, the base upper groove 21er is provided on the base upper surface 21e, and thus a thickness of a cross section thickened for assembling the first and second guide parts 210 and 220 is constant, thereby preventing shrinkage during injection.

The base upper surface 21e may include a base upper rib 21ea.

In the embodiment, the upper rib 21ea is disposed on the base upper surface 21e, and thus it is possible to serve as a guide at the time of placing a FPCB, and serve a function of adjusting a thickness of a placing portion and a non-placing portion of the FPCB.

In addition, in the embodiment, the base lower surface 21f may include a base step 21s.

In the embodiment, the base step 21s is provided at the base lower surface 21f, thereby improving robust reliability of the first and second driving parts mounted therein.

Next, FIG. 12 is an enlarged view of the first region 21cA of the third side wall 21c of the base shown in FIG. 11B.

In an embodiment, the third side wall 21c of the base may include a base hole.

For example, the base hole may include a single or a plurality of regular holes and a single or a plurality of long holes on the third side wall 21c.

For example, the third side wall 21c may include a fourth-first regular hole 21ha1, a fourth-second regular hole 21ha2, a fourth-first long hole 21hb1, and a fourth-second long hole 21hb2.

The base hole may be coupled to a first-third protrusion 214p3 and a first-fourth protrusion 214p3 of the first guide part 210 and a second-fourth protrusion (not shown) of the second guide part 220.

The fourth-first regular hole 21ha1 and the fourth-second regular hole 21ha2 may be circular holes, and the fourth-first long hole 21hb1 and the fourth-second long hole 21hb2 may have different diameters in a first axis direction and a second axis direction perpendicular thereto. The fourth-first regular hole 21ha1 and the fourth-second regular hole 21ha2 may be disposed diagonally. In this case, the fourth-first long hole 21hb1 and the fourth-second long hole 21hb2 may be disposed diagonally. However, the embodiment is not limited thereto, the fourth-first regular hole 21ha1 and the fourth-second regular hole 21ha2 may be disposed above the first region 21cA, and the fourth-first long hole 21hb1 and the fourth-second long hole 21hb2 may be disposed below the first region 21cA.

<Eccentric Features>

Next, FIG. 13A is an illustrative view showing a combination of the third lens assembly 130 and the first guide part 210 in the camera module according to the embodiment shown in FIG. 3, FIG. 13B is an enlarged view showing a correspondence between a plane and a cross section of a third regular hole 22hb, which is a coupling region of the third lens assembly 130 shown in FIG. 13A, and FIG. 13C a cross-sectional example view showing a combination of the third lens assembly 130 and the first guide part 210 shown in FIG. 13A.

Specifically, in FIG. 13A, a region in which the first-second protrusion 214p2 of the first guide part 210 and the third regular hole 22ha of the third housing are coupled is indicated by a first region 214PH, and FIG. 13C is a cross-sectional view of a state in which they are coupled.

FIG. 13B is a cross-sectional view taken along line A1-A2 in FIG. 13B.

Referring to FIG. 13B, the third regular hole 22ha of the third housing 21 may include a third groove 22hr and a third hole 22ht disposed in the third groove 22hr.

In the embodiment, a center 22hrc of the third groove and a center 22htc of the third hole do not coincide with each other and may be eccentric.

According to the embodiment, the center 22hrc of the third groove and the center 22htc of the third hole do not coincide, are spaced apart from each other, and are eccentrically disposed in the third regular hole 22ha of the third housing 21 in order to increase the accuracy of lens alignment between a plurality of lens groups, and thus there is a technical effect that decenter and lens tilt may be minimized during zooming by increasing the accuracy of alignment between the lens groups.

Next, referring to FIG. 13C, there is a cross-sectional view taken along line A1-A2 of the first region 214PH in which the first-second protrusion 214p2 of the first guide part 210 and the third regular hole 22ha of a third housing are coupled.

In the embodiment, the first-second protrusion 214p2 may protrude from the first guide part 210, and a first-second recess 214r2 in a circular shape may be disposed around the first-second protrusion 214p2.

According to the embodiment, a center 214p2c of the first-second protrusion may not coincide with a center of the first-second recess or the center 22hrc of the third groove.

According to the embodiment, a center of a protrusion of the first guide part 210 and a center of a groove of the third housing do not coincide, are spaced apart from each other, and are eccentrically disposed in order to increase the accuracy of lens alignment between a plurality of lens groups, and thus there is a technical effect that decenter and lens tilt may be minimized during zooming by increasing the accuracy of alignment between the lens groups.

Next, FIG. 14A is an illustrative view showing a combination of a base 20 and a first guide part 210 of the camera module according to the embodiment shown in FIG. 3, and FIG. 14B is a cross-sectional example view showing a combination of a first regular hole 210ha and a first base protrusion 22p1 of the first guide part 210 shown in FIG. 14A.

FIG. 14C is a cross-sectional view showing a combination of the base 20 and the first guide part 210 shown in FIG. 14A.

Specifically, in FIG. 14A, a region in which the first base protrusion 22p1 of the base 20 and the first regular hole 210ha the first guide part are coupled is indicated by a second region 22PH, and FIG. 14C is a cross-sectional view of a state in which they are coupled.

(b) of FIG. 14B is a cross-sectional view taken along line A1-A2 in (a) of FIG. 14B.

Referring to FIG. 14B, the first regular hole 210ha of the first guide part 210 may include a first groove 210hr and a first hole 210ht disposed in the first groove 210hr.

In the embodiment, a center 210*hrc* of the first groove and a center 210*htc* of the first hole do not coincide with each other and may be eccentric.

According to the embodiment, a center of the first groove 210*hr* and centers of grooves of the first and second guide parts do not coincide, are spaced apart from each other, and are eccentrically disposed in the first groove 210*hr* of the first regular hole 210*ha* of the first guide part 210 in order to increase the accuracy of lens alignment between a plurality of lens groups, and thus there is a technical effect that decenter and lens tilt may be minimized during zooming by increasing the accuracy of alignment between the lens group.

Next, referring to FIG. 14C, there is a cross-sectional view along line A3-A4 of the second region 22PH in which the first base protrusion 22*p*1 of the base 20 and the first regular hole 210*ha* of the first guide part are coupled.

In the embodiment, the first base protrusion 22*p*1 may protrude from the base 20, and a first base recess 20*r* in a circular shape may be disposed around the first base protrusion 22*p*1.

According to the embodiment, a center 22*p*1*c* of the first base protrusion may not coincide with a center of the first base recess or the center 210*htc* of the first groove.

According to the embodiment, a center of a protrusion of the base and centers of grooves of the first and second guide parts do not coincide with each other, are spaced apart from each other, and are eccentrically disposed in order to increase the accuracy of lens alignment between a plurality of lens groups, and thus there is a technical effect that decenter and lens tilt may be minimized during zooming by increasing the accuracy of alignment between the lens groups.

Referring again to FIG. 12, as described above, a third side wall 21*c* of the base may include the fourth-first regular hole 21*ha*1, the fourth-second regular hole 21*ha*, the fourth-first long hole 21*hb*1, and the fourth-second long hole 21*hb*2. The base hole may be coupled to the first-third protrusion 214*p*3 and the first-fourth protrusion 214*p*3 of the first guide part 210, and the second-fourth protrusion (not shown) of the second guide part 220.

At this time, in the embodiment, the fourth-first regular hole 21*ha*1, the fourth-second regular hole 21*ha* may include a fourth-first groove (not shown) or a fourth-second groove (not shown), respectively.

At this time, in the embodiment, a center of the fourth-first groove and a center of the fourth-second groove do not coincide with a center of the fourth-first regular hole and a center of fourth-second regular hole, respectively, and may be eccentric.

According to the embodiment, the center of the fourth-first groove and the center of the fourth-second groove do not coincide with the center of the fourth-first regular hole and the center of fourth-second regular hole, respectively, are spaced apart from each other, and are eccentrically disposed in order to increase the accuracy of lens alignment between a plurality of lens groups, and thus there is a technical effect that decenter and lens tilt may be minimized during zooming by increasing the accuracy of alignment between the lens groups.

In addition, according to the embodiment, a center of the first-third protrusion 214*p*3 of the first guide part 210 and a center of the second-fourth protrusion (not shown) of the second guide part 220 do not coincide with the center of the fourth-first groove and the center of the fourth-second groove, respectively.

According to the embodiment, the center of the first-third protrusion 214*p*3 of the first guide part 210 and the center of the second-fourth protrusion (not shown) of the second guide part 220 do not coincide with the center of the fourth-first groove and the center of the fourth-second groove, respectively, are spaced apart from each other, and are eccentrically disposed in order to increase the accuracy of lens alignment between a plurality of lens groups, and thus there is a technical effect that decenter and lens tilt may be minimized during zooming by increasing the accuracy of alignment between the lens groups.

<Position Sensor Arrangement Structure>

As described above, when implementing AF or Zoom in the related art, a plurality of lens assemblies are driven by electromagnetic force between a magnet and a coil, a Hall sensor is disposed inside the winding of the coil to obtain position information of the lens assembly. The inside of the winding of the coil in which the Hall sensor is disposed may be hollow of the coil. The Hall sensor may obtain position information of the lens assembly by sensing a change in magnetic flux of a magnet disposed on the lens assembly by the Hall sensor. However, when the Hall sensor is located inside the coil, a distance between the Hall sensor and the magnet is determined by the height of the coil.

However, in the related art, there is a thrust required for movement of the lens assembly, and the height of the coil is required to be higher than a predetermined height in order to secure such thrust.

However, when the height of the coil is increased in this way, the distance between the hall sensor and the magnet is increased by the increased height of the coil. Due to this, since the magnetic flux of the magnet is blocked, there is a technical contradiction in which the sensitivity of the magnetic flux sensed by the Hall sensor disposed inside the coil is weakened. Conversely, if the height of the coil is reduced, the electromagnetic force between the magnet and the coil is weakened, so there is a problem in that the thrust for AF or Zoom operation is lowered.

According to the unpublished internal technology of the applicant, in order to solve this problem, the optimal point of the sensitivity and thrust of the Hall sensor is set by a coil of an appropriate height. However, a decrease in thrust or a decrease in the sensitivity of the Hall sensor may cause an issue in the precision of camera control. In addition, such a problem may be directly related to the safety or life of a user, a driver or a pedestrian, due to a decent or tilt phenomenon of the camera module.

Accordingly, one of the technical problems of the embodiment is to provide a camera actuator capable of simultaneously increasing the sensitivity of the hall sensor while increasing the thrust, and a camera module including the same.

FIG. 15A is a cross-sectional view taken along line C1-C2 in the camera module according to the embodiment shown in FIG. 1.

Referring to FIG. 15A, the camera module 100 according to the embodiment may include a base 20 and a lens assembly disposed on the base 20. For example, a third lens assembly 130, a first lens assembly 110, and a second lens assembly 120 may be sequentially disposed on the base 20 based on a light incident direction, and an image sensor 180 may be disposed on a rear side of the second lens assembly 120.

As described above, the camera module 100 according to the embodiment may be driven by an electromagnetic force of a predetermined magnet and coil part.

For example, referring to FIG. 15A, in the camera module according to the embodiment, the first lens assembly 110 may include a first driving part 116 and a third driving part 141, and the second lens assembly 120 may include a second driving part 126 and a fourth driving part 142.

The first driving part 116 and the second driving part 126 may be magnet driving parts, and the third driving part 141 and the fourth driving part 142 may be coil driving parts, but the embodiment is not limited thereto.

Hereinafter, it will be described as a case in which the first driving part 116 and the second driving part 126 are magnet driving parts, respectively, and the third driving part 141 and the fourth driving part 142 are coil driving parts, respectively.

In the camera module according to the embodiment, in the first lens assembly 110, the first driving part 116 may include a first magnet 116b and a first yoke 116a, and the third driving part 141 may include a first coil part 141b and a third yoke 141a. The third driving part 141 may include a first circuit board 41a between the first coil part 141b and the third yoke 141a.

In addition, the embodiment may include a first spacer 141c disposed on the base 20 and a first position detection sensor 71 disposed on the first spacer 141c. The first spacer 141c may be formed of at least one of polycarbonate (PC), polyethylene terephthalate glycol (PETG), polyethylene (PE), and polypropylene (PP), but is not limited thereto.

The first position detection sensor 71 may be a magnetic sensor. For example, the first position detection sensor 71 may be any one of a solid-state magnetic sensor such as a Hall sensor, a coil-type magnetic sensor, or a resonance-type magnetic sensor, but is not limited thereto.

In addition, in the camera module according to the embodiment, in the second lens assembly 120, the second driving part 126 may include a second magnet 126b and a second yoke 126a, and the fourth driving part 142 may include a second coil part 142b and a fourth yoke 142a. The fourth driving part 142 may include a second circuit board 41b between the second coil part 142b and the fourth yoke 142a.

In addition, the embodiment may include a second spacer 142c disposed on the base 20 and a second position detection sensor 72 disposed on the second spacer 142c. The second spacer 142c may be formed of at least one of polycarbonate (PC), polyethylene terephthalate glycol (PETG), polyethylene (PE), and polypropylene (PP), but is not limited thereto.

The second position detection sensor 72 may be any one of a coil-type magnetic sensor, a solid-state magnetic sensor such as a Hall sensor, or a resonance-type magnetic sensor, but is not limited thereto.

Next, FIG. 15B is a driving example view of a camera module according to an embodiment.

Referring to FIG. 15B, as described with reference to FIG. 8B, the first lens assembly 110 may be driven in an optical axis direction by an electromagnetic force (DEM) between the first magnet 116b of the first driving part 116 and the first coil part 141b of the third driving part 141.

Hereinafter, the technical characteristics of the arrangement structure of the position sensor in the embodiment will be described in detail based on FIGS. 15A and 16A to 17H.

FIG. 16A is an enlarged view of the S region shown in FIG. 15A, and FIG. 16B is a detailed view of the S region shown in FIG. 16A.

First, referring to FIGS. 15A and 16A, the embodiment may include a base 20, a first lens assembly 110 disposed in the base 20, and a third driving unit 141 which is a coil driving unit disposed on the base 20, a first spacer 141c disposed on the base 20, and a first position detection sensor 71 disposed on the first spacer 141c.

The third driving unit 141 may include a first circuit board 41a disposed between the first coil unit 141b and the third yoke 141a.

The first coil unit 141b and the first position detection sensor 71 may be electrically connected to the first circuit board 41a.

Next, referring to FIG. 16B, the first spacer 141c may include a first support part 141c1 and a first protrusion part 141c3 protruding from the first support part 141c1, and the detection sensor 71 may be disposed on the first protrusion 141c3, and the first protrusion 141c3 may be disposed in the hollow of the first coil unit 141b which is a coil driving unit.

In this case, the embodiment may include a first connection part 141c2 connecting the first protrusion part 141c3 and the first support part 141c1.

Also, referring to FIG. 16B, the first circuit board 41a may include a first substrate region 41a1 disposed on the first spacer 141c and a second substrate region 41a3 spaced apart from the first substrate region 41al. The first circuit board 41a may include a second-second substrate region 41a2 connecting the first substrate region 41a1 and the second substrate region 41a3. The first position detection sensor 71 may be disposed on the second substrate area 41a3, and the second substrate area 41a3 may be disposed in the hollow of the first coil unit 141b serving as a coil driving unit.

Also, referring to FIG. 15A, the embodiment may include a base 20, a second lens assembly 120 disposed in the base 20, and a fourth driving unit 142a which is a coil driving unit disposed in the base 20, a second spacer 142c disposed on the base 20, and a second position detection sensor 72 disposed on the second spacer 142c.

In addition, the second spacer 142c may adopt the technical characteristics of the first spacer 141c. For example, referring to FIG. 15A, the second spacer 142c may include a second protrusion (not shown) protruding from the second support part (not shown), and the second position detection sensor 72 disposed on the second protrusion, and the second protrusion may be disposed in the hollow of the fourth driving unit 142 that is the coil driving unit.

The second protrusion may include a second seating part (not shown), and the second position sensor 72 may be disposed on the second seating part.

Also, referring to 15A, the second circuit board 41b may include a third substrate region (not shown) disposed on the second spacer 142c, and a fourth substrate region (not shown) spaced apart from each other. The second circuit board 41b may include a fourth-second substrate region connecting the third substrate region and the fourth substrate region.

The second position detection sensor 72 may be disposed on the fourth-second substrate region, and the fourth-second substrate region may be disposed in the hollow of the fourth driving unit 142 that is the coil driving unit.

Referring back to FIG. 16B, as described in FIG. 15B, the first lens assembly 110 may be driven in the optical axis direction by the electromagnetic force DEM between the first magnet 116b of the first driving unit 116 and the first coil units 141b of third driving unit 141.

At this time, the electromagnetic force DEM may be affected by the distance DCM between the first magnet 116b and the first coil unit 141b.

The magnetic flux of the magnet detected by the Hall sensor is changed according to the separation distance between the Hall sensor and the magnet, and thus the position sensing performance of the Hall sensor can be affected.

For example, FIG. 16C is magnetic flux data according to the separation distance between the magnet and the first position detection sensor 71 in embodiment and comparative examples.

In the related art, it is necessary to ensure the height of the coil unit in order to secure thrust. In the related, as the Hall sensor is disposed on the PCB at the bottom of the coil unit, the higher the height of the coil unit, the higher the magnet and the Hall sensor. As the separation distance between the magnets increases, there is a technical limit in that the first distance DH1 separated between the magnet and the hall sensor should be at least 800 µm or more.

Accordingly, in the conventional internal technology (comparative example), the magnetic flux of the magnet detected by the Hall sensor was a level of securing about 50 (mT) level.

In addition, in the related art, when the height of the coil increases, the magnetic flux of the magnet that can be introduced into the hall sensor disposed in the hollow part of the coil is partially blocked, so that the sensitivity of the hall sensor is lowered.

On the other hand, according to the embodiment, the first spacer 141c may include the first protrusion 141c3 protruding from the first support 141c1. And the first position detection sensor 71 is disposed on the first protrusion 141c3, the second distance DH2 between the first magnet 116b and the first position detection sensor 71 may be significantly reduced. Accordingly, there is a technical effect of significantly improving the magnetic flux dl of the first magnet 116b detected by the first position detection sensor 71.

For example, according to the embodiment, as the first position detection sensor 71 is disposed on the first protrusion 141c3, the second distance between the first magnet 116b and the first position detection sensor 71 (DH2) can be secured as 400 µm or less more than twice as short as compared to the comparative example. Accordingly, there is a unique technical effect in that the magnetic flux between the first magnet 116b and the first position detection sensor 71 can be secured up to about 150 (mT), about three times higher than that of the comparative example.

Also, according to the embodiment, the first position detection sensor 71 is disposed on the first protrusion 141c3. Accordingly, although the first position detection sensor 71 is disposed in the hollow of the first coil unit 141b, the first position detection sensor 71 is almost exposed to the first magnet 116b, and thus there is a special technical effect that the blockage of magnetic flux by the first coil unit 141b can be significantly reduced.

Accordingly, the camera actuator and the camera module including the same according to the embodiment have a unique technical effect that can simultaneously increase the sensitivity of the hall sensor while increasing the thrust.

Next, FIG. 17A is a perspective view of the third driving unit 141b and the circuit board 41 in the camera module according to the embodiment shown in FIG. 2, and FIG. 17B is a perspective view of the circuit board 41 in the camera module according to the embodiment shown in 17A.

Referring to FIGS. 17A and 17B, the circuit board 41 in the embodiment may include a first circuit board 41a disposed between the first position detection sensor 71 and the first spacer 141c and a second circuit board 41b disposed between the second position detection sensor 72 and the second spacer 142c.

Referring to FIG. 17B, the circuit board 41 may include a fifth substrate region 41c connecting the first circuit board 41a and the second circuit board 41b.

In addition, the circuit board 41 may include a sixth substrate region 41d and a seventh substrate region (41e) extending from the first circuit board 41a and electrically connected to a main circuit board (not shown).

Next, FIG. 17C is a perspective view of the first circuit board 41a and the first position detection sensor 71 in the circuit board 41 of the embodiment shown in FIG. 17B.

According to the embodiment, the second substrate region 41a3 of the first circuit board 41a may include a second substrate groove 41a3r. For example, the second substrate region 41a3 may include second substrate grooves 41a3r at one or both corners of the second substrate region 41a3. The coupling protrusion 141c3p (see FIG. 17D) of the first spacer, which will be described later, can be coupled to the second substrate groove 41a3r of the first circuit board 41a, so that the substrate region 41a3 where the first position sensor 71 is seated can be stably supported.

Through this, by precisely controlling the distance between the first position detection sensor 71 and the first magnet 116b, the precision of camera control is remarkably improved such that there is a special technical effect in that de-centering or tilting of the camera module can be prevented.

In addition, the first substrate region of the first circuit board 41a may include a first substrate groove 41r.

Accordingly, the first coupling protrusion 141c1p (see FIG. 17G) provided on the first support portion 141c1 of the first spacer may be firmly coupled to the first substrate groove 41r of the first circuit board such that it is possible to significantly improve the precision of the control of the camera module and the mechanical reliability.

Next, FIG. 17D is a plan view of the third driving unit CS1 in the embodiment shown in FIG. 17A, and FIG. 17E is a cross-sectional view taken along line SA1-SA2 of FIG. 17D.

According to the embodiment, the first circuit board 41a can be disposed on the first spacer 141c, and the first coil unit 141b can be disposed on the first spacer 141c and the first circuit board 41a.

In addition, a first substrate recess 41a1r may be provided in the first substrate region 41al of the first circuit board 41a to serve as an escape function of the coil start line CSL. Accordingly, it is possible to secure a path for the coil start line CSL of the first coil part 141b to the first substrate hole 41a1H1 and to improve the mechanical and electrical reliability of the coil start line CSL.

Referring to FIG. 17E, the first spacer 141c includes the first support part 141cl and a first protrusion part 141c3 protruding from the first support part 141c1, and the first position detection sensor 71 may be disposed on the first protrusion 141c3.

At this time, in the first support part 141c1, the first thickness T1 of the first-first support part 141c1a overlapping the first coil part 141b may be thinner than the second thickness T2 of the first-second support portion 141cb not overlapping the first coil part 141b.

According to the embodiment, the thickness of the first support portion 141c1 of the first spacer 141c can be precisely classified and controlled for overlapping region and non-overlapping region with the first coil unit 141b, and overlapping region and non-overlapping region with the first circuit board 41a. Accordingly, when the first coil unit 141b is mounted, the horizontal degree is precisely controlled to significantly improve the precision of camera control, thereby having a special technical effect that can prevent a decent or tilt phenomenon of the camera module.

In addition, the first spacer 141*c* may include a coupling protrusion 141*c*3*p*. In addition, the coupling protrusion 141*c*3*p* may be coupled to the second substrate groove 41*a*3*r* (see FIG. 17C) of the first circuit board 41*a*, and accordingly, the second substrate region 41*a*3 on which the first position sensor 71 is seated can be stably supported.

Through this, the position of the moving lens assembly can be accurately identified by arranging the distance between the first position sensor 71 and the first magnet 1116*b* closer. The embodiment has a special technical effect that can prevent the camera module from decentralizing or tilting by remarkably improving the precision of camera control.

In addition, in the embodiment, the first spacer 141*c* includes a first support space 141*cr*1 between the first-first support part 141*c*1*a* and the first-second support part 141*cdb* to inject the first spacer 141*c*. Accordingly, in the embodiment, it is possible to precisely control the forming process of the first spacer 141*c*, such as preventing shrinkage during injection of the first spacer 141*c*, and it is possible to reduce the weight of the first spacer itself, and to reduce the weight of the first circuit such that there is a special technical effect that can effectively dissipate heat generated from the substrate 41*a*.

In addition, the first protrusion 141*c*3 of the first spacer 141*c* may have a second support space 141*cr*2 on its upper side. Accordingly, heat generated from the first circuit board 41*a* or the first position sensor 71 can be effectively dissipated, and the bonding force is improved by including an adhesive for fixing the first circuit board, thereby improving mechanical reliability.

Referring back to FIG. 17D, the first circuit board 41*a* may include a first substrate hole 41*a*1H1 through which the coil start line CSL can pass in the first coil part 141*b*, a second substrate hole 41*a*1H2 through which the coil end line CEL may pass.

Next, FIG. 17F is a perspective view in which the circuit board 41 is omitted in the embodiment shown in FIG. 17A, FIG. 17G is a right perspective view of the first spacer 141*c* and the third yoke 141*a* shown in FIG. 17F, and FIG. 17G is a left perspective view of the first spacer 141*c* and the third yoke 141*a* shown in FIG. 17F.

Referring to FIG. 17G, the first spacer 141*c* may include a coupling protrusion 141*c*3*p*, and the coupling protrusion 141*c*3*p* can be formed in the second substrate groove 41*a*3*r* of the first circuit board 41*a*, it is possible to stably support the second substrate area 41*a*3 on which the first position sensor 71 is seated. Through this, by precisely controlling the distance between the first position sensor 71 and the first magnet 116*b*, there are special technical effects in that the precision of camera control can be remarkably improved, thereby preventing a decent or tilt phenomenon of the camera module.

In addition, according to the embodiment, the second substrate groove 41*a*3*r* in which the engaging protrusion 141*c*3*p* and the engaging protrusion 141*c*3*p* are disposed is formed in a semicircular shape, so that the mounting area of the second substrate region 41*a*3 may be increased compared to the case in which the engaging protrusion 141*c*3*p* or the second substrate groove 41*a*3*r* is formed in another shape such as a circle.

Also briefly referring to FIG. 17C, the first substrate region of the first circuit board 41*a* may include a first substrate groove 41*r*.

Referring back to FIG. 17G, the first spacer 141*c* may include first coupling protrusions 141*c*1*p* provided at one or both ends of the first support 141*c*1.

According to the embodiment, the first coupling protrusion 141*c*1*p* of the first support 141*cl* is firmly coupled to the first substrate groove 41*r* of the first circuit board, thereby improving the precision of the control of the camera module and improving the mechanical reliability.

Next, referring to FIG. 17H, the third yoke 141*a* has a yoke groove (not shown), and the first support portion 141*cl* has a second coupling protrusion 141*cb* coupled to the yoke groove of the third yoke.

Through this, by securing a strong coupling force between the third yoke 141*a* and the first spacer 141*c*, the precision of the camera control and the mechanical reliability are significantly improved, there is a special technical effect that can prevent the phenomenon of de-centering or tilting of the camera module.

In addition, the second coupling protrusion 141*cb* may serve as a guide so that the third yoke 141*a* is disposed at the correct position of the first spacer 141*c*. This has the effect of improving the thrust by improving the electromagnetic force between the magnet and the coil used to move the lens assembly by disposing the third yoke 141*a* in the correct position.

<Structure for Preventing Magnetic Field Interference>

Next, one of the technical problems of the embodiment is a camera actuator capable of preventing magnetic field interference between magnets mounted on each lens assembly when a plurality of lens assemblies are driven by electromagnetic force between magnets and coils when implementing AF or Zoom and to provide a camera module including the same.

In addition, one of the technical problems of the embodiment is to provide a camera actuator capable of preventing the detachment of the magnet and the yoke, and a camera module including the same.

Hereinafter, the magnetic field interference prevention structure of the embodiment will be described with reference to FIGS. 18A to 18G.

Next, FIG. 18A is a perspective view of the first driving unit 116 in the camera module according to the embodiment shown in FIG. 15B.

Referring to FIG. 18A, in the embodiment, the first driving part 116 may include a first magnet 116*b* and a first yoke 116*a*, and the first yoke 116*a* may include a first support portion 116*al* and a first side protruding portion 116*a*2 extending from the first support portion 116*al* toward a side surface of the first magnet 116*b*.

The first side protruding portion 116*a*2 may be disposed on both side surfaces of the first magnet 116*b*.

In addition, the first yoke 116*a* may include a first fixed protruding portion 116*a*3 extending in a different direction, for example, in a direction opposite to the first side protruding portion 116*a*2.

The first fixed protruding portion 116*a*3 may be disposed at a position about a middle of the first support portion 116*al*, but the embodiment is not limited thereto.

Similarly, in the embodiment, the second driving part 126 may include a second magnet 126*b* and a second yoke 126*a*, and the second yoke 126*a* may include a second support portion (not shown) and a second side protruding portion extending from the second support portion toward a side surface of the second magnet 126*b* (hereinbefore, see a structure of the second yoke 126*a* in FIG. 15A).

The second side protruding portion may be disposed on both side surfaces of the second magnet 126*b*. In addition, the second yoke 126*a* may include a second fixed protruding portion (not shown) extending in a different direction, for example, in a direction opposite to the second side protruding portion. The second fixed protruding portion may be disposed at a position about a middle of the second support portion, but the embodiment is not limited thereto.

In the related art, in addition, when implementing AF or Zoom, a plurality of lens assemblies are driven by an electromagnetic force between a magnet and a coil, and there is a problem that a magnetic field interference occurs between magnets mounted in each lens assembly. There is a problem that AF or Zoom driving is not performed normally, and thrust is deteriorated due to such a magnetic field interference between magnets.

In addition, there is a problem that a decent or tilt phenomenon due to a magnetic field interference between magnets is induced.

When an issue in a precision in camera control occurs or thrust is deteriorated due to such a magnetic field interference, or a decent or tilt phenomenon is induced, it may be directly related to the safety or life of a driver who is a user or pedestrian.

For example, FIG. 18B shows data of a magnetic flux density distribution in Comparative Example.

Comparative Example of FIG. 18B is a non-disclosed internal technology of an applicant, and has a structure applied so as to perform a shielding function of magnetic flux by disposing a back yoke for a magnet. A shielding performance of the magnetic flux is improved by applying back yoke technology for the magnet, but there are technical problems as follows.

For example, referring to FIG. 18B, it is magnetic flux density data between respective magnets mounted in the first lens assembly and the second lens assembly, and thus there is a problem that magnetic field interference (IF) occurs between the respective magnets, and loss of thrust occurs due to leakage (LE) of the magnetic flux generated in each magnet.

In particular, in case of a high-magnification Zoom Actuator applied recently, there is a problem that not only magnetic field interference occurs between permanent magnets of the first lens assembly and the second lens assembly, which are moving lenses, but also the magnetic field interference (IF) with a magnet of the OIS actuator occurs.

Movement of each group is disturbed due to the magnetic field interference (IF), and as a result, there is a problem that an input current is also increased.

According to the embodiment, a yoke in a magnet driving part of the first lens assembly 110 or the second lens assembly 120 includes a side protruding portion extending to a side surface of the magnet, and thus there is a special technical effect that it is possible to provide a camera actuator capable of preventing a magnetic field interference between magnets mounted on each lens assembly when a plurality of lens assemblies are driven by an electromagnetic force between a magnet and a coil when AF or Zoom is implemented, and a camera module including the same.

For example, FIG. 18C shows data of a magnetic flux density distribution in Example.

Referring to FIG. 18C, it is magnetic flux density data between respective magnets mounted in the first lens assembly and the second lens assembly, and a yoke in a magnet driving part of the first lens assembly 110 and the second lens assembly 120 includes a side protruding portion extending to a side surface of the magnet, and thus the precision of camera control is improved significantly.

In addition, according to the embodiment, the yoke in the magnet driving part of the first lens assembly 110 or the second lens assembly 120 includes the side protruding portion extending to the side surface of the magnet to prevent leakage flux generated in the magnet, and the side protruding portion is disposed in a region having a high magnetic flux density so that the magnetic flux is concentrated (FC), and thus there is a technical effect that thrust is significantly improved by increasing a density between a flux line and the coil to increase the Lorentz Force.

Next, FIG. 18D is a detailed perspective view of a first yoke 116*a* in the first driving part 116 in Example, and FIG. 18E is a bottom perspective view of the first yoke 116*a*.

The first yoke 116*a* may include a first support portion 116*a*1 and a first side protruding portion 116*a*2 extending from the first support portion 116*a*1 toward a side surface of the first magnet 116*b*. The first side protruding portion 116*a*2 may be disposed on both side surfaces of the first magnet 116*b*.

The first yoke 116*a* may be formed of a ferromagnetic material, but the embodiment is not limited thereto.

The first yoke 116*a* may include a first fixed protruding portion 116*a*3 extending in a different direction, for example, in a direction opposite to the first side protruding portion 116*a*2. In addition, the first yoke 116*a* may include a support portion recess 116*ar* between the first side protruding portion 116*a*2 and the first fixed protruding portion 116*a*3. Structures of the first side protrusion 116*a*2 and the first fixed protrusion 116*a*3 may be more firmly formed by the support portion recess 116*ar*.

According to the embodiment, as the first yoke 116*a* includes the first side protruding portion 116*a*2 extending to the side surface of the first magnet 116*b*, and the first side protruding portion 116*a*2 is disposed on both sides of the first support portion 116*a*1, it is possible to serve a function of firmly fixing the first magnet 116*b*, thereby significantly improving mechanical reliability.

Accordingly, as the first yoke 116*a* includes the first side protruding portion 116*a*2 extending to the side surface of the first magnet 116*b*, there is an effect capable of preventing magnetic field interference between magnets mounted in each lens assembly, and there is a complex technical effect that thrust is improved by concentration of magnetic flux and the mechanical reliability is improved by firmly fixing the first magnet 116*b*.

In addition, the first yoke 116*a* includes the first fixed protruding portion 116*a*3 extending in a different direction, for example, in a direction opposite to the first side protruding portion 116*a*2, and thus there is an effect that a mechanical coupling force is improved.

For example, according to the embodiment, the first yoke 116*a* includes the first fixed protruding portion 116*a*3 extending in a direction opposite to the first side protruding portion 116*a*2, and the first fixed protruding portion 116*a*3 is fixed to the first lens assembly, thereby improving the mechanical reliability.

Meanwhile, according to an additional embodiment, a second thickness T2 of the first side protruding portion 116*a*2 may be formed thicker than a first thickness T1 of the first support portion 116*a*1 (see FIG. 18D). Accordingly, since the thickness of a region having a high magnetic flux density is thicker, a shielding performance of leakage flux is improved and divergence efficiency of magnetic flux density is increased, so that a shielding function of magnetic flux may be improved and a concentration function of magnetic flux may be enhanced.

Next, FIG. 18F is a perspective view of a first driving part 116B of a camera module according to a first additional embodiment.

Referring to FIG. 18F, the third yoke 116A3 may include a first support portion 116a1, a first side protruding portion 116a2 extending from the first support portion 116a1 toward a side surface of the first magnet 116b, and a first extension protruding portion 116a22 extending more upward than an upper surface of the first magnet 116b from the first side protruding portion 116a2.

Accordingly, the total thickness PL of the first side protruding portion 116a2 and the first extension protruding portion 116a22 may be greater than a thickness ML of the first magnet 116b.

According to the first additional embodiment, a yoke in a magnet driving part of a first lens assembly 110 and a second lens assembly 120 includes an extension protruding portion extending more upward than an upper surface of a magnet, and thus there is a special technical effect that leakage flux may be more effectively prevented, and thrust may be significantly improved by maximizing concentration of magnetic flux in a region having a high magnetic flux density.

Next, FIG. 18G is a perspective view of a first driving part 116C of a camera module according to a second additional embodiment.

In the second additional embodiment, the fourth yoke 142a may include a first support portion 116a1, a first side protruding portion 116a2 extending from the first support portion 116a1 toward a first side surface of the first magnet 116b, and a second side protruding portion 116a4 protruding to a second side surface of the first magnet 116b.

The first side surface of the first magnet 116b and the second side surface of the first magnet 116b may not be facing each other.

According to the second additional embodiment, a yoke in a magnet driving part of a first lens assembly 110 and a second lens assembly 120 includes a side protruding portion having a structure surrounding four side surfaces of a magnet, and thus there is a technical effect that leakage flux may be more effectively prevented, and a magnetic flux density in which the leakage flux is prevented may be used to improve thrust.

<Camera Module Coupled to OIS Actuator>

Next, FIG. 19 is a perspective view showing a camera module 1000A to which an OIS actuator 300 is coupled.

The camera module 1000A according to an embodiment may include a single or a plurality of camera actuators. For example, the camera module 1000A according to the embodiment may include a first camera actuator 100 and a second camera actuator 300.

The first camera actuator 100 supports one or a plurality of lenses, and may perform an autofocus function or a zoom function by moving a lens vertically according to a control signal of a predetermined control unit. In addition, the second camera actuator 300 may be an optical image stabilizer (OIS) actuator, but the embodiment is not limited thereto.

Hereinafter, the OIS actuator which is the second camera actuator 300 will be mainly described.

Next, FIG. 20A is a perspective view of the second camera actuator 300 in the camera module 1000A of the embodiment shown in FIG. 19 in a first direction, and FIG. 20B is a perspective view of the second camera actuator 300 in the camera module 1000A of the embodiment shown in FIG. 19 in a second direction.

Referring to FIGS. 20A and 20B, the second camera actuator 300 of the embodiment may include a housing 310, an image shaking control unit 320 disposed on the housing 310, a prism unit 330 disposed on the image shaking control unit 320, and a second driving part 72C (see FIG. 21A) electrically connected to a second circuit board 350.

Accordingly, according to the embodiment, the image shaking control unit 320 is provided, which is disposed on the housing 310, and thus there is a technical effect that it is possible to provide an ultra-thin and ultra-small camera actuator and a camera module including the same.

In addition, according to the embodiment, the image shaking control unit 320 is disposed below the prism unit 330, and thus there is a technical effect that when the OIS is implemented, lens size limitation of an optical system lens assembly may be eliminated, and a sufficient amount of light may be secured.

In addition, according to the embodiment, the image shaking control unit 320 stably disposed on the housing 310 is provided, and a shaper unit 322 and a first driving part 72M of FIG. 22A described later are included, and thus there is a technical effect that when the OIS is implemented through a lens unit 322c including a tunable prism 322cp, occurrence of a decenter or tilt phenomenon may be minimized to achieve the best optical characteristics.

Further, according to the embodiment, when the OIS is implemented, the first driving part 72M, which is a magnet driving part, is disposed on the second camera actuator 300 separated from the first camera actuator 100, and thus there is a technical effect that a magnetic field interference with an AF or Zoom magnet of the first camera actuator 100 may be prevented.

Furthermore, according to the embodiment, unlike the conventional method of moving a plurality of solid lenses, the OIS is implemented by including the lens unit 322c including the tunable prism 322cp, the shaper unit 322, and the first driving part 72M, and thus there is a technical effect that the OIS may be implemented with low power consumption.

Hereinafter, the second camera actuator 300 of the embodiment will be described in more detail with reference to the drawings.

FIG. 21A is a perspective view of the second circuit board 350 and the second driving part 72C of the second camera actuator 300 of the embodiment shown in FIG. 20B, and FIG. 21B is a partially exploded perspective view of the second camera actuator 300 of the embodiment shown in FIG. 20B, and FIG. 21C is a perspective view in which the second circuit board 350 is removed from the second camera actuator of the embodiment shown in FIG. 20B.

First, referring to FIG. 21A, the second circuit board 350 may be connected to a predetermined power supply (not shown) to apply power to the second driving part 72C. The second circuit board 350 may include a circuit board having a wiring pattern that may be electrically connected, such as a rigid printed circuit board (Rigid PCB), a flexible printed circuit board (Flexible PCB), and a rigid flexible printed circuit board (Rigid Flexible PCB).

The second driving part 72C may include a single or a plurality of unit driving parts, and may include a plurality of coils. For example, the second driving part 72C may include a fifth unit driving part 72C1, a sixth unit driving part 72C2, a seventh unit driving part 72C3, and an eighth unit driving part (not shown).

In addition, the second driving part 72C may further include a hall sensor (not shown) to recognize a position of a first driving part 72M (see FIG. 21B) described later. For example, the fifth unit driving part 72C1 may further include a first hall sensor (not shown), and the seventh unit driving part 72C3 may further include a second hall sensor (not shown).

According to the embodiment, the image shaking control unit 320 stably disposed on the housing 310 is provided, and the OIS is implemented through the second driving part 72C which is a coil driving part, the first driving part 72M which is a magnet driving part, and the lens unit 322c including a tunable prism, and thus occurrence of a decenter or tilt phenomenon may be minimized to achieve the best optical characteristics.

In addition, according to the embodiment, unlike the conventional method of moving a plurality of solid lenses, the OIS is implemented by driving the shaper unit 322 through the lens unit 322c including the tunable prism, the first driving part 72M which is a magnet driving part, and the second driving part 72C which is a coil driving part, and thus there is a technical effect that the OIS may be implemented with low power consumption.

Next, referring to FIG. 21B and FIG. 21C, the second camera actuator 300 of the embodiment may include the housing 310, the image shaking control unit 320 including the shaper unit 322 and the first driving part 72M and disposed on the housing 310, the second driving part 72C disposed on the housing 310, and a prism unit 3230 disposed on the image shaking control unit 320 and including a fixed prism 332.

Referring to FIG. 21B, the housing 310 may include a predetermined opening 312H through which light may pass at a housing body 312, and may include a housing side portion 314P extending above the housing body 312 and including a driving part hole 314H in which the second driving part 72C is disposed.

For example, the housing 310 may include a first housing side portion 314P1 extending above the housing body 312 and including a first driving part hole 314H1 in which the second driving part 72C is disposed, and a second housing side portion 314P2 including a second driving part hole 314H2 in which the second driving part 72C is disposed.

According to the embodiment, the second driving part 72C is disposed on the housing side portion 314P, and the OIS is implemented by driving the shaper unit 322 and the lens unit 322c including the tunable prism through the first driving part 72M, which is a magnet driving part, and an electromagnetic force, and thus the OIS may be implemented with low power consumption.

In addition, according to the embodiment, the OIS is implemented by controlling the lens unit 322c including a tunable prism through the second driving part 72C stably fixed on the housing side portion 314P and the first driving part 72M which is a magnet driving part, and thus occurrence of a decenter or tilt phenomenon may be minimized to achieve the best optical characteristics.

Next, the fixed prism 332 may be a right-angle prism, and may be disposed inside the first driving part 72M of the image shaking control unit 320. In addition, in the embodiment, a predetermined prism cover 334 is disposed above the fixed prism 332 so that the fixed prism 332 may be tightly coupled to the housing 310, and thus there is a technical effect that prism tilt and occurrence of decenter at the second camera actuator 300 may be prevented.

In addition, according to the embodiment, the image shaking control unit 320 is disposed so as to utilize a space below the prism unit 330 and overlap each other, and thus there is a technical effect that it is possible to provide an ultra-thin and ultra-small camera actuator and a camera module including the same.

Specifically, according to the embodiment, the prism unit 330 and the lens unit 322c including the tunable prism may be disposed very close to each other, and thus there is a special technical effect that even though a change in an optical path is made fine in the lens unit 322c, the change in the optical path may be widely secured in the actual image sensor unit.

For example, referring briefly to FIG. 25B, a second moving path L1a of light beam changed by the fixed prism 332 may be changed by the tunable prism 322cp to be changed to a third moving path L1b.

At this time, according to the embodiment, the fixed prism 332 and the lens unit 322c including the tunable prism may be disposed very close to each other, and a distance between the lens unit 322c and an image plane 190P of the first lens assembly (not shown) may be secured to be relatively long.

Accordingly, a first distance D1δ reflected on the image plane 190 may be secured widely according to a change in an inclination of a predetermined angle Θ in the tunable prism 322cp, and thus there is a special technical effect that even though the change in the optical path is made fine in the lens unit 322c, the change in the optical path may be widely secured in the actual image sensor unit.

Next, FIG. 22A is an exploded perspective view of the image shaking control unit 320 of the second camera actuator 300 of the embodiment shown in FIG. 21B, and FIG. 22B is a combined perspective view of the image shaking control unit 320 of the second camera actuator of the embodiment shown in FIG. 22A, and FIG. 22C is an exploded perspective view of the first driving part 72M of the image shaking control unit 320 shown in FIG. 22A.

Referring to FIGS. 22A and 22B, in the embodiment, the image shaking control unit 320 may include the shaper unit 322 and the first driving part 72M.

The shaper unit 322 may include a shaper body 322a including a hole through which light may pass, and a protruding portion 322b extending from the shaper body 322a to a side surface thereof and coupled to the first driving part 72M in a first vertical direction.

In addition, the shaper unit 322 may include a lens unit 322c disposed on the shaper body 322a in a second vertical direction opposite to the first vertical direction and including a tunable prism.

Accordingly, according to the embodiment, OIS is implemented through the image shaking control unit 320 including the shaper unit 322 and the first driving part 72M, and the lens unit 322c including the tunable prism, and thus there is a technical effect that occurrence of a decenter or tilt phenomenon may be minimized to achieve the best optical characteristics.

Specifically, referring to FIGS. 22A and 22B, the first driving part 72M may include a single or a plurality of magnet frames 72MH1 and 72MH2 coupled to the protruding portion 322b, and a unit driving part disposed on the magnet frames 72MH1 and 72MH2.

For example, the first driving part 72M may include a first magnet frame 72MH1 and a second magnet frame 72MH2, and a first unit driving part 72M1 and a second unit driving part 72M2 may be disposed on the first magnet frame 72MH, and a third unit driving part 72M3 and a fourth unit driving part 72M4 may be disposed on the second magnet frame 72MH2.

Each of the first to fourth unit driving parts 72M1, 72M2, 72M3, and 72M4 may include first to fourth magnets.

FIG. 22C is an exploded perspective view of the first driving part 72M of the image shaking control unit 320 shown in FIG. 22A.

In the embodiment, the first driving part 72M may block the interference of the magnetic field by further including yokes 72MY disposed on the first and second magnet frames 72MH1 and 72MH2.

For example, the first magnet frame 72MH1 of the first driving part 72M may include a frame groove 72MR, and the yoke 72MY may be disposed on the frame groove 72MR. Thereafter, the first unit driving part 72M1 and the second unit driving part 72M2 may be disposed on the yoke 72MY, respectively.

At this time, the yoke 72MY may include a yoke protruding portion 72MYP to be firmly coupled to the protruding portion 322b of the shaper unit 322.

Next, FIG. 23 is a perspective view of the shaper unit 322 of the second camera actuator of the embodiment shown in FIG. 22A.

Referring to FIG. 23, the shaper unit 322 may include a shaper body 322a including an opening through which light may pass, a protruding portion 322b extending from the shaper body 322a to a side surface thereof and coupled to the first driving part 72M in a first vertical direction, and a lens unit 322c disposed on the shaper body 322a in a second vertical direction opposite to the first vertical direction and including a tunable prism 322cp.

Specifically, in the embodiment, the shaper unit 322 may include a plurality of magnet support portions extending from the shaper body 322a to both sides thereof, respectively. For example, the shaper unit 322 may include a first protruding portion 322b1 and a second protruding portion 322b2 that are branched and extend from the shaper body 322a to a first side thereof, and a third protruding portion 322b3 and a fourth protruding portion 322b4 that are branched and extend to a second side thereof.

The first driving part 72M may include first to fourth unit driving parts 72M1, 72M2, 72M3, and 72M4 coupled to the first to fourth protruding portions 322b1, 222b2, 222b3, and 222b4, respectively.

Referring to FIG. 23, in the embodiment, the shaper unit 322 may include a coupling groove 322bh in the magnet support portion to be coupled to a magnet frame. Accordingly, the image shaking control unit 320 as shown in FIG. 22B may be coupled to the shaper unit 322.

According to the embodiment, in a state in which the first driving part 72M is firmly coupled to the shaper unit 322, OIS is implemented through an optical path control of the lens unit 322c including a tunable prism, and thus there is a special technical effect that occurrence of a decenter or tilt phenomenon may be minimized to achieve the best optical characteristics.

Next, FIG. 24 is a cross-sectional view of the lens unit 322c taken along line A1-A1' of the shaper unit 322 shown in FIG. 23.

Referring to FIG. 24, in the embodiment, the lens unit 322c may include a translucent support 322c2, a bracket 322cb disposed on the translucent support 322c2 with a predetermined accommodation space, a tunable prism 322cp or a liquid lens (not shown) disposed in the accommodation space of the bracket 322cb, a flexible plate 322cm disposed on the tunable prism 322cp or the liquid lens, and a second translucent support (not shown) disposed on the flexible plate 322cm. The flexible plate 322cm may be formed of a translucent material.

The translucent support 322c2 and the second translucent support (not shown) may be formed of a translucent material. For example, the translucent support 322c2 and the second translucent support may be formed of glass, but the embodiment is not limited thereto.

The translucent support 322c2 and the second translucent support may have a hollow circular ring shape or a square ring shape.

A size of the second translucent support (not shown) may be formed smaller than that of the accommodation space of the bracket 322cb.

The tunable prism 322cp may include an optical liquid disposed in a space created by the translucent support 322c2, the support bracket 322cb, and the flexible plate 322cm. Alternatively, the tunable prism 322cp may include a wedge prism.

In an embodiment, the tunable prism 322cp may be a lens made of a fluid, and the fluid lens may have a shape in which a liquid is surrounded by a fluid film, but the embodiment is not limited thereto.

In the embodiment, an optical liquid used by the tunable prism 322cp may be a transparent, low-fluorescent, non-toxic material. For example, the optical liquid of the embodiment may use a chlorofluorocarbon (CFC) component or the like, but the embodiment is not limited thereto.

The bracket 322cb may be formed of a stretchable material or a non-stretchable material. For example, the bracket 322cb may be formed of an elastic film material or a metal material, but the embodiment is not limited thereto.

When the flexible plate 322cm receives a predetermined force by the shaper body 322a according to movement of the first driving part 72M, as shown in FIG. 25B, a part of the flexible plate 322cm moves upward or downward due to characteristics of a flexible elastic material, and the form of the tunable prism 322cp may be variable.

For example, the flexible plate 322cm may be a reverse osmosis (RO) membrane, a nano filtration (NF) membrane, an ultra-filtration (UF) membrane, a micro filtration (MF) membrane, and the like, but the embodiment is not limited thereto. Here, the RO membrane may be a membrane having a pore size of about 1 to 15 angstroms, the NF membrane may be a membrane having a pore size of about 10 angstroms, the UF membrane may be a membrane having a pore size of about 15 to 200 angstroms, and the MF membrane may be a membrane having a pore size of about 200 to 1000 angstroms.

According to the embodiment, the image shaking control unit 320 stably disposed on the housing 310 is provided, and the shaper unit 322 and the first driving part 72M are included, and thus there is a technical effect that when the OIS is implemented through the lens unit 322c including the tunable prism 322cp, occurrence of a decenter or tilt phenomenon may be minimized to achieve the best optical characteristics.

Next, FIGS. 25A to 25B are illustrative views showing an operation of the second camera actuator 300 of the embodiment.

For example, FIG. 25A is an illustrative view before an operation of the OIS actuator of the embodiment, and FIG. 25B is an illustrative view after the operation of the OIS actuator of the embodiment.

In a broad sense, the prism in an embodiment may include a fixed prism 332 that changes a path of a predetermined light beam, and a tunable prism 322cp that is disposed below the fixed prism 332 and changes a path of a light beam emitted from the fixed prism 332.

Referring to FIGS. 25A and 25B, the second camera actuator 300 of the embodiment may change a form of the tunable prism 322*cp* through the first driving part 72M and the second driving part 72C to control the path of the light beam.

For example, in the embodiment, the second camera actuator 300 may control the path of the light beam by changing an apex angle Θ of the tunable prism 322*cp* through the first driving part 72M which is a magnet driving part.

For example, referring to FIG. 25A, an incident light L1 is changed to the second moving path L1*a* by the fixed prism 332, but the light path is not changed by the tunable prism 322*cp*.

On the other hand, referring to FIG. 25B, the second moving path L1*a* of the light beam changed by the fixed prism 332 may be changed in the tunable prism 322*cp* to be changed to the third moving path L1*b*.

For example, when the flexible plate 322*cm* receives a predetermined force by the shaper body 322*a* according to movement of the first driving part 72M, the second translucent support (not shown) receives the force, and the force is transmitted to the flexible plate 322*cm*, and a part of the flexible plate 322*cm* moves upward or downward due to characteristics of a flexible elastic material, and the form of the tunable prism 322*cp* may be variable.

For example, as a left upper end of the shaper body 322*a* receives a force F2 in a second direction by the first unit driving part 72M1, and a right upper end of the shaper body 322*a* receives a force F1 in a first direction by the second unit driving part 72M2, it may be varied. The second translucent support (not shown) receives a force according to movement of the shaper body 322*a*, and the flexible plate 322*cm* may be changed in an inclination of a predetermined angle Θ of by the force.

Hereinafter, with reference to FIG. 25B, in the embodiment, an image stabilizing device for controlling the path of the light beam will be described in further detail by deforming the shape of the tunable prism 322*cp* through the first driving part 72M.

First, according to the embodiment, due to occurrence of camera shake, an image needs to move to a side surface by a first distance D1δ on an image plane (not shown) of a lens assembly provided in the first camera actuator 100.

At this time, D1 is a distance from the tunable prism 322*cp* to the image plane of the lens assembly, S is a chromatic aberration of the tunable prism 322*cp*, and *e* is an apex angle of the tunable prism 322*cp*.

That is, according to the embodiment, after calculating a changed apex angle Θ of the tunable prism 322*cp*, the path of the light beam may be controlled to the path L1*b* by changing the apex angle Θ of the tunable prism 322*cp* through the first driving part 72M.

At this time, a relationship of δΘ may be established between the chromatic aberration δ of the tunable prism 322*cp* and the apex angle Θ of the tunable prism 322*cp* (where n is a refractive index of the tunable prism 322*cp* with respect to a center wavelength of a band of interest).

According to the embodiment, the prism unit 330 and the lens unit 322*c* including the tunable prism may be disposed very close to each other, and thus there is a special technical effect that even though a change in an optical path is made fine in the lens unit 322*c*, the change in the optical path may be widely secured in the actual image sensor unit.

For example, according to the embodiment, the fixed prism 332 and the lens unit 322*c* including the tunable prism may be disposed very close to each other, and a distance between the lens unit 322*c* and an image plane 190P of the first lens assembly (not shown) may be secured to be relatively long. Accordingly, a first distance D1δ reflected on the image plane 190P may be secured widely according to a change in an inclination of a predetermined angle Θ in the tunable prism 322*cp*, and thus there is a special technical effect that even though the change in the optical path is made fine in the lens unit 322*c*, the change in the optical path may be widely secured in the actual image sensor unit.

Next, FIG. 26 is a first operation illustrative view of the second camera actuator of the embodiment.

For example, FIG. 26 is the first operation example view viewed from a z-axis direction of the second camera actuator 300 according to the embodiment shown in FIG. 20B.

Referring to FIG. 26, power is applied to the second driving part 72C through the second circuit board 350, and a current flows through each coil, and accordingly, an electromagnetic force may be generated between the second driving part 72C and the first driving part 72M in a first direction F1 or a second direction F2, and the flexible plate 322*cm* may be tilted at a predetermined angle by the first driving part 72M that is moved, thereby controlling the apex angle Θ of the tunable prism 322*cp*.

For example, referring to FIG. 26, the first unit driving part 72M1 and the second unit driving part 72M2 may be disposed so that a direction of the magnetic force may be generated in a direction of the fifth unit driving part 72C1 and the sixth unit driving part 72C2, and the third unit driving part 72M3 and the fourth unit driving part 72M4 may be disposed so that the direction of the magnetic force may be generated in a direction of the seventh unit driving part 72C3 and the eighth unit driving part 72C4.

At this time, when a current C1 in the first direction flows in the fifth unit driving part 72C1 and the sixth unit driving part 72C2, the force F2 may be applied in the second direction. On the other hand, when the current C1 in the first direction flows in the seventh unit driving part 72C3 and the eighth unit driving part 72C4, the force F1 may be applied in the first direction opposite to the second direction.

Accordingly, in the first unit driving part 72M1 and the second unit driving part 72M2, the force F2 may be applied to the flexible plate 322*cm* in the second direction, and in the third unit driving part 72M3 and the fourth unit driving part 72M4, the force F1 may be applied to the flexible plate 322*cm* in the first direction, and accordingly, the apex angle Θ of the tunable prism 322*cp* may be deformed at a first angle Θ1 to change and control the light path.

Next, FIG. 27 is a second operation example view of the second camera actuator 300 of the embodiment.

For example, FIG. 27 is the second operation example view viewed from a z-axis direction of the second camera actuator 300 according to the embodiment shown in FIG. 20B.

For example, power is applied to the second driving part 72C, and a current flows through each coil, and accordingly, an electromagnetic force may be generated between the second driving part 72C and the first driving part 72M in a first direction F1 or a second direction F2, and the flexible plate 322*cm* may be tilted at a predetermined angle.

For example, referring to FIG. 27, the first unit driving part 72M1 and the second unit driving part 72M2 may be disposed so that a direction of the magnetic force may be generated in a direction of the fifth unit driving part 72C1 and the sixth unit driving part 72C2, and the third unit driving part 72M3 and the fourth unit driving part 72M4 may be disposed so that the direction of the magnetic force may be generated in a direction of the seventh unit driving part 72C3 and the eighth unit driving part 72C4.

At this time, a current C1 in the first direction may flow in the fifth unit driving part 72C1 and the seventh unit driving part 72C3, and a current C2 in the second direction may flow in the sixth unit driving part 72C2 and the eighth unit driving part 72C4.

Accordingly, the force F2 may be applied in the second direction in the first unit driving part 72M1 and the fourth unit driving part 72M4, and the force F1 may be applied in the first direction in the second unit driving part 72M2 and the third unit driving part 72M3.

Accordingly, in the first unit driving part 72M1 and the fourth unit driving part 72M4, the force F2 may be applied to the flexible plate 322cm of the variable prism 322cp in the second direction, and in the second unit driving part 72M2 and the third unit driving part 72M3, the force F1 may be applied to the flexible plate 322cm of the variable prism 322cp in the first direction, and accordingly, the apex angle Θ of the tunable prism 322cp may be deformed at a second angle Θ2 to change and control the light path.

According to the embodiment, the image shaking control unit 320 is disposed so as to utilize a space below the prism unit 330 and overlap each other, and thus there is a technical effect that it is possible to provide an ultra-thin and ultra-small camera actuator and a camera module including the same.

In addition, according to the embodiment, the image shaking control unit 320 is disposed below the prism unit 330, and thus there is a technical effect that when the OIS is implemented, lens size limitation of an optical system lens assembly may be eliminated, and a sufficient amount of light may be secured.

In addition, according to the embodiment, the image shaking control unit 320 stably disposed on the housing 310 is provided, and a shaper unit 322 and a first driving part 72M are included, and thus there is a technical effect that when the OIS is implemented through a lens unit 322c including a tunable prism 322cp, occurrence of a decenter or tilt phenomenon may be minimized to achieve the best optical characteristics.

Further, according to the embodiment, when the OIS is implemented, the first driving part 72M, which is a magnet driving part, is disposed on the second camera actuator 300 separated from the first camera actuator 100, and thus there is a technical effect that a magnetic field interference with an AF or Zoom magnet of the first camera actuator 100 may be prevented.

Next, FIG. 28 is another perspective view of a camera module 1000 according to another embodiment.

The camera module 1000 according to another embodiment may further include a second camera module 1000B in addition to the camera module 1000A described above. The second camera module 1000B may be a camera module of a fixed focal length lens. The fixed focal length lens may be referred to as a "single focal length lens" or a "single lens". The second camera module 1000B may be electrically connected to a third group of circuit boards 430. The second camera actuator 300 included in the camera module 1000A may be electrically connected to a second group of circuit boards 420.

Next, FIG. 29 shows a mobile terminal 1500 to which a camera module according to an embodiment is applied.

As shown in FIG. 29, the mobile terminal 1500 according to the embodiment may include a camera module 1000, a flash module 1530, and an autofocus device 1510 provided on a back surface.

The camera module 1000 may include an image capturing function and an autofocus function. For example, the camera module 1000 may include an autofocus function using an image.

The camera module 1000 processes a still image or a moving image frame obtained by an image sensor in a photographing mode or a video call mode. The processed image frame may be displayed on a predetermined display unit, and may be stored in a memory. A camera (not shown) may be disposed on a front surface of the body of the mobile terminal.

For example, the camera module 1000 may include a first camera module 1000A and a second camera module 1000B, and OIS may be implemented together with an AF or zoom function by the first camera module 1000A.

The flash module 1530 may include a light-emitting device that emits light therein. The flash module 1530 may be operated by a camera operation of a mobile terminal or by user control.

The autofocus device 1510 may include one of packages of a surface emitting laser element as a light-emitting unit.

The autofocus device 1510 may include an autofocus function using a laser. The autofocus device 1510 may be mainly used in a condition in which an autofocus function using an image of the camera module 1000 is deteriorated, for example, in a close environment of 10 m or less or a dark environment. The autofocus device 1510 may include a light-emitting unit including a vertical cavity surface emitting laser (VCSEL) semiconductor device, and a light receiving unit that converts light energy into electric energy such as a photodiode.

INDUSTRIAL APPLICABILITY

Next, FIG. 30 is a perspective view of a vehicle 700 to which a camera module according to an embodiment is applied, For example, FIG. 30 is an appearance view of a vehicle having a vehicle driving assistance device to which a camera module 1000 according to the embodiment is applied.

Referring to FIG. 30, the vehicle 700 according to the embodiment may include wheels 13FL and 13FR that rotate by a power source, and a predetermined sensor. The sensor may be a camera sensor 2000, but the embodiment is not limited thereto.

The camera 2000 may be a camera sensor to which the camera module 1000 according to the embodiment is applied.

The vehicle 700 according to the embodiment may acquire image information through the camera sensor 2000 that photographs a front image or a surrounding image, and may determine an unidentified situation of a lane by using the image information and generate a virtual lane at the time of un-identification.

For example, the camera sensor 2000 may acquire the front image by photographing a front of the vehicle 700, and a processor (not shown) may acquire the image information by analyzing an object included in the front image.

For example, when an object such as a lane, a neighboring vehicle, a traveling obstacle, and a median strip, a curb, and a street tree corresponding to an indirect road marking is photographed in an image photographed by the camera sensor 2000, the processor detects such an object to include in the image information.

In this case, the processor may acquire distance information with the object detected through the camera sensor 2000 to further complement the image information. The image information may be information about an object captured in the image.

Such a camera sensor 2000 may include an image sensor and an image processing module. The camera sensor 2000 may process a still image or moving image obtained by the image sensor (e.g., CMOS or CCD). The image processing module may process the still image or moving image acquired through the image sensor to extract necessary information, and may transmit the extracted information to the processor.

At this time, the camera sensor 2000 may include a stereo camera so as to improve the measurement accuracy of the object and to secure more information such as a distance between the vehicle 700 and the object, but the embodiment is not limited thereto.

The characteristics, structures and effects described in the embodiments above are included in at least one embodiment but are not limited to one embodiment. Furthermore, the characteristics, structures, effects, and the like illustrated in each of the embodiments may be combined or modified even with respect to other embodiments by those of ordinary skill in the art to which the embodiments pertain. Thus, it would be construed that contents related to such a combination and such a modification are included in the scope of the embodiments.

Embodiments are mostly described above, but they are only examples and do not limit the embodiments. A person skilled in the art to which the embodiments pertain may appreciate that several variations and applications not presented above may be made without departing from the essential characteristic of the embodiments. For example, each component particularly represented in the embodiments may be varied. In addition, it should be construed that differences related to such a variation and such an application are included in the scope of the embodiment defined in the following claims.

The invention claimed is:

1. A camera module comprising:
   a base;
   a first lens assembly disposed in the base;
   a first coil part disposed on the base;
   a first spacer disposed on the base, the first spacer including a first support portion and a first protrusion protruding from the first support portion;
   a first position detection sensor disposed on the first spacer; and
   a first circuit board disposed between the first position detection sensor and the first support portion,
   wherein the first position detection sensor is disposed on the first protrusion, and the first protrusion is disposed in a hollow of the first coil part,
   wherein the first circuit board comprises a first substrate region disposed on the first support portion and a second substrate region disposed on the first protrusion, and
   wherein the second substrate region is partially connected to the first substrate region.

2. The camera module according to claim 1, wherein the first position detection sensor is disposed on the second substrate region, and
   wherein the second substrate region includes a second substrate groove.

3. The camera module according to claim 2, wherein the first protrusion includes an engaging protrusion, and the engaging protrusion of the first protrusion is coupled to the second substrate groove of the second substrate region.

4. The camera module according to claim 3, wherein the first support unit includes a support protrusion on which a part of the first coil part is disposed.

5. The camera module according to claim 1, wherein the first substrate region includes a first substrate groove, the first support portion includes a first engagement protrusion, and the first substrate groove of the first substrate region engages with the first engagement projection of the first support portion.

6. The camera module according to claim 1, further comprising:
   a second lens assembly disposed in the base at a position corresponding to the first lens assembly; and
   a second coil part disposed at a position corresponding to the first coil part of the base, and a second spacer disposed at a position corresponding to the first spacer of the base,
   wherein the second spacer includes a second support portion and a second protrusion protruding from the second support portion, and
   wherein the second position detection sensor is disposed on the second protrusion, and the second protrusion is disposed in a hollow of the second coil part.

7. The camera module according to claim 6, further comprising a second circuit board disposed between the second position detection sensor and the second support,
   wherein the second circuit board includes a third substrate region disposed on the second support portion and a fourth substrate region disposed in the second protrusion, and the fourth substrate region is partially connected to the third substrate region; and
   further comprising a fifth substrate region connecting the first circuit board and the second circuit board;
   wherein the first lens assembly includes a first yoke and a first magnet,
   wherein the first yoke includes first and second bent portions,
   wherein the first bent portion of the first yoke is coupled to the groove of the first lens assembly, and
   wherein the second bent portion is coupled to one side of the first magnet.

8. A camera module comprising:
   a base including an opening;
   a first lens assembly disposed in the base and including a first magnet;
   a first coil part disposed on the base;
   a first spacer disposed on the base, the first spacer including a first support portion and a first protrusion protruding from the first support portion;
   a first position detection sensor disposed on the first spacer; and
   a first circuit board disposed between the first position detection sensor and the first support portion,
   wherein the first protrusion is disposed in the opening to correspond to the first magnet,
   wherein the first circuit board comprises a first substrate region disposed on the first support portion and a second substrate region disposed on the first protrusion, and
   wherein the second substrate region is partially connected to the first substrate region.

9. The camera module according to claim 8, wherein the first position detection sensor is disposed on the second substrate region, and
   wherein the second substrate region includes a second substrate groove.

10. The camera module according to claim 8, wherein the first substrate region includes a first substrate groove, the first support portion includes a first engagement protrusion, and the first substrate groove of the first substrate region engages with the first engagement projection of the first support portion.

11. A camera module comprising:
a base;
a first lens assembly disposed in the base;
a first coil part disposed on the base;
a first spacer disposed on the base;
a first circuit board disposed on the first spacer; and
a first position detection sensor disposed on the first circuit board,
wherein the first circuit board includes:
a first substrate region disposed on the first spacer; and
a second substrate region spaced apart from the first substrate region, and
wherein the first position detection sensor is disposed on the second substrate region, and the second substrate region is disposed in the hollow of the first coil part.

12. The camera module according to claim 11, wherein the first spacer includes a first support portion and a first protrusion protruding from the first support portion, and
wherein the first protrusion is disposed in the opening to correspond to a first magnet.

13. The camera module according to claim 11, wherein the second substrate region includes a second substrate groove.

14. The camera module according to claim 13, wherein the first protrusion includes an engaging protrusion, and the engaging protrusion of the first protrusion is coupled to the second substrate groove of the second substrate region.

15. A camera module comprising:
a base;
a first lens assembly disposed in the base;
a first coil part disposed on the base;
a first spacer disposed on the base;
a first circuit board disposed on the first spacer; and
a first position detection sensor disposed on the first circuit board,
wherein the first coil part is disposed on the first circuit board and the first spacer.

16. The camera module according to claim 15, wherein the first circuit board includes:
a first substrate region disposed on the spacer; and
a second substrate region spaced apart from the first substrate region, and
wherein the first position detection sensor is disposed on the second substrate region, and the second substrate region is disposed in the hollow of the first coil part.

17. The camera module according to claim 16, wherein the first spacer includes a first support portion and a first protrusion protruding from the first support portion, and
wherein the first protrusion is disposed in the opening to correspond to a first magnet.

18. The camera module according to claim 16, wherein the second substrate groove or the engaging protrusion is formed in a circle shape.

* * * * *